United States Patent
Huang

(10) Patent No.: US 8,335,043 B2
(45) Date of Patent: Dec. 18, 2012

(54) IMAGE TAKING OPTICAL SYSTEM

(75) Inventor: Hsin-Hsuan Huang, Taichung (TW)

(73) Assignee: Largan Precision Co., Taichung (TW)

( * ) Notice: Subject to any disclaimer, the term of this patent is extended or adjusted under 35 U.S.C. 154(b) by 0 days.

(21) Appl. No.: 13/216,630

(22) Filed: Aug. 24, 2011

(65) Prior Publication Data
US 2012/0268835 A1 Oct. 25, 2012

(30) Foreign Application Priority Data

Apr. 22, 2011 (TW) .............................. 100114062 A

(51) Int. Cl.
 G02B 13/04 (2006.01)
 G02B 13/18 (2006.01)
(52) U.S. Cl. ......................... 359/753; 359/714; 359/717
(58) Field of Classification Search .......... 359/749–753, 359/714, 717
 See application file for complete search history.

(56) References Cited

U.S. PATENT DOCUMENTS

| | | | |
|---|---|---|---|
| 6,239,921 B1 * | 5/2001 | Isono | 359/717 |
| 6,275,343 B1 * | 8/2001 | Takamoto et al. | 359/749 |
| 6,940,662 B2 | 9/2005 | Sekita | |
| 6,985,309 B2 | 1/2006 | Shinohara | |
| 7,663,813 B2 | 2/2010 | Lai | |
| 7,710,665 B2 | 5/2010 | Park et al. | |
| 7,826,151 B2 | 11/2010 | Tsai | |
| 2010/0253829 A1 | 10/2010 | Shinohara | |
| 2010/0254029 A1 | 10/2010 | Shinohara | |

FOREIGN PATENT DOCUMENTS

EP 2012162 A1 1/2009

* cited by examiner

*Primary Examiner* — Scott J Sugarman
(74) *Attorney, Agent, or Firm* — Wang Law Firm, Inc.; Li K. Wang; Stephen Hsu

(57) ABSTRACT

An image taking optical system, sequentially arranged from an object side to an image side along an optical axis comprising: a front lens group, a stop and a rear lens group. The front lens group comprises at least a meniscus front-group first lens element with a convex object-side surface. The rear lens group comprises at least three lens elements. Through the means of field adjustments that result in desirable distorted images, the image taking optical system may shorten the total length while enhancing the ability to create a larger field of view for panorama usages in compact cameras and mobile phones.

24 Claims, 33 Drawing Sheets

IMAGE TAKING OPTICAL SYSTEM

BACKGROUND OF THE INVENTION

1. Field of the Invention

The present invention relates to an image taking optical system, and more particularly to an image taking optical system comprising two lens groups to provide good aberration compensation and short total length in order to be applied to electronic products.

2. Description of the Related Art

At present, optical systems used for digital cameras or lenses used for web cameras or mobile phones tend to provide a larger field angle, a good aberration correction ability and high image quality as user's requirements besides a compact design and a low cost.

In general, a conventional image taking optical system of a mini electronic product comes with different designs, including the two-lens, three-lens, four-lens, and five-or-more lens designs. If the image quality is taken into consideration, the image taking optical system for the compact digital cameras, web cameras, and mobile phone cameras requires a compact design, a short focal length, and a good aberration correction. In the various designed five-lens image taking optical system with a constant focal length as disclosed in U.S. Pat. No. 7,710,665, can achieve a good aberration correction, but the total length of the optical system is still difficult to meet the application of the compact electronic device. Besides, U.S. patent and publications of U.S. Pat. No. 7,826,151, US2010/0254029, and US2010/0253829 respectively provide an optical system designed with a shorter total length. These prior arts primarily adopt the first lens element with negative refractive power, the second lens element or the third lens element with positive refractive power to increase the field angle, and adopt a four-lens, five-lens or six-lens image taking optical system to achieve user requirements of the aberration correction and modulation transfer function (MTF) performance for applying to the electronic products with high-quality and high-pixel.

As disclosed in U.S. Pat. Nos. 7,663,813, 6,985,309, and 6,940,662 and European Pat. No. EP2012162, an optical design of the first lens element with negative refractive power is provided, but the first lens element with negative refractive power will cause a too-large refractive angle of the first lens element, and light divergence effects a difficult aberration correction to the following lens elements. In the prior arts disclosed above, if the refractive power of the lens element installed behind the first lens element is insufficient for the aberration of the lens element nearest to the image plane is difficult to correct, then the astigmatic field curving or distortion of the image will be increased. Therefore, a more practical design of an image taking optical system for compact electronic products is required for shortening the length of image taking optical system while using the combination of refractive powers, convex and concave surfaces of the lens elements and the maximum image light captured by the first lens element to minimize the air gap between the lens elements to be the smallest or even attach the lens elements with one another. In addition, the refractive power and the aberration correction ability of the lens elements are also used for reducing the total length of the image taking optical system effectively to further improve the image quality and simplify the manufacturing process in order to be applied to the compact electronic products.

SUMMARY OF THE INVENTION

Therefore, it is a primary objective of the present invention to provide an image taking optical system, sequentially arranged from an object side to an image side, comprising: a front lens group, a stop and a rear lens group; wherein the front lens group comprises one or more lens elements, the rear lens group comprises at least three lens elements, and the stop is disposed between the front lens group and the rear lens group. The front lens group comprises a front-group first lens element which is a meniscus lens element nearest to the object side and has a convex object-side surface. The image taking optical system of the present invention satisfies the following relations:

$$30° < HFOV < 45°; \quad (1)$$

$$-50\% < DIST_8 < -30\%; \quad (2)$$

wherein, HFOV is half of the maximum view angle of the image taking optical system (unit in degree), and $DIST_8$ is an optical distortion at 80% of the maximum image height (unit in percent).

As described above, the rear lens group further comprises a rear-group rear lens element made of plastic nearest to an image plane, and at least one of the object-side surface and image-side surface thereof has at least one inflection point.

On the other hand, the rear lens group at least comprises a rear-group positive glass lens element, which is a glass lens element with positive refractive power having an image side adjacent to a rear-group negative lens element with negative refractive power, and the image-side surface of the rear-group negative lens element has at least one inflection point. A plastic rear-group rear lens element is a lens element of the rear lens group nearest to the image plane, and at least one of the object-side and image-side surfaces thereof has at least one inflection point. Further, the rear-group negative lens element has at least two inflection points between the center and the periphery of the image-side surface of the rear-group negative lens element. In additional, the image taking optical system comprises an image sensor at the image plane. The image taking optical system satisfies one or more of the following relations in addition to the relations (1) and (2):

$$-0.5 < (Rg_1 + Rg_2)/(Rg_1 - Rg_2) < 1.0; \quad (3)$$

$$-1.0 < (Rn_1 + Rn_2)/(Rn_1 - Rn_2) < 0.5; \quad (4)$$

$$0 < Tgn/f < 0.1; \quad (5)$$

$$0.0 < R_L/f < 0.55; \quad (6)$$

$$0.0 < \Sigma|P_F|/\Sigma|P_R| < 0.18; \quad (7)$$

$$TTL/ImgH < 3.8; \quad (8)$$

wherein, $Rg_1$ is a curvature radius of the object-side surface of the rear-group positive glass lens element, $Rg_2$ is a curvature radius of the image-side surface of the rear-group positive glass lens element, $Rn_1$ is a curvature radius of the object-side surface of the rear-group negative lens element, $Rn_2$ is a curvature radius of the image-side surface of the rear-group negative lens element, Tgn is an axial distance between the image-side surface of the rear-group positive glass lens element and the object-side surface of the rear-group negative lens element, $R_L$ is a curvature radius of the image-side surface of the rear-group rear lens element, f is a focal length of the image taking optical system, $\Sigma |P_F|$ is a summation of absolute values of the refractive power of each lens element of the front lens group, and $\Sigma |P_R|$ is a summation of absolute values of the refractive power of each lens element of the rear lens group;

$$\Sigma|P_F| = \Sigma(|f/f_{F1}| + |f/f_{F2}| + \ldots + |f/f_{Fn}|),$$

$$\Sigma|P_R| = \Sigma(|f/f_{R1}| + |f/f_{R2}| + \ldots + |f/f_{Rm}|),$$

where, $f_{F1}, f_{F2}, \ldots, f_{Fn}$ are the focal lengths of the first lens element, the second lens element to the $n^{th}$ lens element of the front lens group respectively, and $f_{R1}, f_{R2}, \ldots, f_{Rm}$ are the focal lengths of the first lens element, the second lens element to the $m^{th}$ lens element of the rear lens group.

Another objective of the present invention is to provide an image taking optical system, sequentially arranged from an object side to an image side, comprising: a front lens group, a stop and a rear lens group; wherein the front lens group comprises one or more lens elements, the rear lens group comprises at least three lens elements, and the stop is disposed between the front lens group and the rear lens group. The front lens group comprises a front-group first lens element, which is a meniscus lens element nearest to the object side and has a convex object-side surface. The rear lens group comprises a rear-group rear lens element, having a concave image-side surface. The image taking optical system of the present invention satisfies one or more of the following relations in addition to the relations (1) and (2):

$$0.0<(R_1-R_2)/(R_1+R_2)<0.5; \quad (9)$$

$$\text{or further, } 0.0<(R_1-R_2)/(R_1+R_2)<0.3; \quad (10)$$

$$-0.8<f/f_1<0.3; \quad (11)$$

$$0.5<SL/TTL<0.9; \quad (12)$$

$$-0.3<f_R/f_F<0.1; \quad (13)$$

wherein, $R_1$ is a curvature radius of the object-side surface of front-group first lens element, $R_2$ is a curvature radius of the image-side surface of the front-group first lens element, f is the focal length of the image taking optical system, $f_1$ is a focal length of the front-group first lens element, SL is an axial distance from the stop to the image plane, and TTL is an axial distance from the object-side surface of the front-group first lens element to the image plane, $f_F$ is the focal length of the front lens group, and $f_R$ is the focal length of the rear lens group.

Another objective of the present invention is to provide an image taking optical system, sequentially arranged from an object side to an image side, comprising: a front lens group, a stop and a rear lens group; wherein the front lens group comprises one or more lens elements, the rear lens group comprises at least three lens elements, and the stop is disposed between the front lens group and the rear lens group. The front lens group comprises a front-group first lens element, which is a lens element nearest to the object side and has a convex object-side surface and a concave image-side surface. The rear lens group comprises a rear-group rear lens element nearest to the image plane and having a concave image-side surface and at least two inflection points between the center and the periphery of the image-side surface. The image taking optical system of the present invention satisfies the following relation:

$$-0.8<f/f_1<0.3; \quad (11)$$

wherein, f is the focal length of the image taking optical system, and $f_1$ is the focal length of the front-group first lens element.

On the hand, as described above, the image taking optical system further comprises an image sensor at an image plane. The image taking optical system satisfies one or more of the following relations in addition to the relations (1) and (2):

$$0.0<\Sigma|P_F|/\Sigma|P_R|<0.18; \quad (7)$$

$$0.0<R_L/f<0.55; \quad (6)$$

$$0.5<SL/TTL<0.9; \quad (12)$$

$$TTL/ImgH<3.8; \quad (8)$$

$$-10.0<\tan(HFOV)/DIST_8<0; \quad (14)$$

$$-0.5<(Rg_1+Rg_2)/(Rg_1-Rg_2)<1.0; \quad (3)$$

$$-1.0<(Rn_1+Rn_2)/(Rn_1-Rn_2)<0.5; \quad (4)$$

$$0.3<f_R/f_F<0.1; \quad (13)$$

wherein, $\Sigma|P_F|$ is the summation of absolute values of the refractive power of each lens element of the front lens group, and $\Sigma|P_R|$ is the summation of absolute values of the refractive power of each lens element of the rear lens group, $R_L$ is the curvature radius of the image-side surface of the rear-group rear lens element, f is the focal length of the image taking optical system, HFOV is half of the maximum view angle of the image taking optical system (unit in degree), $DIST_8$ is the optical distortion at 80% of the maximum image height (unit in percent), SL is the axial distance from the stop to the image plane of the image taking optical system, TTL is an axial distance from the object-side surface of the front-group first lens element to the image plane, ImgH is half of the diagonal length of an effective photosensitive area of the image sensor, $Rg_1$ is the curvature radius of the object-side surface of the rear-group positive glass lens element, $Rg_2$ is the curvature radius of the image-side surface of the rear-group positive glass lens element, $Rn_1$ is the curvature radius of the object-side surface of the rear-group negative lens element, $Rn_2$ the curvature radius of the image-side surface of the rear-group negative lens element, $f_F$ is the focal length of the front lens group, and $f_R$ is the focal length of the rear lens group.

In the present invention, the aforementioned front lens group, stop, rear lens group, each lens element in the front lens group, each lens element in the rear lens group are installed with an appropriate interval apart along the optical axis to achieve a good aberration correction and a more advantageous modulation transfer function (MTF), and reduce the total length of the image taking optical system effectively to improve the aberration correction ability for applying to an optical image taking system used in compact electronic devices.

In the image taking optical system of the present invention, the meniscus front-group first lens element having a convex object side and the rear-group positive glass lens element with positive refractive power are used for image taking in an opposite direction and with a wider field angle. To overcome the shortcomings of too-large refractive angle of the rear lens group caused by the front-group first lens element to diverge light easily and poor aberration correction ability of the following lens elements, the present invention adopts a rear-group rear lens element with at least one inflection point within the rear lens group to correct the aberration and adjust the modulation transfer function (MTF), and further uses a rear-group negative lens element adjacent to the rear-group positive lens element to reduce the chromic aberration and coma aberration produced in the image taking optical system to improve the resolution of the image taking optical system, such that the aberration and distortion of the image taking optical system can meet the high resolution requirement.

Furthermore, in the image taking optical system of the present invention, the stop is a middle stop disposed between the front lens group and the rear lens group for enhancing the front stop (which is disposed between the photographed object and the first lens element), such that the exit pupil of the image taking optical system will not be too far away from the image plane For controlling the light to be incident onto the image sensor in a substantially perpendicular direction to achieve the telecentric effect, and obtain a balance between the telecentric effect and the wider field angle. With the rear-group rear lens element having at least two inflection points, the wide-angle image taking optical system has a good effect of correcting chromic aberrations caused by distortions and width.

DETAILED DESCRIPTION OF THE PREFERRED EMBODIMENTS

Figure 1A:
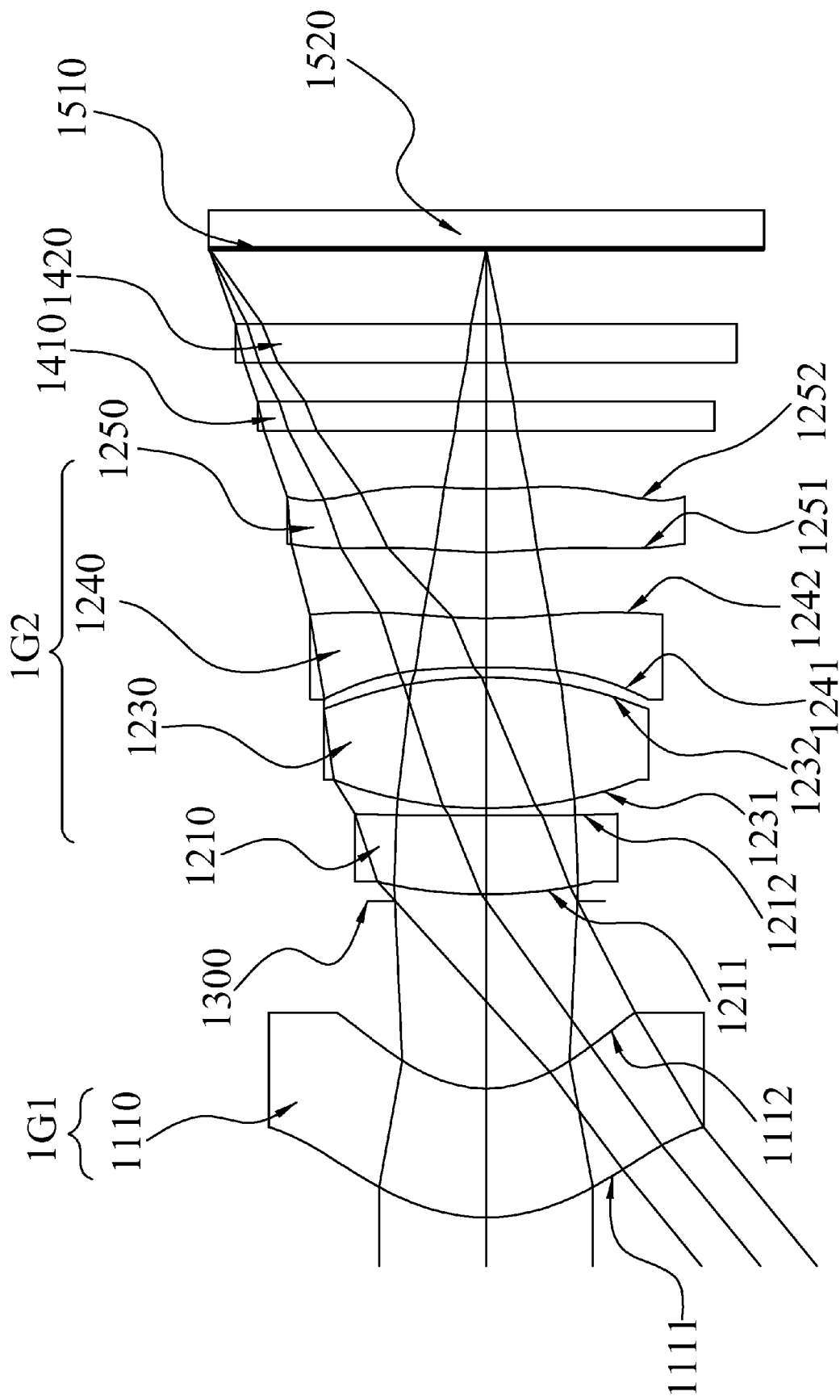
FIG. 1A is a schematic view of an optical system in accordance with the first preferred embodiment of the present invention.

With reference to FIG. 1A for an image taking optical system of the present invention, the image taking optical system, sequentially arranged from an object side to an image side along an optical axis, comprises a front lens group (1G1), a stop and a rear lens group (1G2), and the stop can be an aperture stop (1300) disposed between the front lens group (1G1) and the rear lens group (1G2). In FIG. 1A, the front lens group (1G1) comprises a meniscus front-group first lens element (1110) having a convex object-side surface (1111), and the rear lens group (1G2) comprises at least three lens elements like four lens elements including a rear-group first lens element (1210), a rear-group positive lens element (1230), a rear-group negative lens element (1240) and a rear-group rear lens element (1250) as shown in FIG. 1A, wherein the rear-group positive glass lens element (1230) has positive refractive power, the rear-group negative lens element (1240) is adjacent to the image side surface of rear-group positive lens element (1230), the plastic rear-group rear lens element (1250) has a concave image-side surface (1252) and at least one inflection point disposed on at least one of an object-side surface (1251) and the image-side surface (1252).

The image taking optical system of the present invention further comprises an IR-filter (1410) and a cover glass (1420), and more specifically, sequentially arranged from an object side to an image side and between the rear-group rear lens element (1250) and the image plane (1510) comprises the IR-filter (1410) and the cover glass (1420), wherein the IR-filter (1410) and the cover glass (1420) are generally made of a plate optical material without affecting the overall focal length of the image taking optical system of the present invention. The image taking optical system further comprises an image sensor (1520) at the image plane (1510) for imaging a photographed object. If aspherical lens elements are used for each lens element of the front lens group (1G1) and rear lens group (1G2) of the present invention, these lens elements comply with the aspherical surface formula as given in Equation (15):

$$X(Y) = \frac{(Y^2/R)}{1 + \sqrt{(1-(1+K)(Y/R)^2)}} + \sum_i (A_i) \cdot (Y^i); \quad (15)$$

wherein, X is the relative height from a point on the aspherical surface with a distance Y from the optical axis to a tangent plane at the tip of the optical axis of the aspherical surface;

Y is the distance between a point on the curve of the aspherical surface and the optical axis;

R is the curvature radius;

K is the conic coefficient; and $A_i$ is the $i^{th}$ level aspherical surface coefficient.

The image taking optical system of the present invention has installations of the aforementioned front lens group (1G1), aperture stop (1300), rear lens group (1G2) and image sensor (1520), and if the half of the maximum view angle HFOV and the optical distortion at 80% of the maximum image height $DIST_8$ satisfy the relations (1), (2) and (14), then the field angle of the image taking optical system will not be too small for tending to provide an optical lens combination wither a wider angle. Therefore, the optical distortion will be lower for tending to provide a smaller image distortion.

In the image taking optical system of the present invention, if the refractive powers of the front lens group (1G1) and the rear lens group (1G2) are allocated appropriately, the summation of the refractive powers of the front lens group (1G1) will be much smaller than the summation of the refractive powers of the rear lens group (1G2) while satisfying the relation (7). If the focal length $f_F$ of the front lens group (1G1) and the focal length $f_R$ of the rear lens group (1G2) satisfy the relation (13), the light collection ability of the image taking optical system can be enhanced, and the total length of the image taking optical system will not be too large.

If the focal length f of the image taking optical system and the curvature radius $R_L$ of the image-side surface (1252) of the rear-group rear lens element (1250) satisfy the relation (6), the focal length of the rear-group rear lens element (1250) or the back focal length of the image taking optical system will not be too large, which helps reducing the total length of the image taking optical system to achieve a compact design. Similarly, if the ratio of the axial distance SL from the aperture stop (1300) to the image plane (1510) to the axial distance TTL from the object-side surface (1111) of the front-group first lens element (1110) to the image plane (1510) is limited to the relation (12), the total length of the image taking optical system can be reduced further, or if the ratio of the axial distance TTL from the object-side surface (1111) of the front-group first lens element (1110) to the image plane (1510) to the half of the diagonal length of an effective photosensitive area ImgH of the image sensor (1520) is limited to the relation (8), the total length (TTL) of the image taking optical system can be reduced effectively, such that a larger effective photosensitive area (ImgH) of the image sensor can be obtained from the same total length (TTL).

If the ratio Tgn/f of the axial distance Tgn between the image-side surface (1232) of the rear-group positive glass lens element (1230) and the object-side surface (1241) of the rear-group negative lens element (1240) to the focal length f of the image taking optical system satisfies the relation (5) to reduce the total length of image taking optical system, the light of the image exiting the image-side surface (1232) of the rear-group positive lens element (1230) will enter into the object-side surface (1241) of the rear-group negative lens element (1240) without being refracted at a too-large angle, so as to avoid a too-large aberration.

In the image taking optical system of the present invention, if the front lens group (1G1) has the front-group first lens element (1110), and if the ratio of the focal length f of the image taking optical system to the focal length $f_1$ of the front-group first lens element (1110) satisfies the relation (11), the ratio of the refractive power of the first lens element (1110) to the focal length f of the image taking optical system will fall within an appropriate range to increase the field angle to facilitate the wide-angle image taking function. The appropriate setup of the focal length $f_1$ of the first lens element (1110) facilitates the allocation of space after this lens element.

In the image taking optical system of the present invention, the main negative refractive power of the front lens group (1G1) comes from the front-group first lens element (1110), the main positive refractive power of the rear lens group (1G2) comes from the rear-group positive lens element (1230), and the main negative refractive power of the rear lens group (1G2) comes from the rear-group negative lens element (1240), such that if the relation between the curvature radius $R_1$ of the object-side surface (1111) of the front-group first lens element (1110) and the curvature radius $R_2$ of the image-side surface (1112) of the front-group first lens element (1110), the relation between the curvature radius $Rg_1$ of the object-side surface (1231) of the rear-group positive glass lens element (1230) and the curvature radius $Rg_2$ of the image-side surface (1232) of the rear-group positive glass lens element (1230), and the relation between the curvature radius $Rn_1$ of the object-side surface (1241) of the rear-group negative lens element (1240) and the curvature radius $Rn_2$ of the image-side surface (1242) of the rear-group negative lens element (1240) satisfy the relations (9), (3) and (4) respectively, the negative refractive power of the front-group first lens element (1110), the positive refractive power of the rear-group positive lens element (1230) and the negative refractive power of rear-group negative lens element (1240) will fall within an appropriate angel to enhance the resolution and correct the aberration and astigmatism effectively.

The image taking optical system of the present invention is described by preferred embodiments and related drawings in details as follows.

First Preferred Embodiment

Figure 1B:
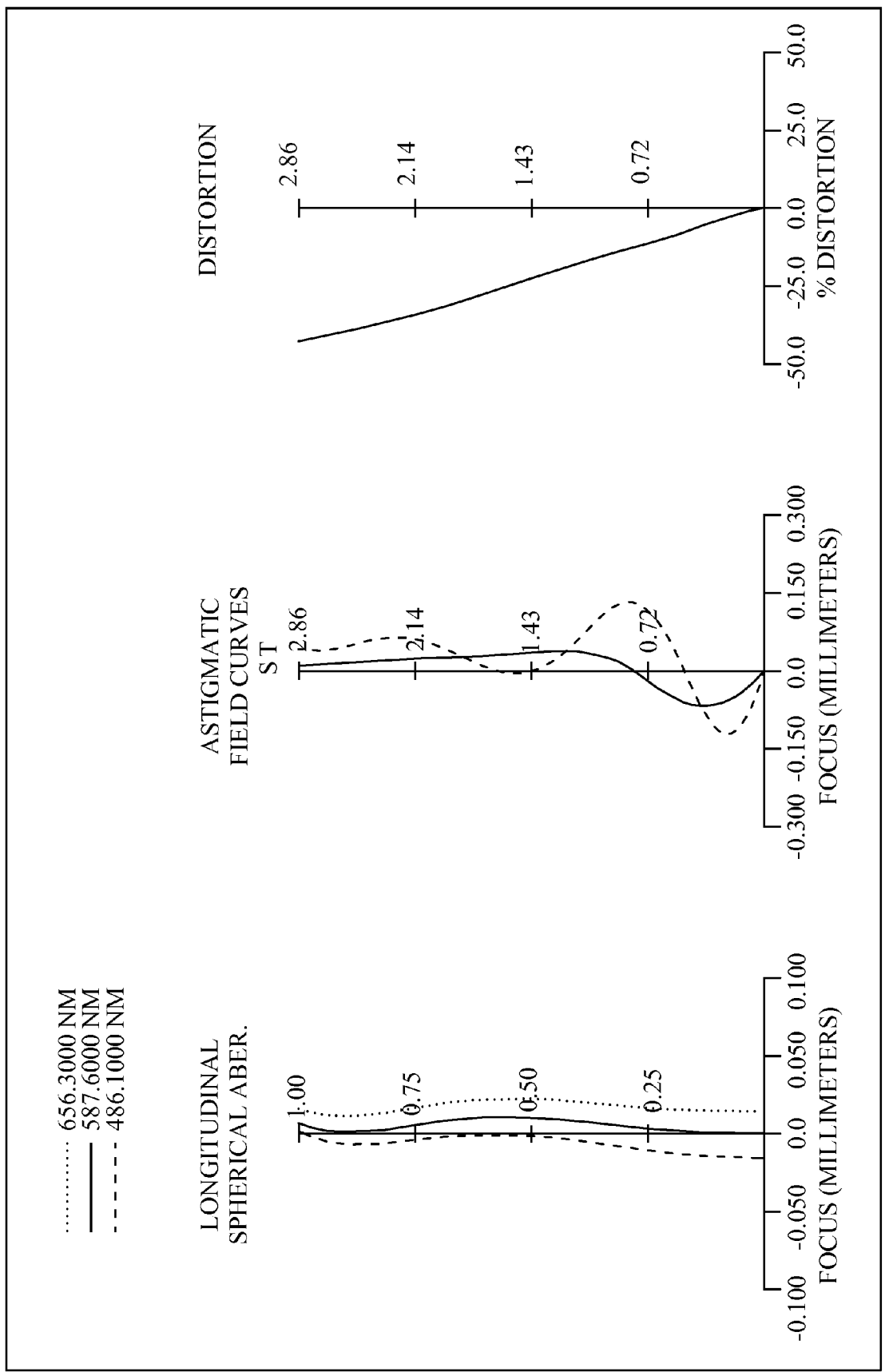
FIG. 1B is a schematic view of a series of aberration curves of the first preferred embodiment of the present invention.

With reference to FIGS. 1A and 1B for a schematic view of an optical system and a series of aberration curves in accordance with the first preferred embodiment of the present invention respectively and Table 1 for the optical data of this preferred embodiment, the image taking optical system comprises a front lens group (1G1), a aperture stop (1300) and a rear lens group (1G2), and the aperture stop (1300) is arranged between the front lens group (1G1) and the rear lens group (1G2). The front lens group (1G1) comprises a front-group first lens element (1110) (labeled as the first lens element in Table 1), and the rear lens group (1G2) comprises four lens elements, being respectively a rear-group first lens element (1210) (labeled as the second lens element in Table 1), a rear-group positive lens element (1230) (labeled as the third lens element in Table 1), a rear-group negative lens element (1240) (labeled as the fourth lens element in Table 1) and a rear-group rear lens element (1250) (labeled as the fifth lens element in Table 1). The meniscus front-group first lens element (1110) with negative refractive power has a convex object-side surface (1111) and a concave image-side surface (1112). The rear lens group (1G2) comprises four lens elements, being respectively the meniscus rear-group first lens element (1210) with positive refractive power having a convex object-side surface (1211); the rear-group positive glass lens element (1230) with positive refractive power being a bi-convex lens element, and both object-side surface (1231) and image-side surface (1232) being spheric; the meniscus rear-group negative lens element (1240) with negative refractive power having an image side adjacent to the rear-group positive lens element (1230) and a concave object-side surface (1241); the plastic rear-group rear lens element (1250) having a convex object-side surface (1251) and a concave image-side surface (1252), and both object-side surface (1251) and image-side surface (1252) thereof having an inflection point.

In the image taking optical system of this preferred embodiment, an IR-filter (1410) and a cover glass (1420) are installed sequentially from the object side to the image side and between the rear-group rear lens element (1250) and the image plane (1510), and generally made of plate optical material without affecting the overall focal length of the image taking optical system of the present invention. The image taking optical system of this preferred embodiment further comprises an image sensor (1520) at the image plane (1510) for imaging a photographed object.

TABLE 1

Optical data of this preferred embodiment
f = 6.16 mm, Fno = 2.80, HFOV = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.875357 (ASP) | 1.328 | Plastic | 1.530 | 55.8 | −29.79 |
| 2 | | 1.265205 (ASP) | 1.932 | | | | |
| 3 | Ape. Stop | Plano | 0.070 | | | | |
| 4 | Lens 2 | 5.470139 (ASP) | 0.811 | Plastic | 1.530 | 55.8 | 10.33 |
| 5 | | 7194.67097 (ASP) | 0.070 | | | | |
| 6 | Lens 3 | 4.331176 | 1.351 | Glass | 1.640 | 60.1 | 3.62 |
| 7 | | −4.392633 | 0.100 | | | | |
| 8 | Lens 4 | −11.686665 (ASP) | 0.507 | Plastic | 1.650 | 21.4 | −5.48 |
| 9 | | 5.209464 (ASP) | 0.680 | | | | |
| 10 | Lens 5 | 3.185043 (ASP) | 0.651 | Plastic | 1.530 | 55.8 | −116.74 |
| 11 | | 2.814553 (ASP) | 0.600 | | | | |
| 12 | IR-filter | Plano | 0.300 | Glass | 1.517 | 64.2 | — |
| 13 | | Plano | 0.400 | | | | |
| 14 | Cover-glass | Plano | 0.400 | Glass | 1.517 | 64.2 | — |
| 15 | | Plano | 0.769 | | | | |
| 16 | Image | Plano | — | | | | |

Note:
Reference wavelength is 587.6 nm. ASP stands for aspherical surfaces.

The optical data of this preferred embodiment are listed in the table above, wherein the optical surfaces (1111), (1112), (1211), (1212), (1241), (1242), (1251), (1252) are aspherical surfaces in compliance with the aspherical surface formula as given in Equation (15), and their aspheric coefficients are listed in Table 2 below.

TABLE 2

Aspheric coefficients of this preferred embodiment

| Surface # | 1 | 2 | 4 | 5 |
|---|---|---|---|---|
| k = | −4.03286E+00 | −1.60950E+00 | 1.64298E+01 | −1.50897E+09 |
| A4 = | 4.54889E−02 | 3.20471E−02 | −1.26675E−03 | 2.94663E−03 |
| A6 = | −1.28042E−02 | −1.86184E−02 | −1.35269E−02 | 1.11736E−03 |
| A8 = | 1.05708E−03 | 2.03593E−03 | 9.61447E−03 | −6.99908E−05 |
| A10 = | −2.47035E−05 | 5.69580E−05 | −5.57727E−03 | 5.87777E−05 |

TABLE 2-continued

Aspheric coefficients of this preferred embodiment

| Surface # | 8 | 9 | 10 | 11 |
|---|---|---|---|---|
| k = | 3.67474E+01 | −6.85832E+01 | −8.73125E+01 | −2.00000E+02 |
| A4 = | −3.41080E−02 | −8.64489E−03 | −5.08651E−02 | −7.06759E−02 |
| A6 = | −1.44674E−05 | −3.52037E−03 | 2.17410E−02 | 1.69818E−02 |
| A8 = | 2.04694E−03 | 7.61484E−04 | −3.59485E−03 | −2.67181E−04 |
| A10= | −1.50537E−04 | 3.41826E−05 | 2.39369E−04 | −1.04383E−04 |

With reference to Table 1 and the series of aberration curves as shown in FIG. 1B for the image taking optical system in accordance with this preferred embodiment, the focal length of the image taking optical system is f=6.16 (mm), and the overall aperture stop value (f-number) of the image taking optical system is Fno=2.80. After the optical data of this preferred embodiment are calculated and derived, the image taking optical system satisfies related relations as shown in Table 3 below, and the related symbols have been described above and thus will not be described again.

TABLE 3

Data of related relations of this preferred embodiment

| Relation | Data |
|---|---|
| HFOV | 39.2° |
| $DIST_8$ | −36.49% |
| $tan(HFOV)/DIST_8$ | −2.23 |
| $(Rg_1 + Rg_2)/(Rg_1 − Rg_2)$ | −0.01 |
| $(Rn_1 + Rn_2)/(Rn_1 − Rn_2)$ | 0.38 |
| $(R_1 − R_2)/(R_1 + R_2)$ | 0.19 |
| $R_L/f$ | 0.46 |
| $f_R/f_F$ | −0.14 |
| Tgn/f | 0.02 |
| $f/f_1$ | −0.21 |
| $\Sigma |P_F|/\Sigma |P_R|$ | 0.06 |
| TTL/ImgH | 3.41 |
| SL/TTL | 0.67 |

Figure 1C:
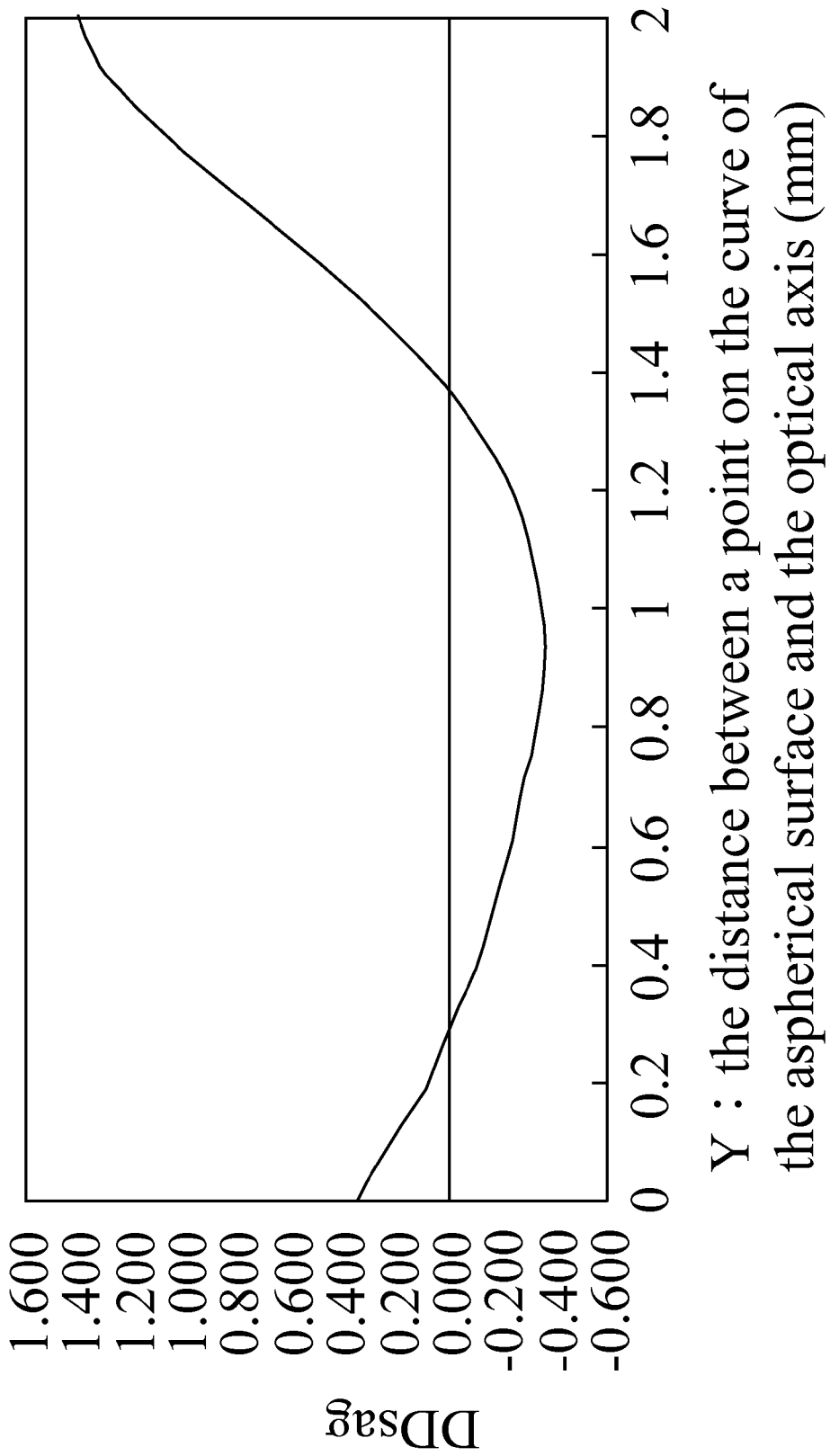
FIG. 1C is a curve showing the second derivatives of SAG values of an image-side surface of a rear-group rear lens element in accordance with the first preferred embodiment of the present invention.

With reference to FIG. 1C for a curve showing the second derivatives of SAG values of an image-side surface of a rear-group rear lens element in accordance with the first preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (1252) of the rear-group rear lens element (1250) equal to zero are found, indicating that there are two inflection points between the center and the periphery of the optical surface.

According to the optical data as shown in Table 1 and the series of aberration curves as shown in FIG. 1B, the image taking optical system in accordance with this preferred embodiment of the present invention provides good correction results in aspects of the longitudinal spherical aberration, astigmatic field curving, and distortion.

Second Preferred Embodiment

Figure 2A:
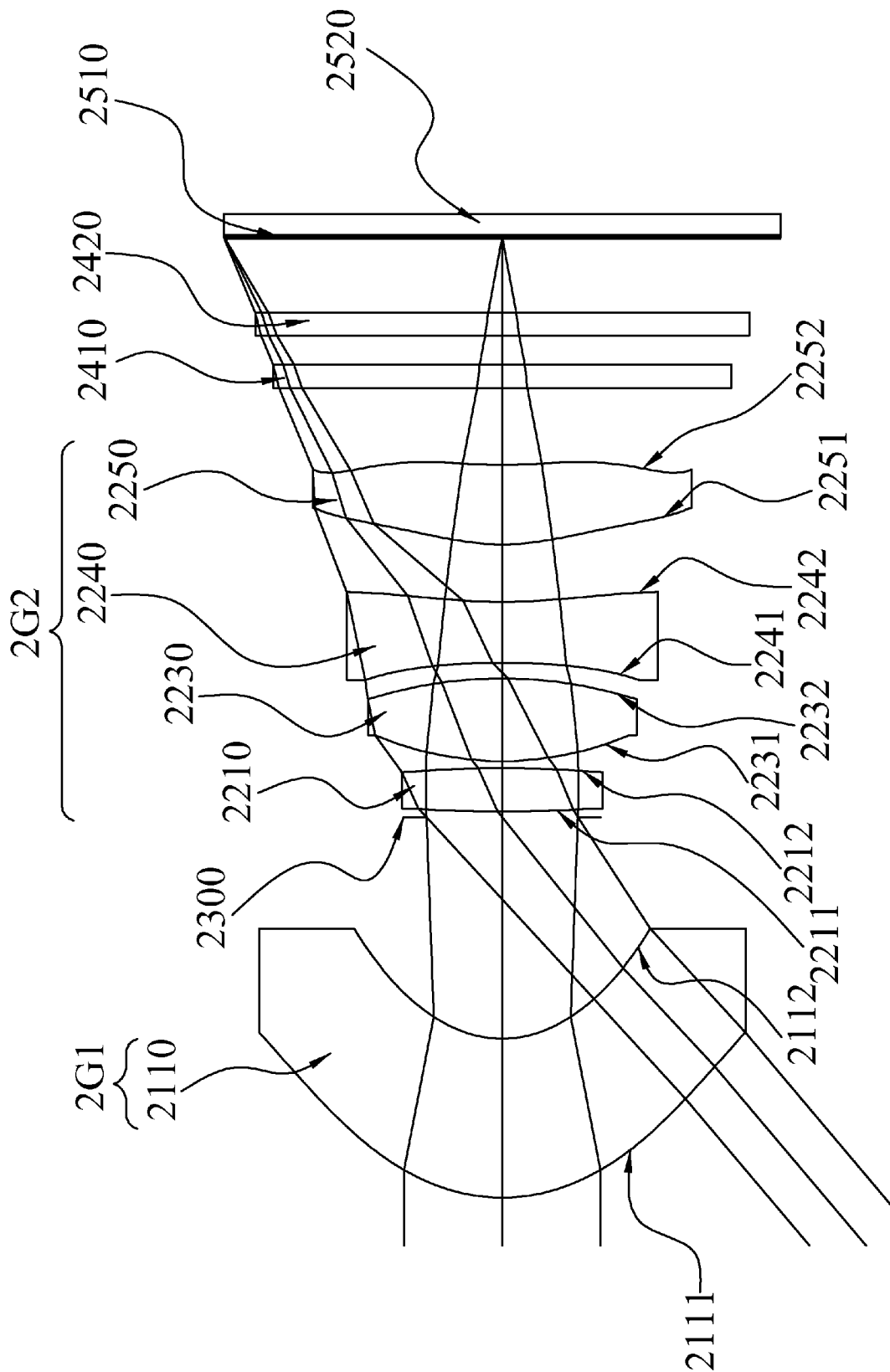
FIG. 2A is a schematic view of an optical system in accordance with the second preferred embodiment of the present invention.
Figure 2B:
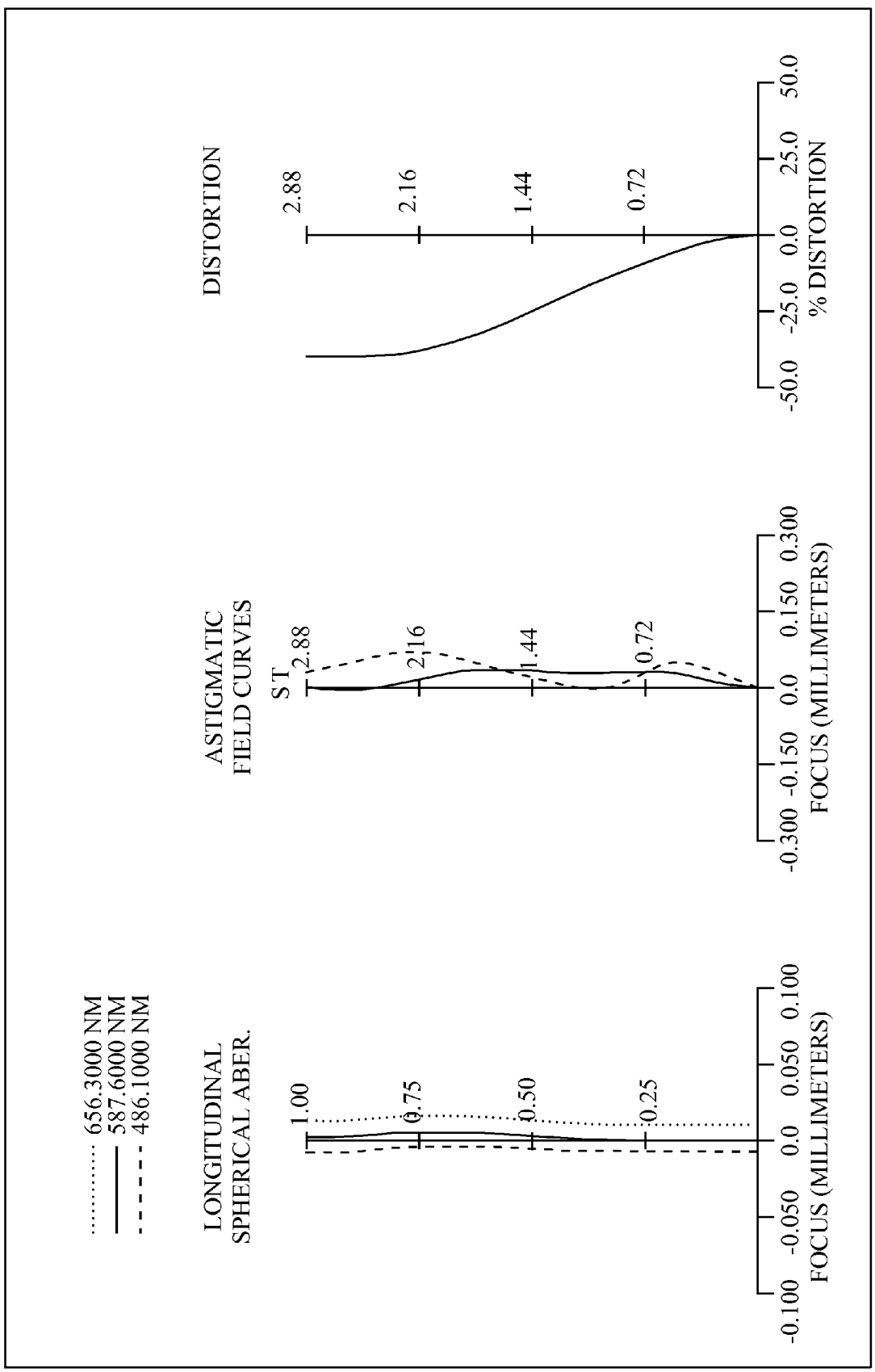
FIG. 2B is a schematic view of a series of aberration curves of the second preferred embodiment of the present invention.

With reference to FIGS. 2A and 2B for a schematic view of an optical system and a series of aberration curves in accordance with the second preferred embodiment of the present invention respectively and Table 4 for the optical data of this preferred embodiment, the image taking optical system comprises a front lens group (2G1), a aperture stop (2300) and a rear lens group (2G2), and the aperture stop (2300) is arranged between the front lens group (2G1) and the rear lens group (2G2). The front lens group (2G1) comprises a front-group first lens element (2110) (labeled as the first lens element in Table 4), and the rear lens group (2G2) comprises four lens elements, being respectively a rear-group first lens element (2210) (labeled as the second lens element in Table 4), a rear-group positive lens element (2230) (labeled as the third lens element in Table 4), a rear-group negative lens element (2240) (labeled as the fourth lens element in Table 4) and a rear-group rear lens element (2250) (labeled as the fifth lens element in Table 4). The meniscus front-group first lens element (2110) with negative refractive power has a convex object-side surface (2111) and a concave image-side surface (2112).

The rear lens group (2G2) comprises four lens elements, being respectively the meniscus rear-group first lens element (2210) with positive refractive power having a convex object-side surface (2211); the rear-group positive glass lens element (2230) with positive refractive power being a bi-convex lens element, and both object-side surface (2231) and image-side surface (2232) being spheric; the meniscus rear-group negative lens element (2240) with negative refractive power adjacent to an image side of the rear-group positive lens element (2230) having a concave object-side surface (2241) and a concave image-side surface (2242); the plastic rear-group rear lens element (2250) nearest to the image plane (2510) and having a convex object-side surface (2251) and a concave image-side surface (2252), and both object-side surface (2251) and image-side surface (2252) thereof having an inflection point.

The image taking optical system of this preferred embodiment further comprises an IR-filter (2410) and a cover glass (2420); the IR-filter (2410) and the cover glass (2420) are installed sequentially from the object side to the image side and between the rear-group rear lens element (2250) and the image plane (2510) and generally made of plate optical material without affecting the overall focal length of the image taking optical system of the present invention. The image taking optical system of this preferred embodiment further comprises an image sensor (2520) at the image plane (2510) for imaging a photographed object.

TABLE 4

Optical data of this preferred embodiment
f = 5.70 mm, Fno = 2.80, HFOV = 40.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.848069 (ASP) | 1.650 | Plastic | 1.543 | 56.5 | −35.75 |
| 2 | | 1.157062 (ASP) | 2.294 | | | | |
| 3 | Ape. Stop | Plano | 0.062 | | | | |
| 4 | Lens 2 | 16.818697 (ASP) | 0.450 | Plastic | 1.530 | 55.8 | 12.95 |
| 5 | | −11.491064 (ASP) | 0.070 | | | | |
| 6 | Lens 3 | 3.339595 | 0.859 | Glass | 1.517 | 64.2 | 3.88 |
| 7 | | −4.581920 | 0.162 | | | | |
| 8 | Lens 4 fourth lens | −8.784163 (ASP) | 0.631 | Plastic | 1.650 | 21.4 | −4.62 |
| 9 | element | 4.696016 (ASP) | 0.594 | | | | |
| 10 | Lens 5 | 2.123091 (ASP) | 0.827 | Plastic | 1.543 | 56.5 | 7.11 |
| 11 | | 4.065557 (ASP) | 0.800 | | | | |
| 12 | IR-filter | Plano | 0.240 | Glass glass | 1.517 | 64.2 | — |
| 13 | | Plano | 0.300 | | | | |
| 14 | Cover-glass | Plano | 0.240 | Glass glass | 1.517 | 64.2 | — |
| 15 | | Plano | 0.783 | | | | |
| 16 | Image | Plano | — | | | | |

Note:
Reference wavelength is 587.6 nm. ASP stands for aspherical surfaces.

The optical data of this preferred embodiment are listed in the table above, wherein the object-side surface (2111) of the front-group first lens element (2110), the image-side surface (2112) of the front-group first lens element (2110), the object-side surface (2211) of the rear-group first lens element (2210), the image-side surface (2212) of the rear-group first lens element (2210), the object-side surface (2241) of the rear-group negative lens element (2240), the image-side surface (2242) of the rear-group negative lens element (2240), the object-side surface (2251) of the rear-group rear lens element (2250) and the image-side surface (2252) of the rear-group rear lens element (2250) are aspherical surfaces in compliance with the aspherical surface formula as given in Equation (15), and their aspheric coefficients are listed in Table 5 below.

TABLE 5

Aspheric coefficients of this preferred embodiment

| Surface # | 1 | 2 | 4 | 5 |
|---|---|---|---|---|
| k = | −6.79506E−01 | −1.55217E+00 | 4.14346E+01 | 1.65822E−01 |
| A4 = | −2.59961E−03 | 8.05761E−02 | 4.62066E−03 | −1.13197E−03 |
| A6 = | 3.09985E−03 | −2.25318E−02 | −1.41429E−03 | 1.93250E−03 |
| A8 = | −1.60843E−03 | 3.62919E−03 | 8.45592E−03 | 2.99539E−03 |
| A10 = | 2.23984E−04 | 1.24508E−03 | −5.51044E−03 | −1.70408E−03 |
| A12 = | −1.18049E−05 | −3.51633E−04 | | |

| Surface # | 8 | 9 | 10 | 11 |
|---|---|---|---|---|
| k = | 1.33639E+01 | −1.00000E+02 | −1.25751E+01 | −9.45629E+01 |
| A4 = | −1.63797E−02 | 5.81510E−03 | −1.67122E−02 | −5.51503E−02 |
| A6 = | 7.60281E−04 | −4.47446E−03 | 4.40089E−03 | 1.14130E−02 |
| A8 = | 8.85636E−04 | 1.18234E−04 | −5.86342E−04 | −5.82246E−04 |
| A10 = | −1.83814E−04 | 2.06949E−04 | 1.04158E−04 | −8.55873E−05 |
| A12 = | 4.03858E−06 | −2.40534E−05 | 1.00669E−06 | 4.80358E−05 |
| A14 = | 1.07606E−06 | | | |

With reference to Table 4 and the series of aberration curves as shown in FIG. 2B for the image taking optical system in accordance with this preferred embodiment, the focal length of the image taking optical system is f=5.70 (mm), and the overall aperture stop value (f-number) of the image taking optical system is Fno=2.80. After the optical data of this preferred embodiment are calculated and derived, the image taking optical system satisfies related relations as shown in Table 6 below, and the related symbols have been described above and thus will not be described again.

TABLE 6

Data of related relations of this preferred embodiment

| Relation | Data |
| --- | --- |
| HFOV | 40.1° |
| $DIST_8$ | −39.47% |
| $tan(HFOV)/DIST_8$ | −2.13 |
| $(Rg_1 + Rg_2)/(Rg_1 − Rg_2)$ | −0.16 |
| $(Rn_1 + Rn_2)/(Rn_1 − Rn_2)$ | 0.30 |
| $(R_1 − R_2)/(R_1 + R_2)$ | 0.23 |
| $R_L/f$ | 0.71 |
| fR/fF | −0.11 |
| Tgn/f | 0.03 |
| $f/f_1$ | −0.16 |
| $\Sigma\ |P_F|/\Sigma\ |P_R|$ | 0.04 |
| TTL/ImgH | 3.41 |
| SL/TTL | 0.60 |

Figure 2C:
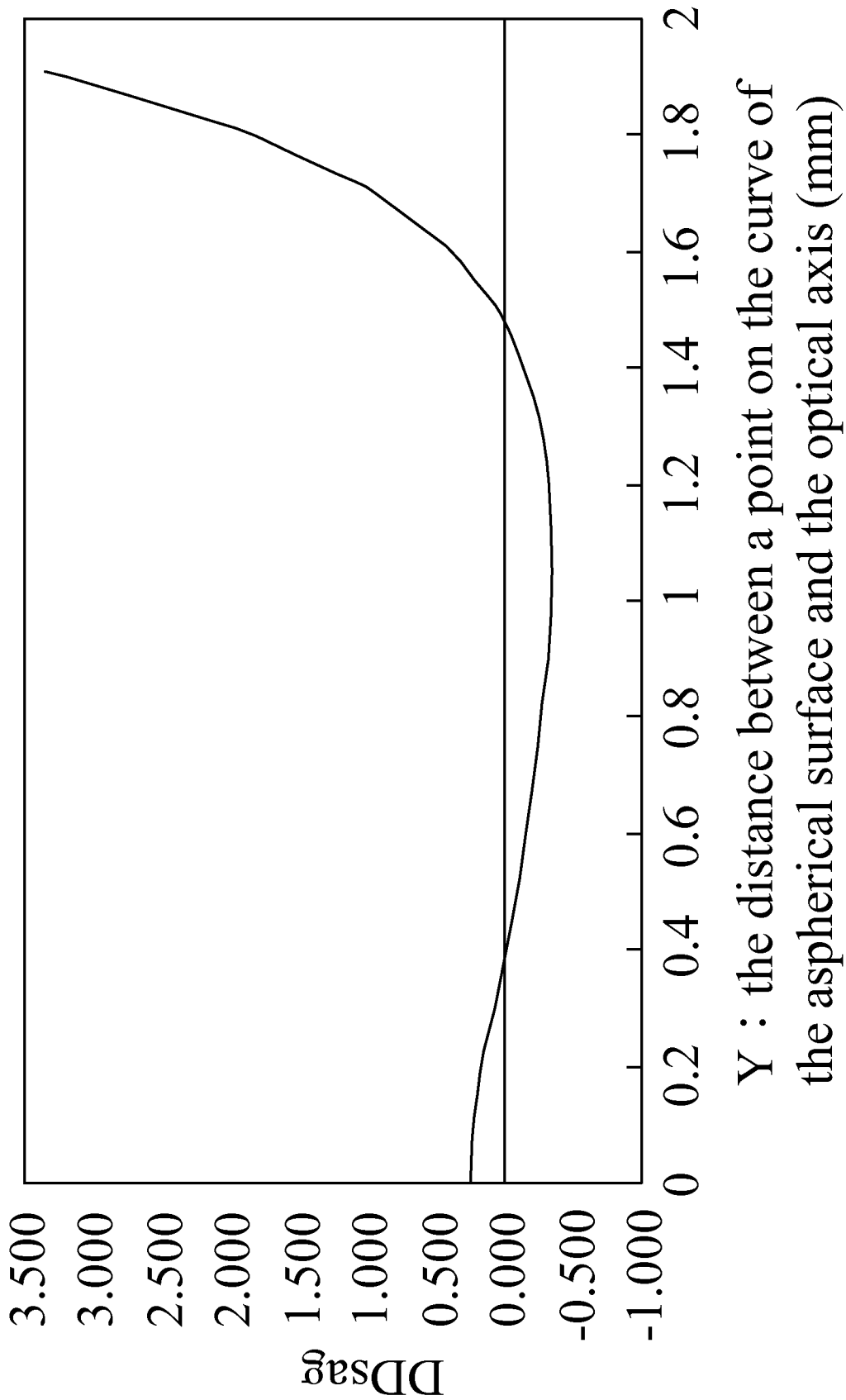
FIG. 2C is a curve showing the second derivatives of SAG values of an image-side surfaces of a rear-group rear lens element in accordance with the second preferred embodiment of the present invention.

With reference to FIG. 2C for a curve showing the second derivatives of SAG values of an image-side surface of a rear-group rear lens element in accordance with the second preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (2252) of the rear-group rear lens element (2250) equal to zero are found, indicating that there are two inflection points between the center and the periphery of the optical surface.

According to the optical data as shown in Table 4 and the series of aberration curves as shown in FIG. 2B, the image taking optical system in accordance with this preferred embodiment of the present invention provides good correction results in aspects of the longitudinal spherical aberration, astigmatic field curving, and distortion.

Third Preferred Embodiment

Figure 3A:
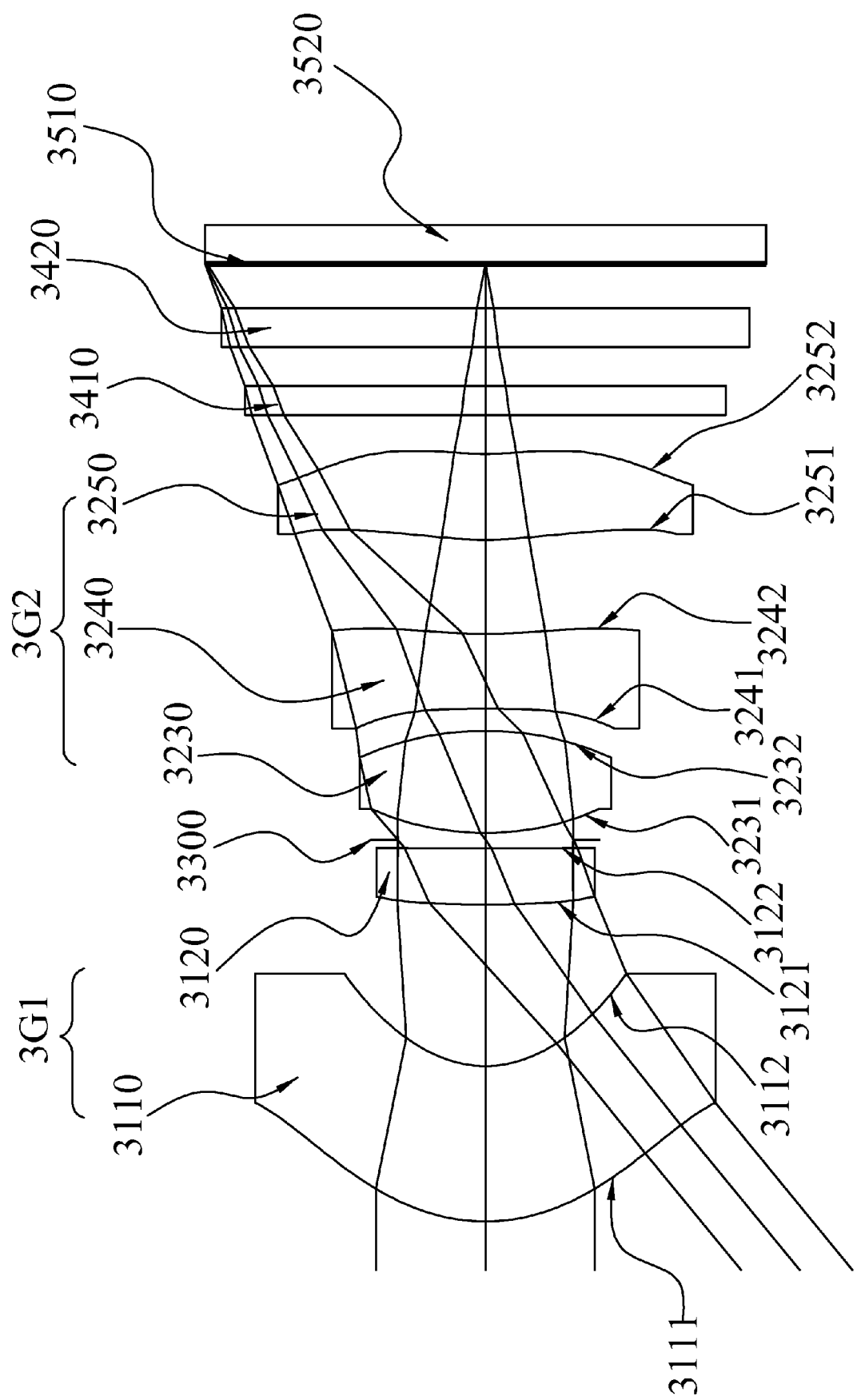
FIG. 3A is a schematic view of an optical system in accordance with the third preferred embodiment of the present invention.
Figure 3B:
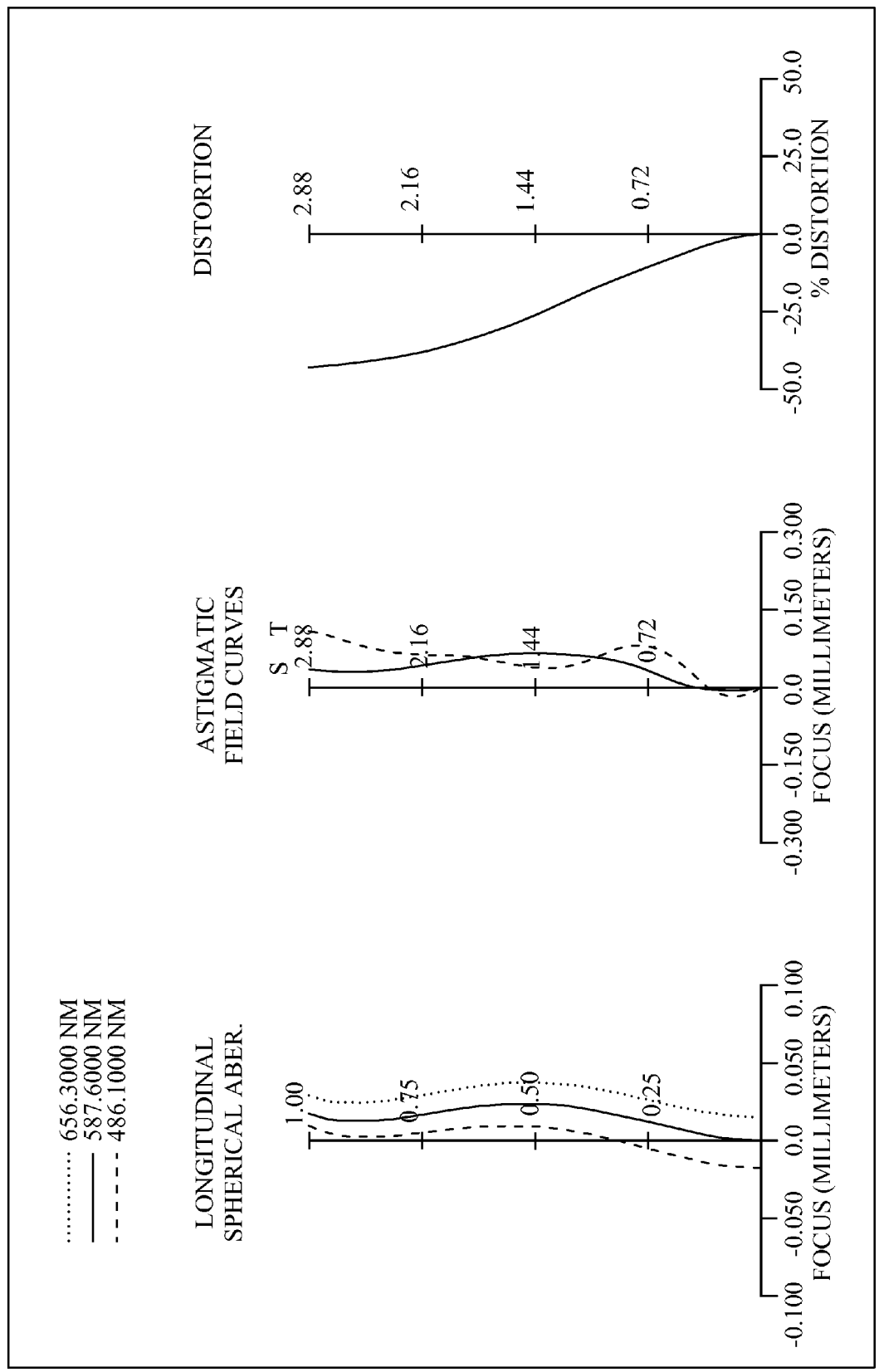
FIG. 3B is a schematic view of a series of aberration curves of the third preferred embodiment of the present invention.

With reference to FIGS. 3A and 3B for a schematic view of an optical system and a series of aberration curves in accordance with the third preferred embodiment of the present invention respectively and Table 7 for the optical data of this preferred embodiment, the image taking optical system comprises a front lens group (3G1), a aperture stop (3300) and a rear lens group (3G2), and the aperture stop (3300) is arranged between the front lens group (3G1) and the rear lens group (3G2). The front lens group (3G1) comprises a front-group first lens element (3110) (labeled as the first lens element in Table 7) and a front-group second lens element (3120) (labeled as the second lens element in Table 7). The rear lens group (3G2) comprises three lens elements, being respectively a rear-group positive lens element (3230) (labeled as the third lens element in Table 7), a rear-group negative lens element (3240) (labeled as the fourth lens element in Table 7) and a rear-group rear lens element (3250) (labeled as the fifth lens element in Table 7). The meniscus front-group first lens element (3110) with negative refractive power has a convex object-side surface (3111) and a concave image-side surface (3112), and the bi-convex front-group second lens element (3120) with positive refractive power has a convex object-side surface (3121) and a convex image-side surface (3122).

The rear lens group (3G2) comprises three lens elements, being respectively: the rear-group positive glass lens element (3230) with positive refractive power being a bi-convex lens element, and both object-side surface (3231) and image-side surface (3232) being spheric; the rear-group negative lens element (3240) with positive refractive power adjacent to an image side of the rear-group positive lens element (3230) having a concave object-side surface (3241) and a concave image-side surface (3242); the plastic rear-group rear lens element (3250) nearest to the image plane (3510) having a convex object-side surface (3251) and a concave image-side surface (3252), and both object-side surface (3251) and image-side surface (3252) thereof having an inflection point.

The image taking optical system of this preferred embodiment further comprises an IR-filter (3410) and a cover glass (3420); the IR-filter (3410) and the cover glass (3420) are installed sequentially from the object side to the image side and between the rear-group rear lens element (3250) and the image plane (3510) and generally made of plate optical material without affecting the overall focal length of the image taking optical system of the present invention. The image taking optical system of this preferred embodiment further comprises an image sensor (3520) at the image plane (3510) for imaging a photographed object.

TABLE 7

Optical data of this preferred embodiment
f = 6.30 mm, Fno = 2.80, HFOV = 39.3 deg.

| Surface # | | Curvature Radius | Thickness | Material | Index | Abbe # | Focal Length |
| --- | --- | --- | --- | --- | --- | --- | --- |
| 0 | Object | Plano | Infinity | | | | |
| 1 | Lens 1 | 1.881319 (ASP) | 1.601 | Plastic | 1.543 | 56.5 | −25.46 |
| 2 | | 1.162714 (ASP) | 1.665 | | | | |
| 3 | Lens 2 | 14.305028 (ASP) | 0.577 | Plastic | 1.544 | 55.9 | 25.90 |
| 4 | | −944.672579 (ASP) | 0.087 | | | | |
| 5 | Ape. Stop | Plano | 0.070 | | | | |
| 6 | Lens 3 | 2.913857 | 1.053 | Glass | 1.517 | 64.2 | 3.13 |
| 7 | | −3.178829 | 0.229 | | | | |
| 8 | Lens 4 | −13.781118 (ASP) | 0.771 | Plastic | 1.650 | 21.4 | −5.93 |
| 9 | | 5.468007 (ASP) | 0.967 | | | | |
| 10 | Lens 5 | 3.255871 (ASP) | 0.885 | Plastic | 1.514 | 56.8 | −129.40 |
| 11 | | 2.817421 (ASP) | 0.400 | | | | |
| 12 | IR-filter | Plano | 0.300 | Glass | 1.517 | 64.2 | — |
| 13 | | Plano | 0.400 | | | | |
| 14 | Cover-glass | Plano | 0.400 | Glass | 1.517 | 64.2 | — |
| 15 | | Plano | 0.455 | | | | |
| 16 | Image | Plano | — | | | | |

Note:
Reference wavelength is 587.6 nm. ASP stands for aspherical surfaces.

The optical data of this preferred embodiment are listed in the table above, wherein the object-side surface (3111) of the front-group first lens element (3110), the image-side surface (3112) of the front-group first lens element (3110), the object-side surface (3211) of the rear-group first lens element (3210), the object-side surface (3121) of the front-group second lens element (3120), the image-side surface (3122) of the front-group second lens element (3120), the object-side surface (3241) of the rear-group negative lens element (3240), the image-side surface (3242) of the rear-group negative lens element (3240), the object-side surface (3251) of the rear-group rear lens element (3250) and the image-side surface (3252) of the rear-group rear lens element (3250) are aspherical surfaces in compliance with the aspherical surface formula as given in Equation (15), and their aspheric coefficients are listed in Table 8 below.

TABLE 8

Aspheric coefficients of this preferred embodiment

| Surface # | 1 | 2 | 3 | 4 |
|---|---|---|---|---|
| k = | −3.10260E+00 | −1.26088E+00 | 4.80563E+01 | −9.00000E+01 |
| A4 = | 3.82257E−02 | 3.47337E−02 | 1.20676E−02 | 1.33734E−03 |
| A6 = | −7.62674E−03 | −1.00008E−02 | 3.48475E−03 | 9.51573E−03 |
| A8 = | 5.03862E−04 | 2.28620E−03 | 3.02566E−03 | −3.49397E−03 |
| A10 = | −1.78612E−05 | 4.86611E−04 | −3.39618E−04 | 2.45173E−03 |

| Surface # | 8 | 9 | 10 | 11 |
|---|---|---|---|---|
| k = | 7.89805E+01 | −6.84455E+01 | −5.63255E+01 | −1.00000E+02 |
| A4 = | −4.42173E−02 | −9.23685E−03 | −1.55171E−02 | −7.39478E−02 |
| A6 = | −2.93712E−03 | −7.96069E−03 | 4.59552E−03 | 1.78380E−02 |
| A8 = | 3.13982E−03 | 2.29393E−03 | −8.30147E−04 | −2.06466E−03 |
| A10 = | 2.26982E−04 | −1.90621E−05 | −2.61913E−06 | 1.15543E−04 |

With reference to Table 7 and the series of aberration curves as shown in FIG. 3B for the image taking optical system in accordance with this preferred embodiment, the focal length of the image taking optical system is f=6.30 (mm), and the overall aperture stop value (f-number) of the image taking optical system is Fno=2.80. After the optical data of this preferred embodiment are calculated and derived, the image taking optical system satisfies related relations as shown in Table 9 below, and the related symbols have been described above and thus will not be described again.

TABLE 9

Data of related relations of this preferred embodiment

| Relation | Data |
|---|---|
| HFOV | 39.3° |
| $DIST_8$ | −40.54% |
| $\tan(HFOV)/DIST_8$ | −2.02 |
| $(Rg_1 + Rg_2)/(Rg_1 - Rg_2)$ | −0.04 |
| $(Rn_1 + Rn_2)/(Rn_1 - Rn_2)$ | 0.43 |
| $(R_1 - R_2)/(R_1 + R_2)$ | 0.24 |
| $R_L/f$ | 0.45 |
| $f_R/f_F$ | −0.04 |
| $Tgn/f$ | 0.04 |
| $f/f_1$ | −0.25 |
| $\Sigma |P_F|/\Sigma |P_R|$ | 0.16 |
| TTL/ImgH | 3.34 |
| SL/TTL | 0.59 |

Figure 3C:
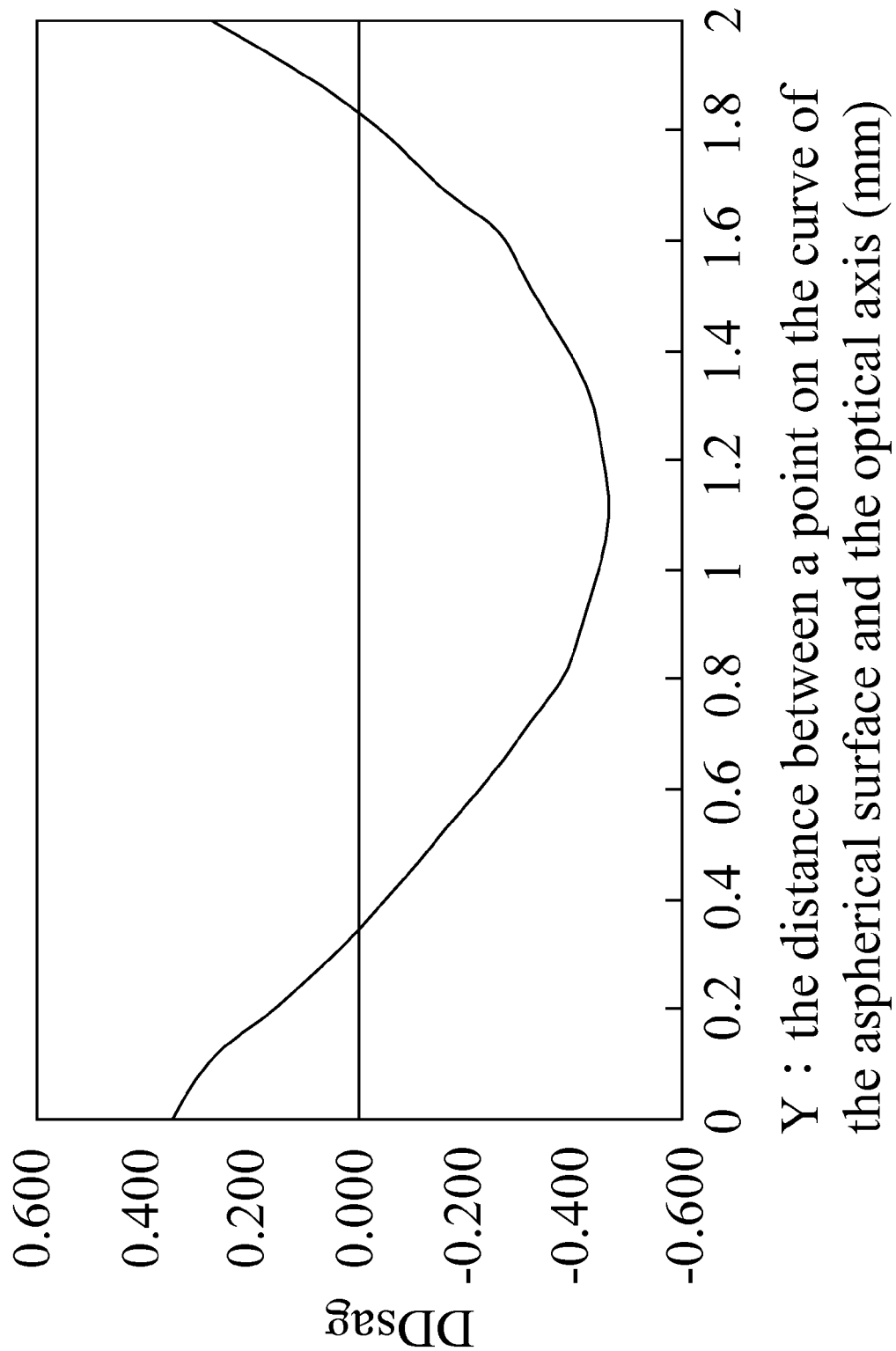
FIG. 3C is a curve showing the second derivatives of SAG values of an image-side surface of a rear-group rear lens element in accordance with the third preferred embodiment of the present invention.

With reference to FIG. 3C for a curve showing the second derivatives of SAG values of an image-side surface of a rear-group rear lens element in accordance with the third preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (3252) of the rear-group rear lens element (3250) equal to zero are found, indicating that there are two inflection points between the center and the periphery of the optical surface.

According to the optical data as shown in Table 7 and the series of aberration curves as shown in FIG. 3B, the image taking optical system in accordance with this preferred embodiment of the present invention provides good correction results in aspects of the longitudinal spherical aberration, astigmatic field curving, and distortion.

Fourth Preferred Embodiment

Figure 4A:
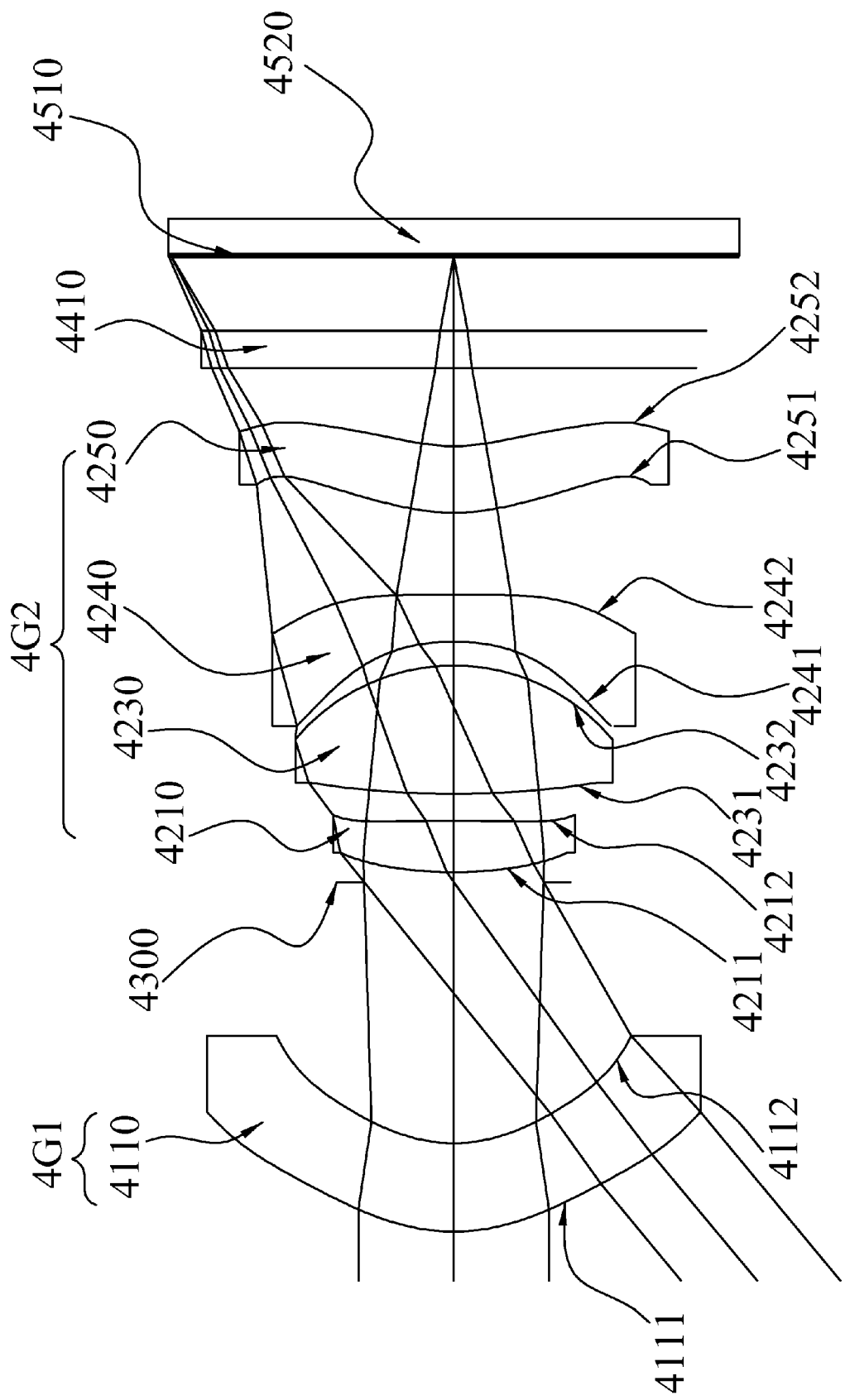
FIG. 4A is a schematic view of an optical system in accordance with the fourth preferred embodiment of the present invention.
Figure 4B:
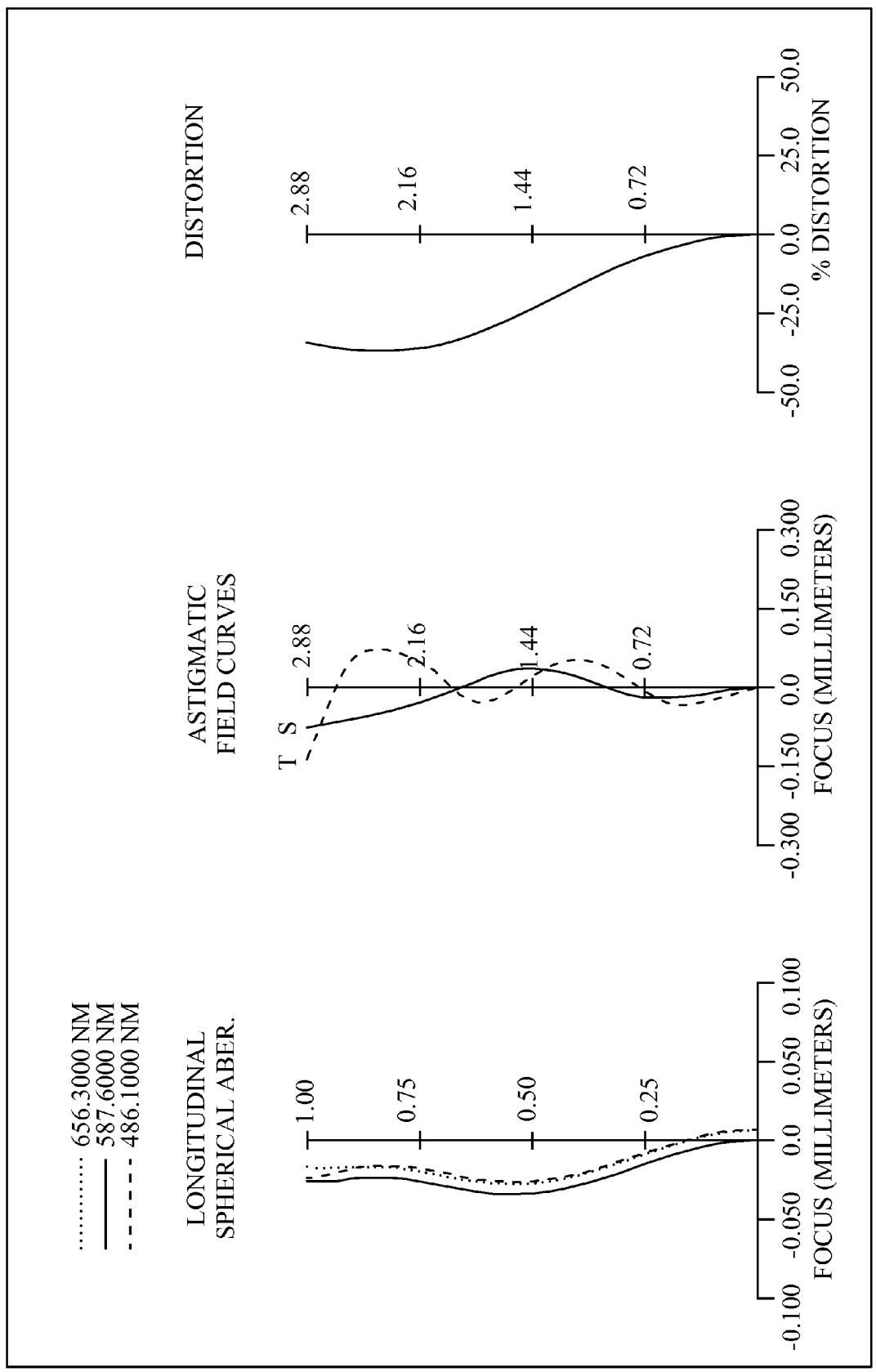
FIG. 4B is a schematic view of a series of aberration curves of the fourth preferred embodiment of the present invention.

With reference to FIGS. 4A and 4B for a schematic view of an optical system and a series of aberration curves in accordance with the fourth preferred embodiment of the present invention respectively and Table 10 for the optical data of this preferred embodiment, the image taking optical system comprises a front lens group (4G1), a aperture stop (4300) and a rear lens group (4G2), and the aperture stop (4300) is arranged between the front lens group (4G1) and the rear lens group (4G2). The front lens group (4G1) comprises a front-group first lens element (4110) (labeled as the first lens element in Table 10), and the rear lens group (4G2) comprises four lens elements, being respectively a rear-group first lens element (4210) (labeled as the second lens element in Table 10), a rear-group positive lens element (4230) (labeled as the third lens element in Table 10), a rear-group negative lens element (4240) (labeled as the fourth lens element in Table 10) and a rear-group rear lens element (4250) (labeled as the fifth lens element in Table 10). The meniscus front-group first lens element (4110) with negative refractive power has a convex object-side surface (4111) and a concave image-side surface (4112).

The rear lens group (4G2) comprises four lens elements, being respectively: the meniscus rear-group first lens element (4210) with positive refractive power having a convex object-side surface (4211); the rear-group positive glass lens element (4230) with positive refractive power being a bi-convex lens element, and both object-side surface (4231) and image-side surface (4232) being spheric; the meniscus rear-group negative lens element (4240) with negative refractive power adjacent to an image side of the rear-group positive lens element (4230) having a concave object-side surface (4241) and a concave image-side surface (2242); the plastic rear-group rear lens element (4250) nearest to the image plane (4510)

and having a convex object-side surface (4251) and a concave image-side surface (4252), and both object-side surface (4251) and image-side surface (4252) thereof having an inflection point.

In the image taking optical system of this preferred embodiment, an IR-filter (4410) is installed between the rear-group rear lens element (4250) and the image plane (4510) and generally made of plate optical material without affecting the overall focal length of the image taking optical system of the present invention. The image taking optical system of this preferred embodiment further comprises an image sensor (4520) at the image plane (4510) for imaging a photographed object.

TABLE 10

Optical data of this preferred embodiment
f = 5.43 mm, Fno = 2.83, HFOV = 39.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.988658 (ASP) | 0.900 | Plastic | 1.535 | 56.3 | −37.09 |
| 2 | | 1.522449 (ASP) | 2.660 | | | | |
| 3 | Ape. Stop | Plano | 0.102 | | | | |
| 4 | Lens 2 | 4.283176 (ASP) | 0.524 | Plastic | 1.514 | 56.8 | 7.15 |
| 5 | | −24.578012 (ASP) | 0.269 | | | | |
| 6 | Lens 3 | 9.035901 | 1.312 | Glass | 1.580 | 53.7 | 3.08 |
| 7 | | −2.107013 | 0.243 | | | | |
| 8 | Lens 4 | −2.134338 (ASP) | 0.476 | Plastic | 1.650 | 21.4 | −3.17 |
| 9 | | 61.304907 (ASP) | 0.835 | | | | |
| 10 | Lens 5 | 1.912165 (ASP) | 0.679 | Plastic | 1.633 | 23.4 | 100.78 |
| 11 | | 1.699974 (ASP) | 0.800 | | | | |
| 12 | IR-filter | Plano | 0.376 | Glass | 1.517 | 64.2 | — |
| 13 | | Plano | 0.765 | | | | |
| 14 | Image | Plano | — | | | | |

Note:
Reference wavelength is 587.6 nm. ASP stands for aspherical surfaces.

The optical data of this preferred embodiment are listed in the table above, wherein the object-side surface (4111) of the front-group first lens element (4110), the image-side surface (4112) of the front-group first lens element (4110), the object-side surface (4211) of the rear-group first lens element (4210), the image-side surface (4212) of the rear-group first lens element (4210), the object-side surface (4241) of the rear-group negative lens element (4240), the image-side surface (4242) of the rear-group negative lens element (4240), the object-side surface (4251) of the rear-group rear lens element (4250) and the image-side surface (4252) of the rear-group rear lens element (4250) are aspherical surfaces in compliance with the aspherical surface formula as given in Equation (15), and their aspheric coefficients are listed in Table 11 below.

TABLE 11

Aspheric coefficients of this preferred embodiment

| Surface # | 1 | 2 | 4 | 5 |
|---|---|---|---|---|
| k = | −5.77348E−01 | −9.55247E−01 | −1.31617E+00 | 3.62229E+01 |
| A4 = | −1.22174E−02 | −1.84326E−02 | 9.99992E−03 | 4.47757E−03 |
| A6 = | −8.65641E−03 | −8.73300E−03 | 6.77224E−03 | 2.76950E−02 |
| A8 = | 2.03421E−03 | 4.26018E−03 | −1.47454E−03 | −3.48480E−02 |
| A10 = | −1.36269E−04 | 6.30886E−05 | −4.90020E−03 | 3.42719E−02 |
| A12 = | | | 2.45912E−02 | −8.72849E−03 |
| A14 = | | | −2.07557E−02 | |
| A16 = | | | 5.25255E−03 | |

| Surface # | 8 | 9 | 10 | 11 |
|---|---|---|---|---|
| k = | 2.71295E−01 | −7.98406E+01 | −1.09161E+01 | −1.29001E+01 |
| A4 = | −4.46121E−02 | −5.39060E−02 | 6.89266E−03 | −3.46137E−02 |
| A6 = | −9.17001E−03 | 4.72297E−03 | −1.75589E−03 | 1.28913E−02 |
| A8 = | 9.74530E−03 | −5.91008E−04 | 8.85263E−04 | −1.53535E−03 |
| A10 = | −4.59495E−04 | 2.07288E−04 | −4.48212E−04 | −4.41584E−04 |
| A12 = | | | −2.34337E−05 | 7.80879E−05 |
| A14 = | | | 9.27757E−06 | |

With reference to Table 10 and the series of aberration curves as shown in FIG. 4B for the image taking optical system in accordance with this preferred embodiment, the focal length of the image taking optical system is f=5.43 (mm), and the overall aperture stop value (f-number) of the image taking optical system is Fno=2.83. After the optical data of this preferred embodiment are calculated and derived, the image taking optical system satisfies related relations as shown in Table 12 below, and the related symbols have been described above and thus will not be described again.

TABLE 12

Data of related relations of this preferred embodiment

| Relation | Data |
|---|---|
| HFOV | 39.6° |
| $DIST_8$ | −38.61% |
| $\tan(HFOV)/DIST_8$ | −2.14 |
| $(Rg_1 + Rg_2)/(Rg_1 − Rg_2)$ | 0.62 |
| $(Rn_1 + Rn_2)/(Rn_1 − Rn_2)$ | −0.93 |
| $(R_1 − R_2)/(R_1 + R_2)$ | 0.13 |
| $R_L/f$ | 0.31 |
| $f_R/f_F$ | −0.11 |
| $Tgn/f$ | 0.04 |
| $f/f_1$ | −0.15 |
| $\Sigma |P_F|/\Sigma |P_R|$ | 0.03 |
| TTL/ImgH | 3.41 |
| SL/TTL | 0.64 |

Figure 4C:
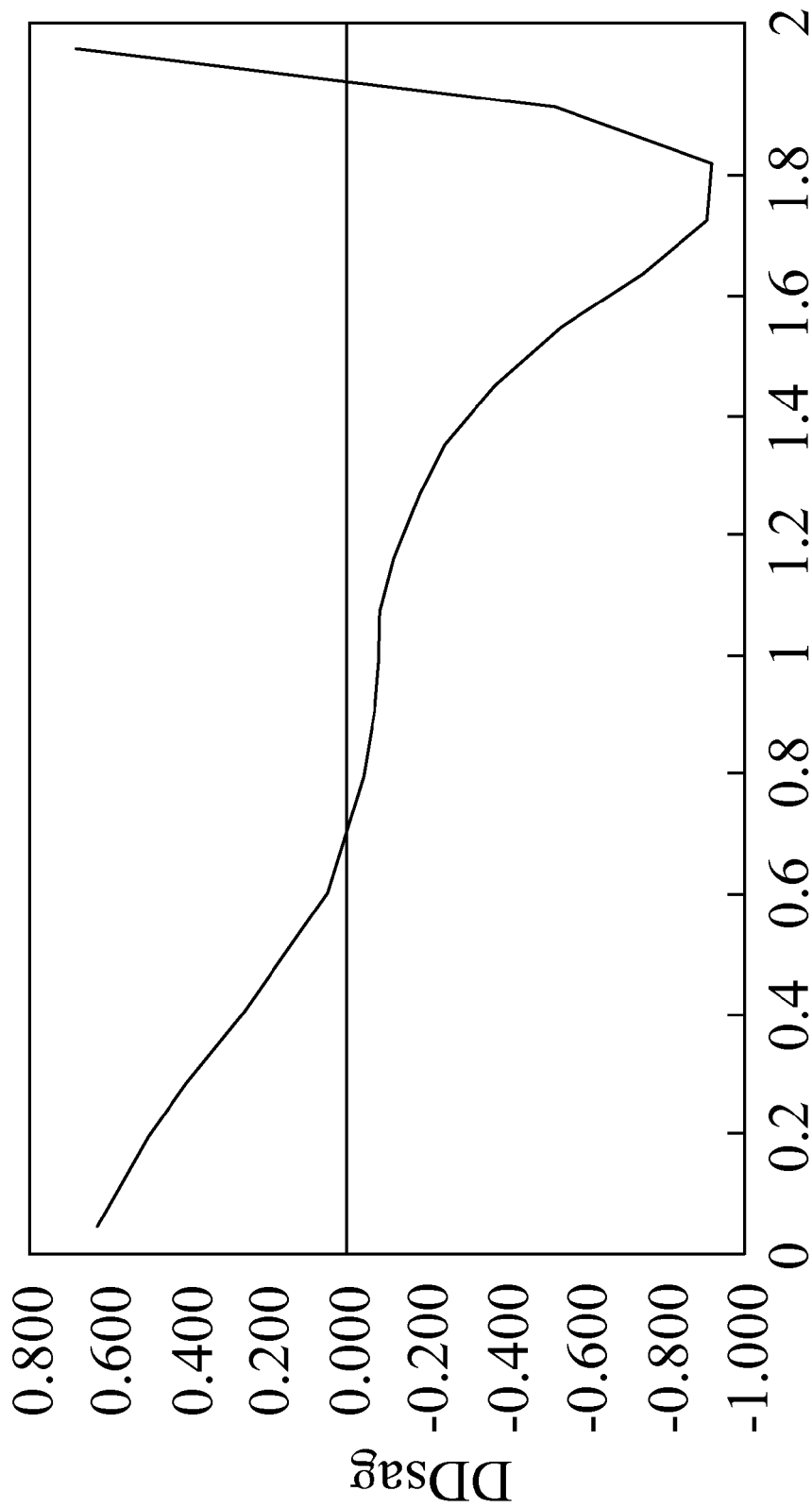
FIG. 4C is a curve showing the second derivatives of SAG values of an image-side surface of a rear-group rear lens element in accordance with the fourth preferred embodiment of the present invention.

With reference to FIG. 4C for a curve showing the second derivatives of SAG values of an image-side surface of a rear-group rear lens element in accordance with the fourth preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (4252) of the rear-group rear lens element (4250) equal to zero are found, indicating that there are two inflection points between the center and the periphery of the optical surface.

According to the optical data as shown in Table 10 and the series of aberration curves as shown in FIG. 4B, the image taking optical system in accordance with this preferred embodiment of the present invention provides good correction results in aspects of the longitudinal spherical aberration, astigmatic field curving, and distortion.

Fifth Preferred Embodiment

Figure 5A:
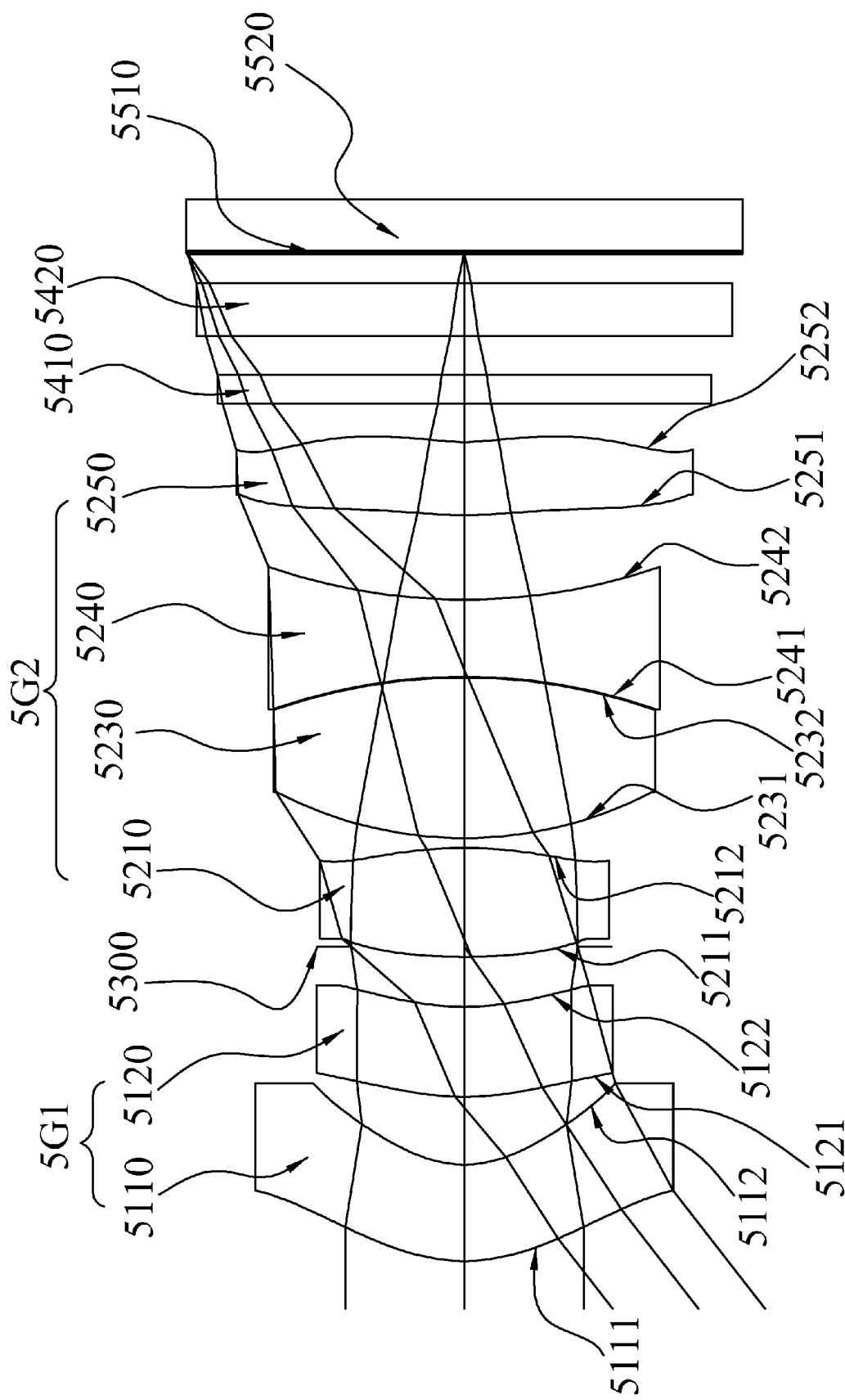
FIG. 5A is a schematic view of an optical system in accordance with the fifth preferred embodiment of the present invention.
Figure 5B:
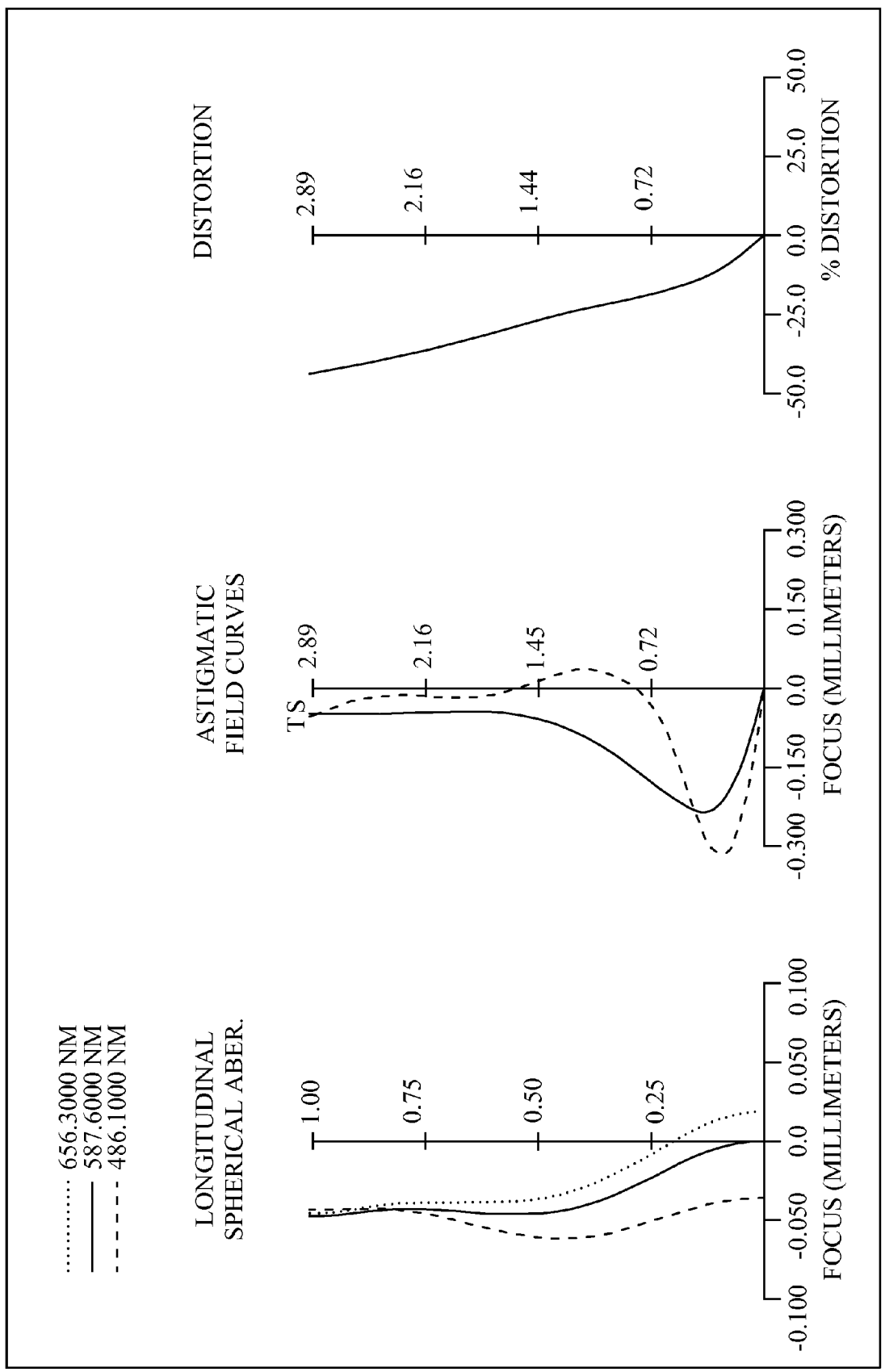
FIG. 5B is a schematic view of a series of aberration curves of the fifth preferred embodiment of the present invention.

With reference to FIGS. 5A and 5B for a schematic view of an optical system and a series of aberration curves in accordance with the fifth preferred embodiment of the present invention respectively and Table 13 for the optical data of this preferred embodiment, the image taking optical system comprises a front lens group (5G1), a aperture stop (5300) and a rear lens group (5G2), and the aperture stop (5300) is arranged between the front lens group (5G1) and the rear lens group (5G2). The front lens group (5G1) comprises a front-group first lens element (5110) (labeled as the first lens element in Table 13) and a front-group second lens element (5120) (labeled as the second lens element in Table 13). The rear lens group (5G2) comprises four lens elements, being respectively a rear-group first lens element (5210) (labeled as the third lens element in Table 13), a rear-group positive lens element (5230) (labeled as the fourth lens element in Table 13), a rear-group negative lens element (5240) (labeled as the fifth lens element in Table 13) and a rear-group rear lens element (5250) (labeled as the sixth lens element in Table 13). The meniscus front-group first lens element (5110) with negative refractive power has a convex object-side surface (5111) and a concave image-side surface (5112), and the meniscus front-group second lens element (5120) with positive refractive power has a concave image-side surface (5122).

The rear lens group (5G2) comprises four lens elements, being respectively: the rear-group first lens element (5210) with positive refractive power being a bi-convex lens element; a bi-convex rear-group positive glass lens element (5230) with positive refractive power having both spherical object-side surface (5231) and image-side surface (5232); a bi-concave glass rear-group negative lens element (5240) with negative refractive power adjacent to an image side of the rear-group positive lens element (5230) having both spherical object-side surface (5241) and image-side surface (5242), and the rear-group positive lens element (5230) and the rear-group negative lens element (5240) being cemented to form a cemented lens element; the plastic rear-group rear lens element (5250) nearest to the image plane (5510) having a convex object-side surface (5251) and a concave image-side surface (5252), and both object-side surface (5251) and image-side surface (5252) thereof having an inflection point.

The image taking optical system of this preferred embodiment further comprises an IR-filter (5410) and a cover glass (5420); the IR-filter (5410) and the cover glass (5420) are installed sequentially from the object side to the image side and between the rear-group rear lens element (5250) and the image plane (5510), and generally made of plate optical material without affecting the overall focal length of the image taking optical system of the present invention. The image taking optical system of this preferred embodiment further comprises an image sensor (5520) at the image plane (5510) for imaging a photographed object.

TABLE 13

Optical data of this preferred embodiment
f = 6.92 mm, Fno = 2.80, HFOV = 37.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.863299 (ASP) | 1.000 | Plastic | 1.544 | 55.9 | −10.55 |
| 2 | | 1.140575 (ASP) | 0.704 | | | | |
| 3 | Lens 2 | 2.880590 (ASP) | 0.935 | Plastic | 1.583 | 30.2 | 44.12 |
| 4 | | 2.855661 (ASP) | 0.624 | | | | |
| 5 | Ape. Stop | Plano | −0.104 | | | | |
| 6 | Lens 3 | 6.676953 (ASP) | 1.130 | Plastic | 1.514 | 56.8 | 5.15 |
| 7 | | −4.133783 (ASP) | 0.100 | | | | |
| 8 | Lens 4 | 4.224554 | 1.667 | Glass | 1.788 | 47.4 | 3.39 |

TABLE 13-continued

Optical data of this preferred embodiment
f = 6.92 mm, Fno = 2.80, HFOV = 37.9 deg.

| Surface # | | Curvature Radius | Thickness | Material | Index | Abbe # | Focal Length |
|---|---|---|---|---|---|---|---|
| 9 | | −6.025057 | 0.010 | | | | |
| 10 | Lens 5 | −6.025057 | 0.800 | Glass | 1.847 | 23.8 | −3.53 |
| 11 | | 6.277049 | 0.875 | | | | |
| 12 | Lens 6 | 2.544337 (ASP) | 0.760 | Plastic | 1.583 | 30.2 | −5.12 |
| 13 | | 1.223142 (ASP) | 0.400 | | | | |
| 14 | IR-filter | Plano | 0.300 | Glass | 1.517 | 64.2 | — |
| 15 | | Plano | 0.400 | | | | |
| 16 | Cover-glass | Plano | 0.550 | Glass | 1.517 | 64.2 | — |
| 17 | | Plano | 0.318 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (5111) of the front-group first lens element (5110), the image-side surface (5112) of the front-group first lens element (5110), the object-side surface (5121) of the front-group second lens element (5120), the image-side surface (5122) of the front-group second lens element (5120), the object-side surface (5211) of the rear-group first lens element (5210), the image-side surface (5212) of the rear-group first lens element (5210), the object-side surface (5251) and the image-side surface (5252) of the rear-group rear lens element (5250) are aspherical surfaces in compliance with the aspherical surface formula as given in Equation (15), and their aspheric coefficients are listed in Table 14 below.

TABLE 14

Aspheric coefficients of this preferred embodiment

| Surface # | 1 | 2 | 3 | 4 |
|---|---|---|---|---|
| k = | −7.99143E−01 | −1.72721E+00 | −5.36830E+00 | −5.24910E+00 |
| A4 = | −2.88656E−02 | −1.33703E−02 | −1.85227E−02 | −3.79518E−03 |
| A6 = | −9.95039E−04 | −3.93740E−04 | −1.41260E−03 | −3.47648E−03 |
| A8 = | 4.49781E−04 | 1.41327E−03 | 1.76862E−03 | 1.14189E−03 |
| A10 = | −4.75272E−05 | 3.40331E−04 | −1.73496E−04 | −6.34992E−04 |

| Surface # | 6 | 7 | 12 | 13 |
|---|---|---|---|---|
| k = | −1.94601E+00 | −2.81300E+00 | −1.53870E+02 | −1.00000E+02 |
| A4 = | 2.07777E−02 | 7.50058E−03 | −1.19989E−02 | −3.38929E−02 |
| A6 = | 3.85593E−03 | 5.84512E−03 | 2.90767E−03 | 3.89263E−03 |
| A8 = | 1.01956E−05 | −5.24603E−04 | −2.96223E−05 | 1.50617E−04 |
| A10 = | −9.55099E−05 | 6.24809E−04 | −2.05433E−05 | −3.03511E−05 |
| A12 = | | | 2.02518E−06 | 3.02650E−06 |

With reference to Table 13 and the series of aberration curves as shown in FIG. 5B for the image taking optical system in accordance with this preferred embodiment, the focal length of the image taking optical system is f=6.92 (mm), and the overall aperture stop value (f-number) of the image taking optical system is Fno=2.80. After the optical data of this preferred embodiment are calculated and derived, the image taking optical system satisfies related relations as shown in Table 14 below, and the related symbols have been described above and thus will not be described again.

TABLE 14

Data of related relations of this preferred embodiment

| Relation | Data |
|---|---|
| HFOV | 37.9° |
| $DIST_8$ | −40.05% |
| $\tan(HFOV)/DIST_8$ | −1.94 |
| $(Rg_1 + Rg_2)/(Rg_1 − Rg_2)$ | −0.18 |
| $(Rn_1 + Rn_2)/(Rn_1 − Rn_2)$ | −0.02 |
| $(R_1 − R_2)/(R_1 + R_2)$ | 0.24 |
| $R_L/f$ | 0.18 |
| $f_R/f_F$ | −0.25 |
| $T_{gn}/f$ | 0.00 |

TABLE 14-continued

Data of related relations of this preferred embodiment

| Relation | Data |
|---|---|
| $f/f_1$ | −0.66 |
| $\Sigma |P_F|/\Sigma |P_R|$ | 0.12 |
| TTL/ImgH | 3.53 |
| SL/TTL | 0.68 |

Figure 5C:
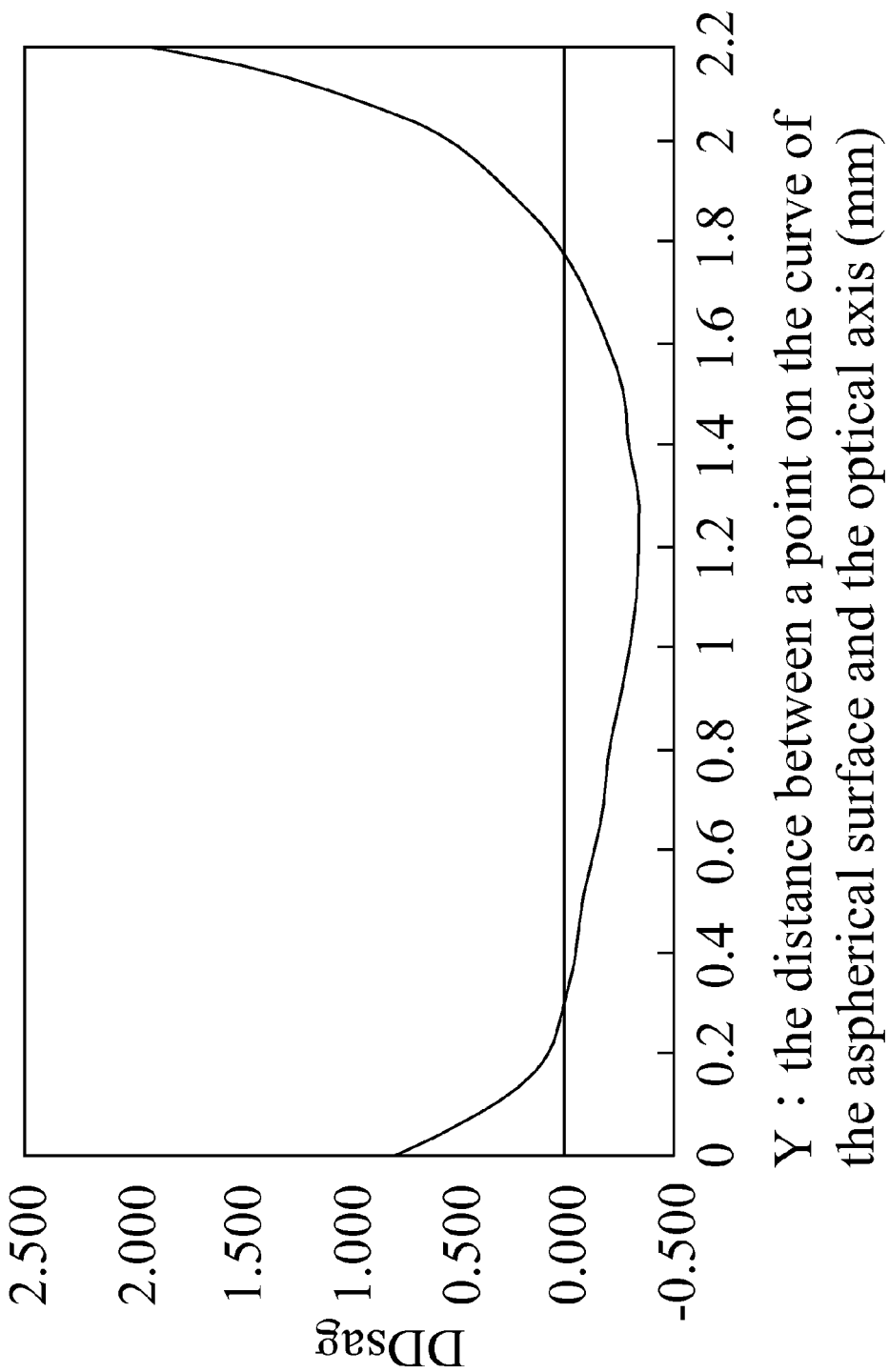
FIG. 5C is a curve showing the second derivatives of SAG values of an image-side surface of a rear-group rear lens element in accordance with the fifth preferred embodiment of the present invention.

With reference to FIG. 5C for a curve showing the second derivatives of SAG values of an image-side surface of a rear-group rear lens element in accordance with the fifth preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (5252) of the rear-group rear lens element (5250) equal to zero are found, indicating that there are two inflection points between the center and the periphery of the optical surface.

According to the optical data as shown in Table 13 and the series of aberration curves as shown in FIG. 5B, the image taking optical system in accordance with this preferred embodiment of the present invention provides good correction results in aspects of the longitudinal spherical aberration, astigmatic field curving, and distortion.

Sixth Preferred Embodiment

Figure 6A:
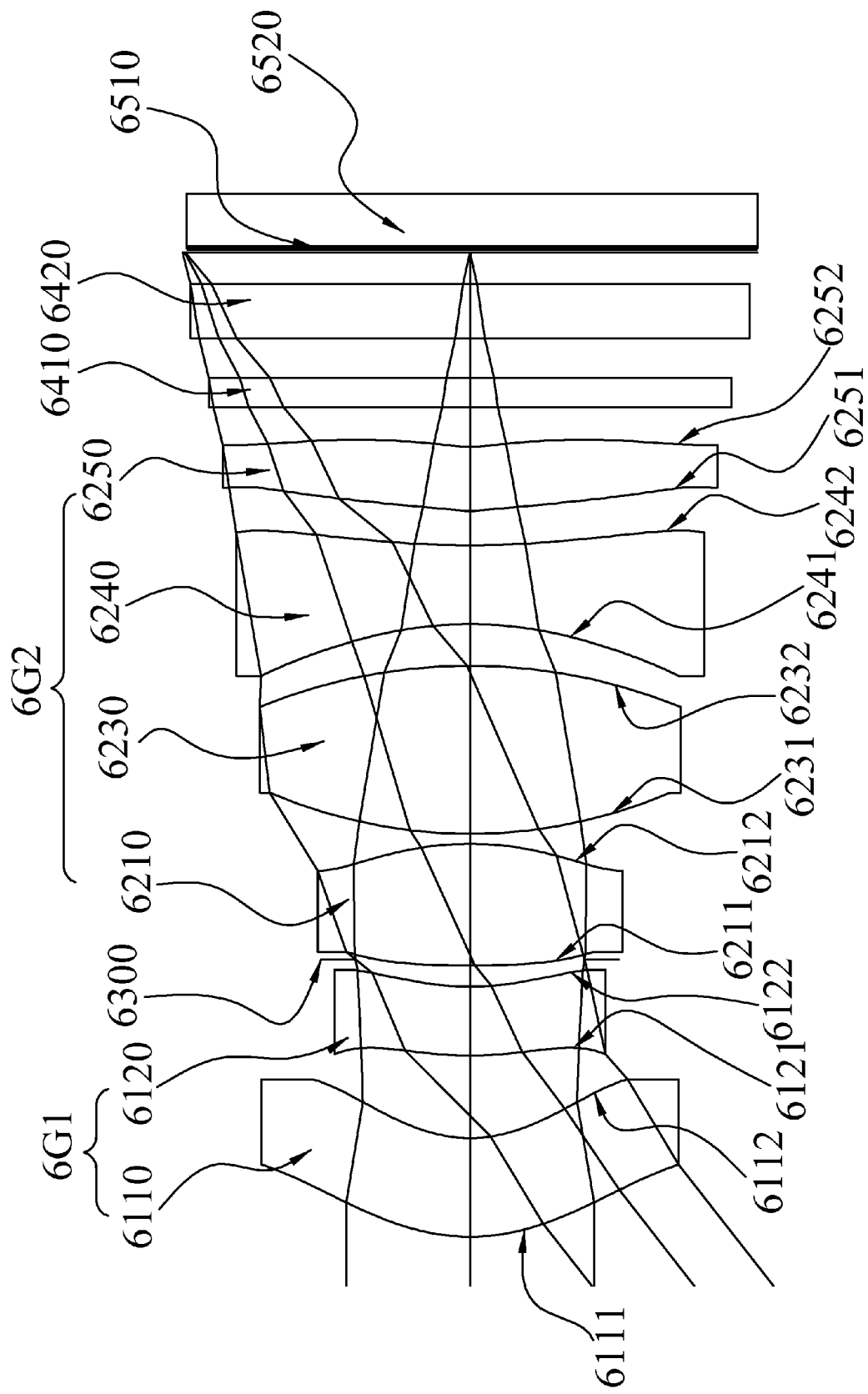
FIG. 6A is a schematic view of an optical system in accordance with the sixth preferred embodiment of the present invention.
Figure 6B:
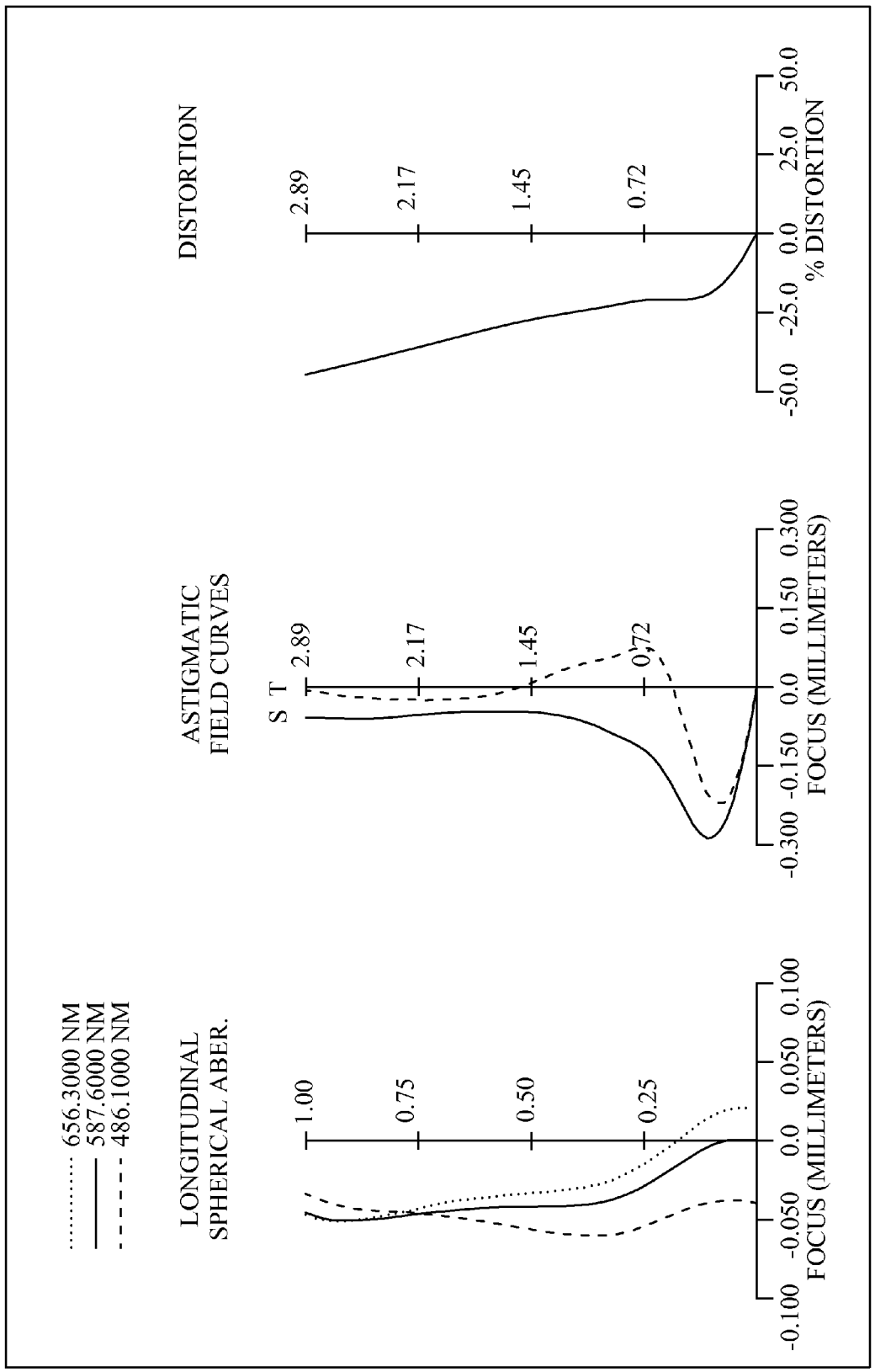
FIG. 6B is a schematic view of a series of aberration curves of the sixth preferred embodiment of the present invention.

With reference to FIGS. 6A and 6B for a schematic view of an optical system and a series of aberration curves in accordance with the sixth preferred embodiment of the present invention respectively and Table 15 for the optical data of this preferred embodiment, the image taking optical system comprises a front lens group (6G1), a aperture stop (6300) and a rear lens group (6G2), and the aperture stop (6300) is arranged between the front lens group (6G1) and the rear lens group (6G2). The front lens group (6G1) comprises a front-group first lens element (6110) (labeled as the first lens element in Table 15) and a front-group second lens element (6120) (labeled as the second lens element in Table 15). The rear lens group (6G2) comprises four lens elements, being respectively a rear-group first lens element (6210) (labeled as the third lens element in Table 15), a rear-group positive lens element (6230) (labeled as the fourth lens element in Table 15), a rear-group negative lens element (6240) (labeled as the fifth lens element in Table 15) and a rear-group rear lens element (6250) (labeled as the sixth lens element in Table 15). The meniscus front-group first lens element (6110) with negative refractive power has a convex object-side surface (6111) and a concave image-side surface (6112), and the meniscus front-group second lens element (6120) with nega- tive refractive power has a convex object-side surface (6121) and a concave image-side surface (6122).

The rear lens group (6G2) comprises four lens elements, being respectively: the rear-group first lens element (6210) with positive refractive power being a bi-convex lens element; the bi-convex rear-group positive glass lens element (6230) with positive refractive power having both spherical object-side surface (6231) and image-side surface (6232); the bi-concave rear-group negative lens element (6240) with negative refractive power adjacent to the image side of the rear-group positive lens element (6230); the plastic rear-group rear lens element (6250) nearest to the image plane (6510) having a convex object-side surface (6251) and a concave image-side surface (6252), and both object-side surface (6251) and image-side surface (6252) thereof having an inflection point.

The image taking optical system of this preferred embodiment further comprise an IR-filter (6410) and a cover glass (6420); the IR-filter (6410) and the cover glass (6420) are installed sequentially from the object side to the image side and between the rear-group rear lens element (6250) and the image plane (6510) and generally made of plate optical material without affecting the overall focal length of the image taking optical system of the present invention. The image taking optical system of this preferred embodiment further comprises an image sensor (6520) at the image plane (6510) for imaging a photographed object.

TABLE 16

Optical data of this preferred embodiment
f = 7.02 mm, Fno = 2.80, HFOV = 37.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.042960 (ASP) | 1.000 | Plastic | 1.544 | 55.9 | −16.88 |
| 2 | | 1.383038 (ASP) | 0.835 | | | | |
| 3 | Lens 2 | 3.450955 (ASP) | 0.700 | Plastic | 1.583 | 30.2 | −54.03 |
| 4 | | 2.877969 (ASP) | 0.274 | | | | |
| 5 | Ape. Stop | Plano | −0.061 | | | | |
| 6 | Lens 3 | 12.188173 (ASP) | 1.232 | Plastic | 1.514 | 56.8 | 4.89 |
| 7 | | −3.056951 (ASP) | 0.100 | | | | |
| 8 | Lens 4 | 5.116671 | 1.701 | Glass | 1.620 | 60.3 | 4.62 |
| 9 | | −5.674184 | 0.423 | | | | |
| 10 | Lens 5 | −3.927837 (ASP) | 0.800 | Plastic | 1.634 | 23.8 | −4.35 |
| 11 | | 10.015949 (ASP) | 0.348 | | | | |
| 12 | Lens 6 | 1.342477 (ASP) | 0.647 | Plastic | 1.583 | 30.2 | −4.76 |
| 13 | | 0.744233 (ASP) | 0.400 | | | | |
| 14 | IR-filter | Plano | 0.300 | Glass | 1.517 | 64.2 | — |
| 15 | | Plano | 0.400 | | | | |
| 16 | Cover-glass | Plano | 0.550 | Glass | 1.517 | 64.2 | — |
| 17 | | Plano | 0.318 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (6111) of the front-group first lens element (6110), the image-side surface (6112) of the front-group first lens element (6110), the object-side surface (6121) of the front-group second lens element (6120), the image-side surface (6122) of the front-group second lens element (6120), the object-side surface (6211) of the rear-group first lens element (6210), the image-side surface (6212) of the rear-group first lens element (6210), the object-side surface (6241) of the rear-group negative lens element (6240), the image-side surface (6242) of the rear-group negative lens element (6240), the object-side surface (6251) of the rear-group rear lens element (6250) and the image-side surface (6252) of the rear-group rear lens element (6250) are aspherical surfaces in compliance with the aspherical surface formula as given in Equation (15), and their aspheric coefficients are listed in Table 17 below.

TABLE 17

Aspheric coefficients of this preferred embodiment

| Surface # | 1 | 2 | 3 | 4 | 6 |
|---|---|---|---|---|---|
| k = | −6.02433E−01 | −1.33095E+00 | −2.83683E+00 | −2.12343E+00 | 4.67689E+01 |
| A4 = | −1.63429E−02 | −2.07173E−02 | −4.67069E−02 | −1.84360E−02 | 2.53178E−02 |
| A6 = | −3.58702E−03 | −1.06907E−02 | −1.65708E−02 | −1.86081E−02 | 2.06757E−03 |
| A8 = | 3.60635E−04 | 2.75208E−03 | 2.15112E−03 | 7.63394E−03 | −1.71021E−03 |
| A10 = | −5.95707E−06 | −4.47310E−04 | 3.23418E−04 | −1.23139E−03 | 2.66247E−04 |

| Surface # | 7 | 10 | 11 | 12 | 13 |
|---|---|---|---|---|---|
| k = | −8.54369E−01 | −2.02757E+00 | −7.40309E+00 | −1.00159E+02 | −1.00000E+02 |
| A4 = | 3.27662E−03 | −1.57740E−03 | −2.01794E−03 | −3.28179E−04 | −2.51502E−02 |
| A6 = | 4.00600E−03 | 9.85428E−04 | −5.03407E−05 | 1.05626E−03 | 4.59625E−03 |
| A8 = | 5.58580E−04 | 1.88582E−03 | 3.88595E−05 | −6.89113E−05 | −3.32044E−05 |
| A10 = | 3.78255E−04 | −3.40924E−05 | −1.75675E−05 | −2.00144E−05 | −5.92695E−05 |
| A12 = | | | | 5.20859E−07 | 4.21744E−06 |

With reference to Table 15 and the series of aberration curves as shown in FIG. 6B for the image taking optical system in accordance with this preferred embodiment, the focal length of the image taking optical system is f=7.02 (mm), and the overall aperture stop value (f-number) of the image taking optical system is Fno=2.80. After the optical data of this preferred embodiment are calculated and derived, the image taking optical system satisfies related relations as shown in Table 18 below, and the related symbols have been described above and thus will not be described again.

TABLE 18

Data of related relations of this preferred embodiment

| Relation | Data |
|---|---|
| HFOV | 37.9° |
| $DIST_8$ | −39.54% |
| $\tan(HFOV)/DIST_8$ | −1.97 |
| $(Rg_1 + Rg_2)/(Rg_1 − Rg_2)$ | −0.05 |
| $(Rn_1 + Rn_2)/(Rn_1 − Rn_2)$ | −0.44 |
| $(R_1 − R_2)/(R_1 + R_2)$ | 0.19 |
| $R_L/f$ | 0.11 |
| $f_R/f_F$ | −0.23 |
| Tgn/f | 0.06 |
| $f/f_1$ | −0.42 |
| $\Sigma|P_F|/\Sigma|P_R|$ | 0.09 |
| TTL/ImgH | 3.35 |
| SL/TTL | 0.71 |

Figure 6C:
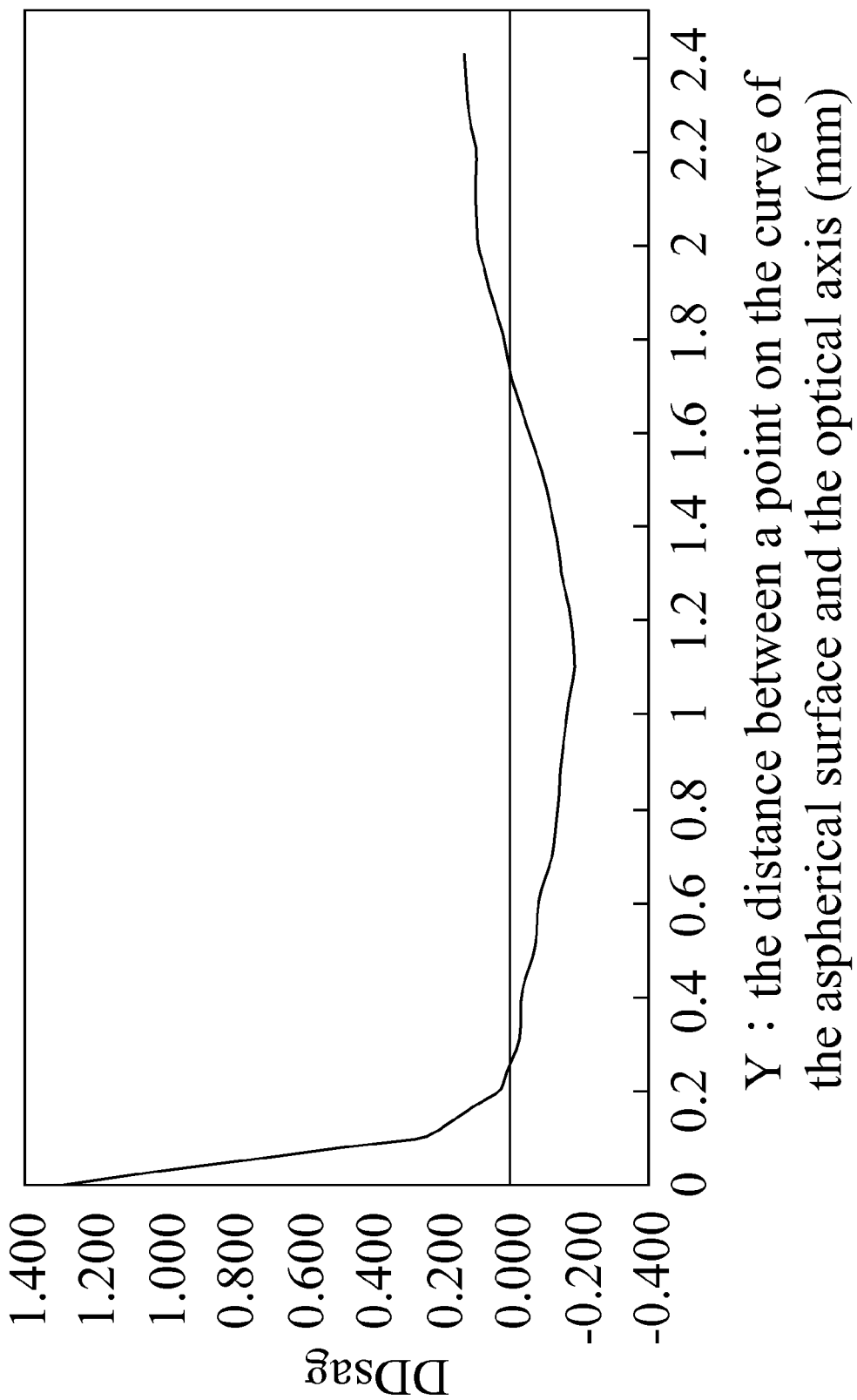
FIG. 6C is a curve showing the second derivatives of SAG values of an image-side surface of a rear-group rear lens element in accordance with the sixth preferred embodiment of the present invention.

With reference to FIG. 6C for a curve showing the second derivatives of SAG values of an image-side surface of a rear-group rear lens element in accordance with the sixth preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (6252) of the rear-group rear lens element (6250) equal to zero are found, indicating that there are two inflection points between the center and the periphery of the optical surface.

According to the optical data as shown in Table 15 and the series of aberration curves as shown in FIG. 6B, the image taking optical system in accordance with this preferred embodiment of the present invention provides good correction results in aspects of the longitudinal spherical aberration, astigmatic field curving, and distortion.

Seventh Preferred Embodiment

Figure 7A:
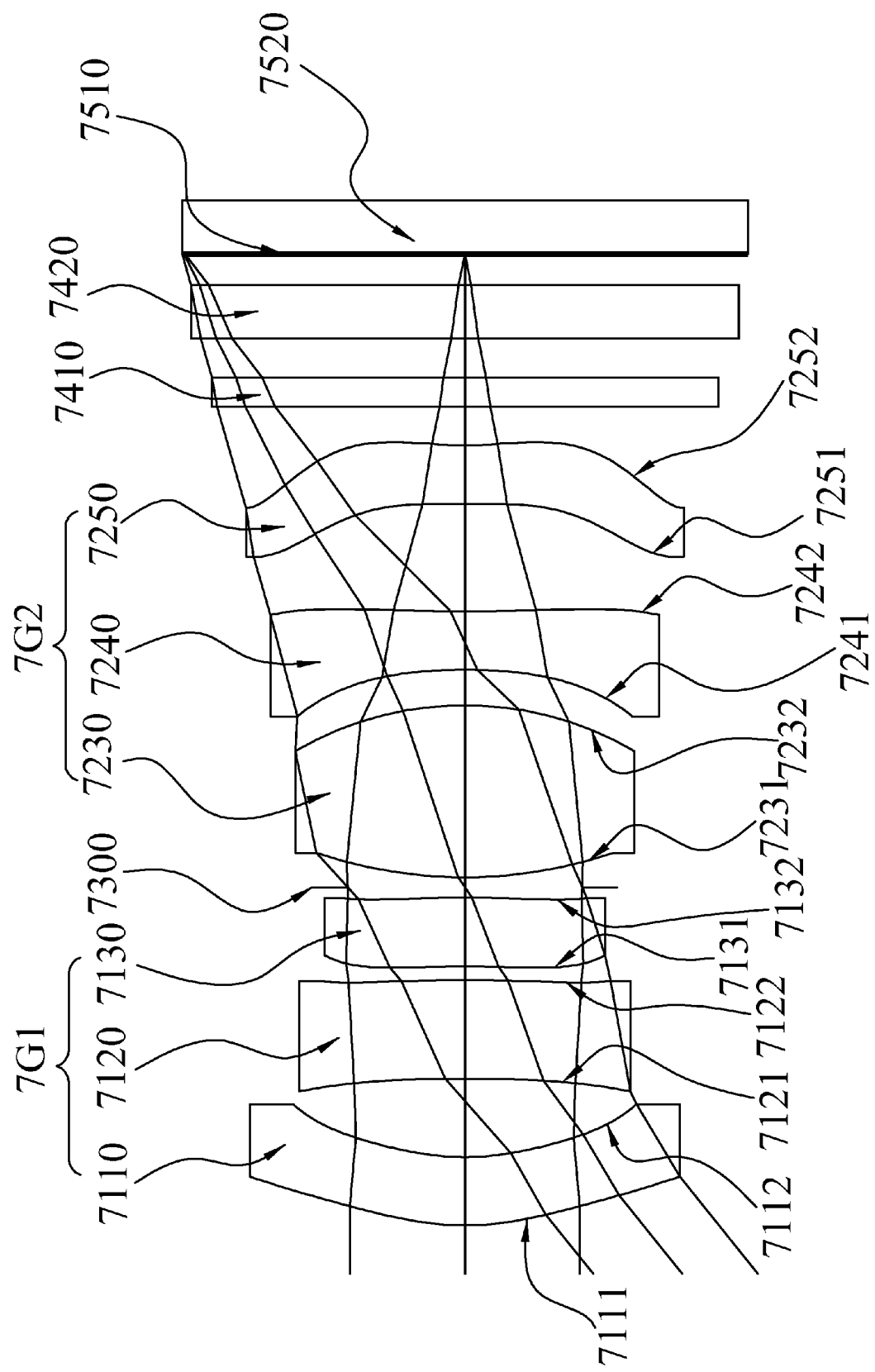
FIG. 7A is a schematic view of an optical system in accordance with the seventh preferred embodiment of the present invention.
Figure 7B:
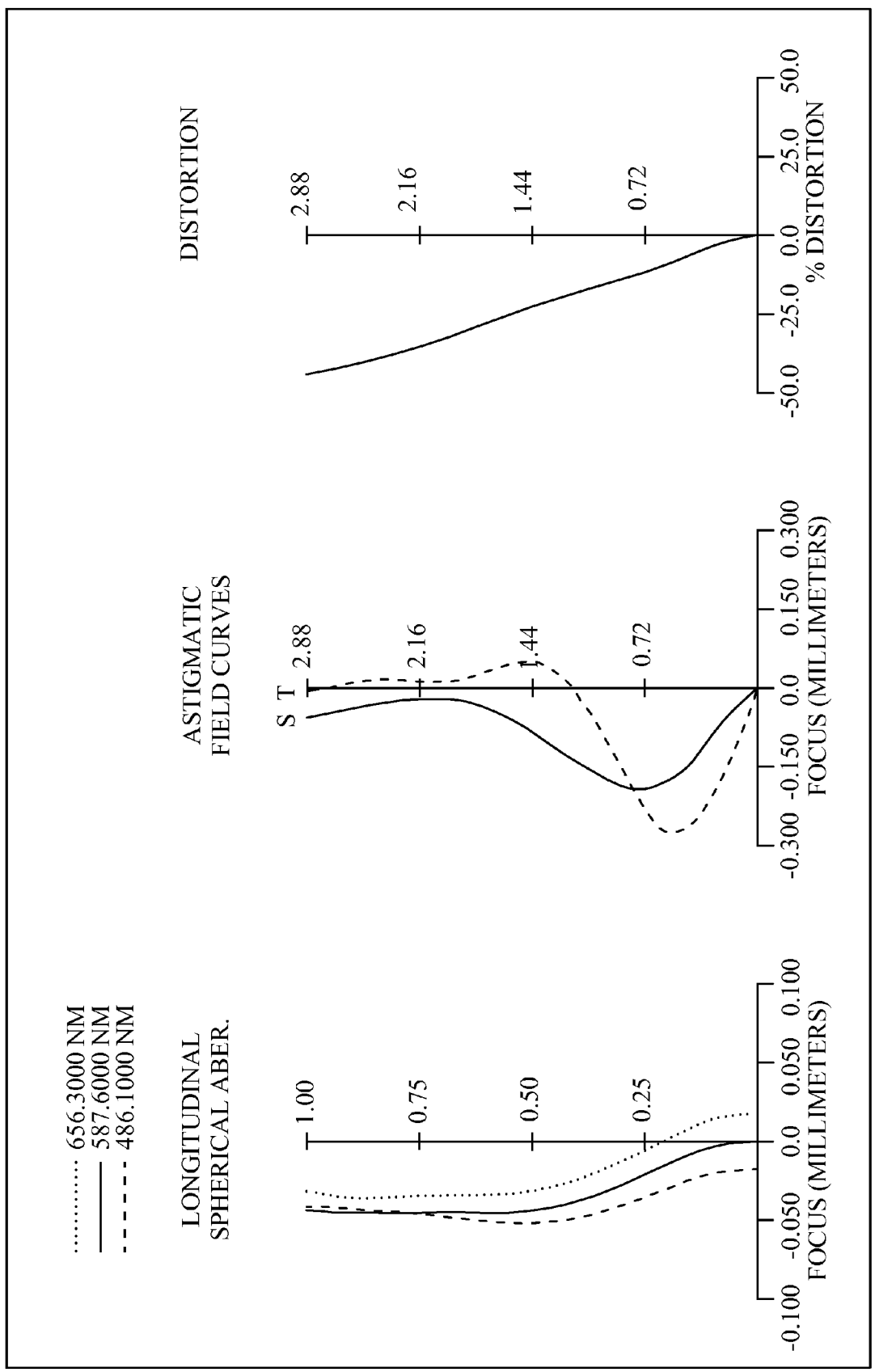
FIG. 7B is a schematic view of a series of aberration curves of the seventh preferred embodiment of the present invention.

With reference to FIGS. 7A and 7B for a schematic view of an optical system and a series of aberration curves in accordance with the seventh preferred embodiment of the present invention respectively and Table 19 for the optical data of this preferred embodiment, the image taking optical system comprises a front lens group (7G1), a aperture stop (7300) and a rear lens group (7G2), and the aperture stop (7300) is arranged between the front lens group (7G1) and the rear lens group (7G2). The front lens group (7G1) comprises a front-group first lens element (7110) (labeled as the first lens element in Table 19), a front-group second lens element (7120) (labeled as the second lens element in Table 19) and a front-group third lens element (7130) (labeled as the third lens element in Table 19). The rear lens group (7G2) comprises three lens elements, being respectively: a rear-group positive glass lens element (7230) (labeled as the fourth lens element in Table 19), a rear-group negative lens element (7240) (labeled as the fifth lens element in Table 19) and a rear-group rear lens element (7250) (labeled as the sixth lens element in Table 19). The meniscus front-group first lens element (7110) with positive refractive power has a convex object-side surface (7111) and a concave image-side surface (7112), the meniscus front-group second lens element (7120) with positive refractive power has a concave object-side surface (7121) and a convex image-side surface (7122), and the front-group third lens element (7130) with positive refractive power has a concave object-side surface (7131) and a convex image-side surface (7132).

The rear lens group (7G2) comprises three lens elements, being respectively: the bi-convex rear-group positive glass lens element (7230) with positive refractive power having both spherical object-side surface (7231) and image-side surface (7232); the bi-concave rear-group negative lens element (7240) with negative refractive power adjacent to the image side of the rear-group positive lens element (7230); the plastic rear-group rear lens element (7250) nearest to the image plane (7510) having a convex object-side surface (7251) and a concave image-side surface (7252), and both object-side surface (7251) and image-side surface (7252) thereof having an inflection point.

The image taking optical system of this preferred embodiment further comprises an IR-filter (7410) installed between the rear-group rear lens element (7250) and the image plane (7510) and generally made of plate optical material without affecting the overall focal length of the image taking optical system of the present invention. The image taking optical system of this preferred embodiment further comprises an image sensor (7520) at the image plane (7510) for imaging a photographed object.

TABLE 19

Optical data of this preferred embodiment
f = 6.70 mm, Fno = 2.84, HFOV = 38.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.838587 (ASP) | 0.700 | Plastic | 1.535 | 56.3 | 205.85 |
| 2 | | 2.663434 (ASP) | 0.806 | | | | |
| 3 | Lens 2 | −16.652390 (ASP) | 1.012 | Plastic | 1.633 | 23.4 | 215.85 |
| 4 | | −15.192421 (ASP) | 0.140 | | | | |
| 5 | Lens 3 | −12.111144 (ASP) | 0.706 | Plastic | 1.544 | 55.9 | 604.57 |
| 6 | | −11.921201 (ASP) | 0.105 | | | | |
| 7 | Ape. Stop | Plano | 0.100 | | | | |
| 8 | Lens 4 | 4.712874 | 1.767 | Glass | 1.729 | 54.5 | 3.01 |
| 9 | | −3.453824 | 0.365 | | | | |
| 10 | Lens 5 | −5.177268 (ASP) | 0.600 | Plastic | 1.650 | 21.4 | −6.20 |
| 11 | | 18.986818 (ASP) | 1.104 | | | | |
| 12 | Lens 6 | −50.410052 (ASP) | 0.595 | Plastic | 1.583 | 30.2 | −3.80 |
| 13 | | 2.331169 (ASP) | 0.400 | | | | |
| 14 | IR-filter | Plano | 0.300 | Glass | 1.517 | 64.2 | — |
| 15 | | Plano | 0.400 | | | | |
| 16 | Cover-glass | Plano | 0.550 | Glass | 1.517 | 64.2 | — |
| 17 | | Plano | 0.315 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (7111) of the front-group first lens element (7110), the image-side surface (7112) of the front-group first lens element (7110), the object-side surface (7121) of the front-group second lens element (7120), the image-side surface (7122) of the front-group second lens element (7120), the object-side surface (7131) of the front-group third lens element (7130), the image-side surface (7132) of the front-group third lens element (7130), the object-side surface (7241) of the rear-group negative lens element (7240), the image-side surface (7242) of the rear-group negative lens element (7240), the object-side surface (7251) of the rear-group rear lens element (7250) and the image-side surface (7252) of the rear-group rear lens element (7250) are aspherical surfaces in compliance with the aspherical surface formula as given in Equation (15), and their aspheric coefficients are listed in Table 20.

TABLE 20

Aspheric coefficients of this preferred embodiment

| Surface # | 1 | 2 | 3 | 4 | 5 |
|---|---|---|---|---|---|
| k = | −1.35373E+00 | −6.63535E+00 | −1.02082E+01 | −5.88742E+01 | 4.64939E+01 |
| A4 = | −2.75432E−02 | −8.88114E−04 | −7.30265E−03 | 6.10943E−03 | 3.19333E−02 |
| A6 = | 2.85272E−03 | 1.72694E−03 | 2.73054E−03 | 5.80227E−04 | 8.35676E−03 |
| A8 = | 2.74233E−04 | 9.87214E−04 | −1.75740E−03 | 5.72425E−04 | 2.75171E−04 |
| A10 = | −5.41092E−05 | 1.33266E−05 | 3.50318E−04 | 9.95481E−05 | 1.31674E−04 |

| Surface # | 6 | 10 | 11 | 12 | 13 |
|---|---|---|---|---|---|
| k = | −1.61518E+01 | 2.51689E+00 | 6.67075E+01 | −3.33166E+00 | −1.00000E+02 |
| A4 = | 1.30427E−02 | −1.25649E−02 | −1.00667E−02 | −8.53690E−02 | −6.36699E−02 |
| A6 = | 8.34472E−03 | −4.40755E−03 | 8.92414E−04 | 1.36916E−02 | 2.05543E−03 |
| A8 = | −2.88163E−03 | 1.14362E−03 | −3.69909E−04 | 2.86562E−04 | 4.05868E−04 |
| A10 = | 1.25303E−03 | −1.07967E−04 | 1.53785E−05 | −4.06935E−05 | 4.95095E−05 |
| A12 = | | | | −7.42327E−06 | 5.46303E−06 |

With reference to Table 19 and the series of aberration curves as shown in FIG. 7B for the image taking optical system in accordance with this preferred embodiment, the focal length of the image taking optical system is f=6.70 (mm), and the overall aperture stop value (f-number) of the image taking optical system is Fno=2.84. After the optical data of this preferred embodiment are calculated and derived, the image taking optical system satisfies related relations as shown in Table 21 below, and the related symbols have been described above and thus will not be described again.

TABLE 21

Data of related relations of this preferred embodiment

| Relation | Data |
|---|---|
| HFOV | 38.8° |
| $DIST_8$ | −39.21% |
| $tan(HFOV)/DIST_8$ | −2.05 |
| $(Rg_1 + Rg_2)/(Rg_1 − Rg_2)$ | 0.15 |
| $(Rn_1 + Rn_2)/(Rn_1 − Rn_2)$ | −0.57 |
| $(R_1 − R_2)/(R_1 + R_2)$ | 0.03 |
| $R_L/f$ | 0.35 |
| $f_R/f_F$ | 0.07 |
| $Tgn/f$ | 0.05 |
| $f/f_1$ | 0.03 |
| $\Sigma |P_F|/\Sigma |P_R|$ | 0.01 |
| TTL/ImgH | 3.36 |
| SL/TTL | 0.64 |

Figure 7C:
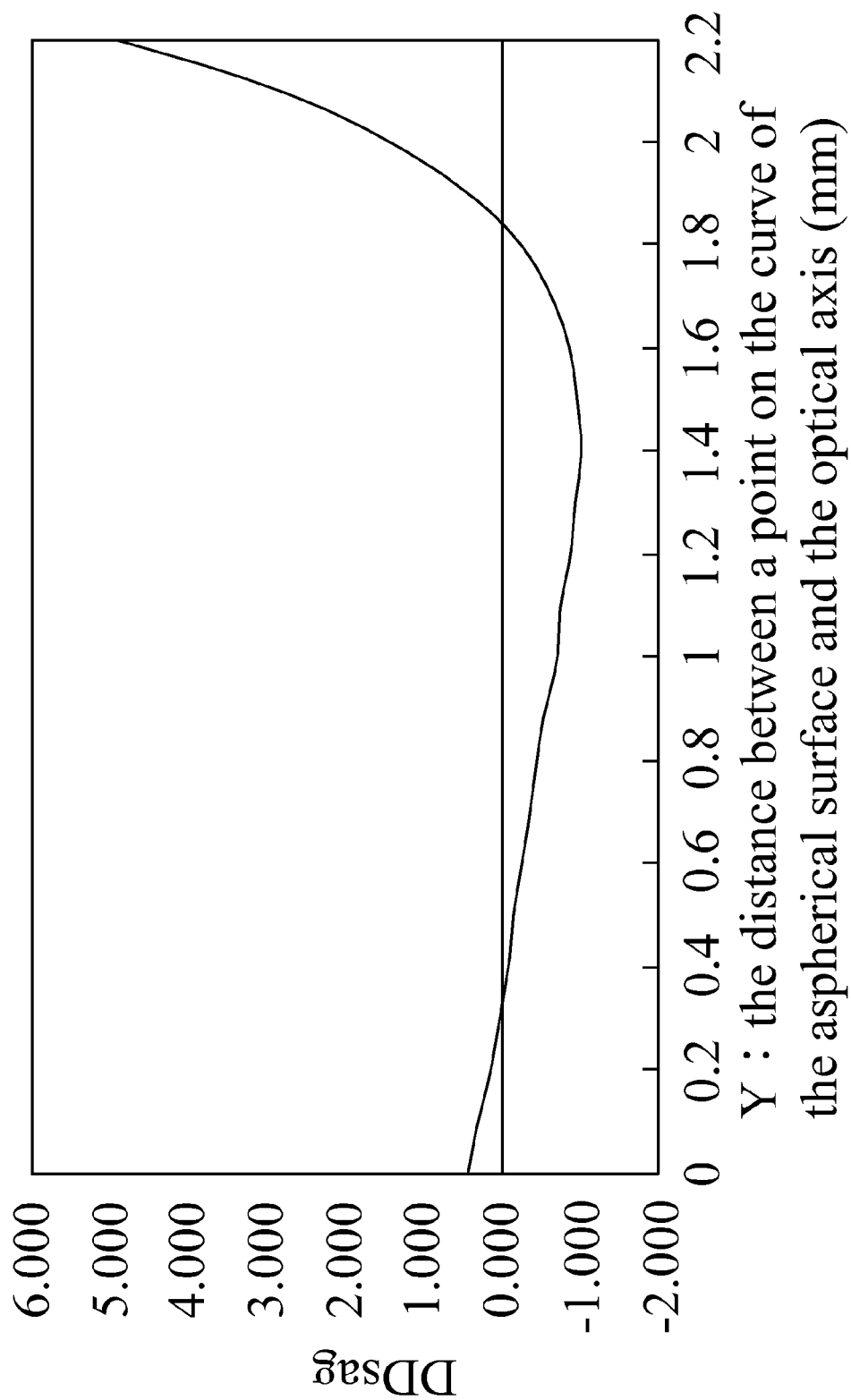
FIG. 7C is a curve showing the second derivatives of SAG values of an image-side surface of a rear-group rear lens element in accordance with the seventh preferred embodiment of the present invention.

With reference to FIG. 7C for a curve showing the second derivatives of SAG values of an image-side surface of a rear-group rear lens element in accordance with the seventh preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (7252) of the rear-group rear lens element (7250) equal to zero are found, indicating that there are two inflection points between the center and the periphery of the optical surface.

According to the optical data as shown in Table 19 and the series of aberration curves as shown in FIG. 7B, the image taking optical system in accordance with this preferred embodiment of the present invention provides good correction results in aspects of the longitudinal spherical aberration, astigmatic field curving, and distortion.

Eighth Preferred Embodiment

Figure 8A:
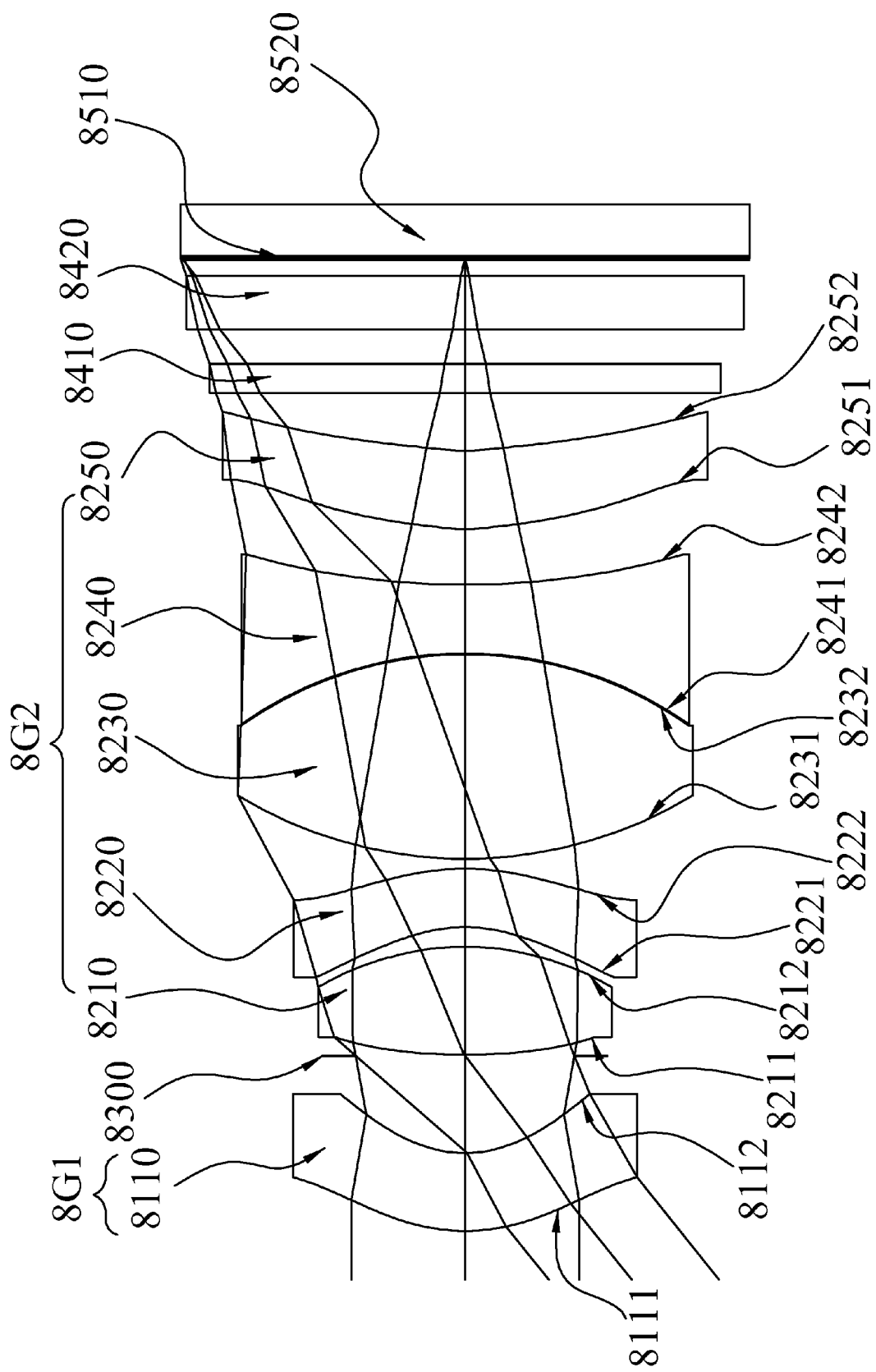
FIG. 8A is a schematic view of an optical system in accordance with the eighth preferred embodiment of the present invention.
Figure 8B:
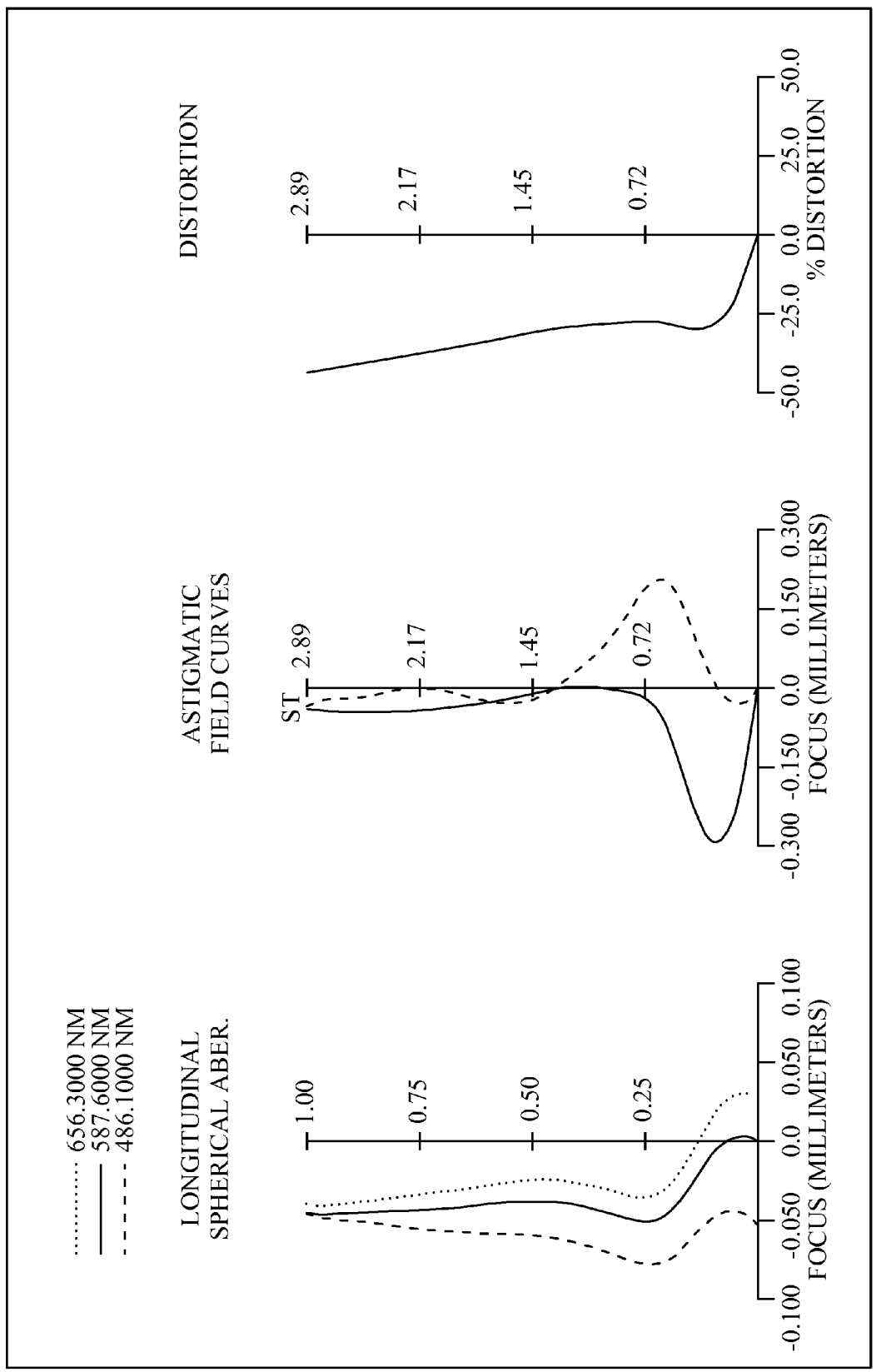
FIG. 8B is a schematic view of a series of aberration curves of the eighth preferred embodiment of the present invention.

With reference to FIGS. 8A and 8B for a schematic view of an optical system and a series of aberration curves in accordance with the eighth preferred embodiment of the present invention respectively and Table 22 for the optical data of this preferred embodiment, the image taking optical system comprises a front lens group (8G1), a aperture stop (8300) and a rear lens group (8G2), and the aperture stop (8300) is arranged between the front lens group (8G1) and the rear lens group (8G2). The front lens group (8G1) comprises a front-group first lens element (8110) (labeled as the first lens element in Table 22). The rear lens group (8G2) comprises five lens elements, being respectively a rear-group first lens element (8210) (labeled as the second lens element in Table 22), a rear-group second lens element (8220) (labeled as the third lens element in Table 22), a rear-group positive lens element (8230) (labeled as the fourth lens element in Table 22), a rear-group negative lens element (8240) (labeled as the fifth lens element in Table 22) and a rear-group rear lens element (8250) (labeled as the sixth lens element in Table 22 lens element). The meniscus front-group first lens element (8110) with negative refractive power has a convex object-side surface (8111) and a concave image-side surface (8112)

The rear lens group (8G2) comprises five lens elements, being respectively: the rear-group first lens element (8210) with positive refractive power being a bi-convex lens element; the meniscus rear-group second lens element (8220) with negative refractive power having a concave object-side surface (8221); the bi-convex rear-group positive glass lens element (8230) with positive refractive power having both spherical object-side surface (8231) and image-side surface (8232); the meniscus glass rear-group negative lens element (8240) with negative refractive power adjacent to the image side of the rear-group positive lens element (8230) having a concave object-side surface (8241), wherein the rear-group positive lens element (8230) and the rear-group negative lens element (8240) are adjacent to each other with the interval apart reduced to be the smallest, or attached with each other to form a cemented lens element; the plastic rear-group rear lens element (8250) nearest to the image plane (8510) having a convex object-side surface (8251) and a concave image-side surface (8252), and both object-side surface (8251) and image-side surface (8252) thereof having an inflection point.

The image taking optical system of this preferred embodiment further comprise an IR-filter (8410) installed between the rear-group rear lens element (8250) and the image plane (8510) and generally made of plate optical material without affecting the overall focal length of the image taking optical system of the present invention. The image taking optical system of this preferred embodiment further comprises an image sensor (8520) at the image plane (8510) for imaging a photographed object.

TABLE 22

Optical data of this preferred embodiment
f = 6.65 mm, Fno = 2.85, HFOV = 38.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.980499 (ASP) | 0.800 | Plastic | 1.634 | 23.8 | −9.81 |
| 2 | | 1.266729 (ASP) | 0.996 | | | | |
| 3 | Ape. Stop | Plano | 0.013 | | | | |
| 4 | Lens 2 | 6.602224 (ASP) | 1.108 | Plastic | 1.583 | 30.2 | 3.33 |
| 5 | | −2.586303 (ASP) | 0.200 | | | | |
| 6 | Lens 3 | −1.544171 (ASP) | 0.600 | Plastic | 1.633 | 23.4 | −8.89 |
| 7 | | −2.448836 (ASP) | 0.100 | | | | |
| 8 | Lens 4 | 4.515448 | 2.100 | Glass | 1.804 | 46.5 | 2.95 |
| 9 | | −3.965473 | 0.010 | | | | |
| 10 | Lens 5 | −3.965473 | 0.700 | Glass | 1.847 | 23.8 | −3.07 |
| 11 | | 8.178000 | 0.572 | | | | |
| 12 | Lens 6 | 1.006986 (ASP) | 0.800 | Plastic | 1.514 | 56.8 | −3.65 |
| 13 | | 0.478586 (ASP) | 0.600 | | | | |
| 14 | IR-filter | Plano | 0.300 | Glass | 1.517 | 64.2 | — |
| 15 | | Plano | 0.350 | | | | |
| 16 | Cover-glass | Plano | 0.550 | Glass | 1.517 | 64.2 | — |

TABLE 22-continued

Optical data of this preferred embodiment
f = 6.65 mm, Fno = 2.85, HFOV = 38.8 deg.

| Surface # | | Curvature Radius | Thickness | Material | Index | Abbe # | Focal Length |
|---|---|---|---|---|---|---|---|
| 17 | | Plano | 0.182 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (8111) of the front-group first lens element (8110), the image-side surface (8112) of the front-group first lens element (8110), the object-side surface (8211) of the rear-group first lens element (8210), the image-side surface (8212) of the rear-group first lens element (8210), the object-side surface (8221) of the rear-group second lens element (8220), the image-side surface (8222) of the rear-group second lens element (8220), the object-side surface (8251) of the rear-group rear lens element (8250) and the image-side surface (8252) of the rear-group rear lens element (8250) are aspherical surfaces in compliance with the aspherical surface formula as given in Equation (15), and their aspheric coefficients are listed in Table 23 below.

TABLE 23

| Aspheric coefficients of this preferred embodiment | | | | |
|---|---|---|---|---|
| Surface # | 1 | 2 | 4 | 5 |
| k = | −1.15546E+00 | −1.13073E+00 | 1.24754E+01 | −5.28851E−01 |
| A4 = | 1.62695E−04 | 1.64629E−02 | 1.03232E−02 | 1.80555E−02 |
| A6 = | −9.64501E−03 | −1.74152E−02 | −3.04471E−03 | −6.98488E−05 |
| A8 = | 1.39203E−04 | −3.24216E−03 | 2.29672E−04 | −2.23113E−05 |
| A10 = | 2.20088E−04 | 3.19540E−03 | −6.78787E−05 | −3.37315E−03 |
| A12 = | | | −1.75012E−05 | 1.12255E−03 |

| Surface # | 6 | 7 | 12 | 13 |
|---|---|---|---|---|
| k = | −1.70156E+00 | −2.44265E+00 | −8.00000E+01 | −1.00000E+02 |
| A4 = | 4.61681E−02 | 2.66123E−02 | 3.68672E−02 | 1.08166E−02 |
| A6 = | −4.01678E−03 | −1.66991E−03 | −1.15959E−02 | −2.94771E−03 |
| A8 = | −4.91610E−03 | −1.02834E−03 | 2.23465E−03 | 7.35923E−04 |
| A10 = | 3.93690E−04 | 5.17958E−04 | −2.42569E−04 | −1.02741E−04 |
| A12 = | 3.60290E−04 | −4.02928E−05 | 8.85749E−06 | 5.31783E−06 |

With reference to Table 22 and the series of aberration curves as shown in FIG. 8B for the image taking optical system in accordance with this preferred embodiment, the focal length of the image taking optical system is f=6.65 (mm), and the overall aperture stop value (f-number) of the image taking optical system is Fno=2.85. After the optical data of this preferred embodiment are calculated and derived, the image taking optical system satisfies related relations as shown in Table 24 below, and the related symbols have been described above and thus will not be described again.

TABLE 24

| Data of related relations of this preferred embodiment | |
|---|---|
| Relation | Data |
| HFOV | 38.8° |
| $DIST_8$ | −40.58% |
| $\tan(HFOV)/DIST_8$ | −1.98 |

TABLE 24-continued

| Data of related relations of this preferred embodiment | |
|---|---|
| Relation | Data |
| $(Rg_1 + Rg_2)/(Rg_1 - Rg_2)$ | 0.06 |
| $(Rn_1 + Rn_2)/(Rn_1 - Rn_2)$ | −0.35 |
| $(R_1 - R_2)/(R_1 + R_2)$ | 0.22 |
| $R_L/f$ | 0.07 |
| $f_R/f_F$ | −0.26 |
| $Tgn/f$ | 0.00 |
| $f/f_1$ | −0.68 |
| $\Sigma |P_F|/\Sigma |P_R|$ | 0.08 |
| TTL/ImgH | 3.35 |
| SL/TTL | 0.82 |

Figure 8C:
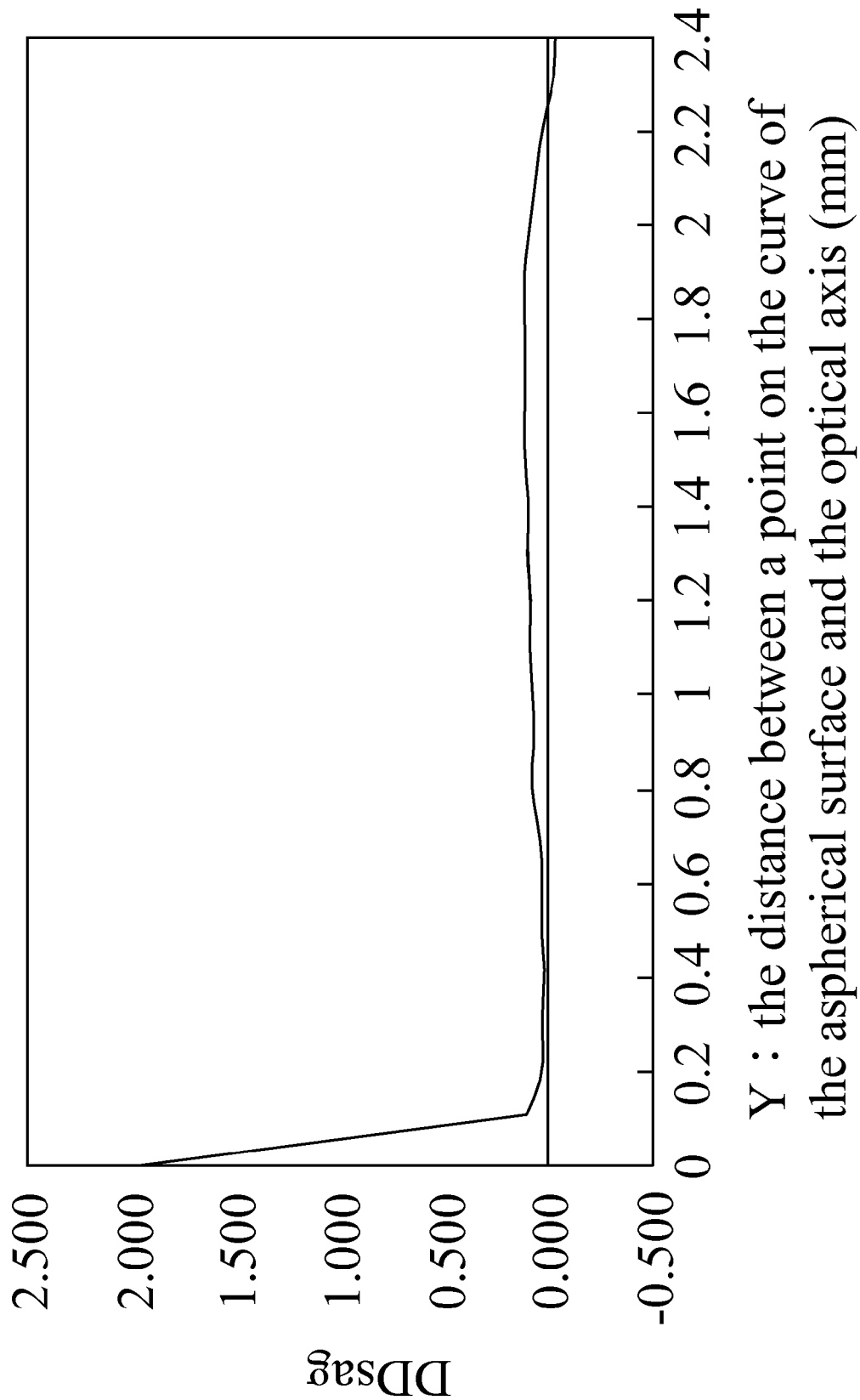
FIG. 8C is a curve showing the second derivatives of SAG values of an image-side surface of a rear-group rear lens element in accordance with the eighth preferred embodiment of the present invention.

With reference to FIG. 8C for a curve showing the second derivatives of SAG values of an image-side surface of a rear-group rear lens element in accordance with the eighth preferred embodiment of the present invention, if the value of second derivative of SAG is equal to 0, an inflection point will be at that point, and the value Y (mm) represents the distance between the point on the aspherical curve and the optical axis. In this preferred embodiment, one second derivative of SAG value of the image-side surface (8252) of the rear-group rear lens element (8250) equal to zero is found, indicating that there is one inflection point between the center and the periphery of the optical surface.

According to the optical data as shown in Table 22 and the series of aberration curves as shown in FIG. 8B, the image taking optical system in accordance with this preferred embodiment of the present invention provides good correction results in aspects of the longitudinal spherical aberration, astigmatic field curving, and distortion.

Ninth Preferred Embodiment

Figure 9A:
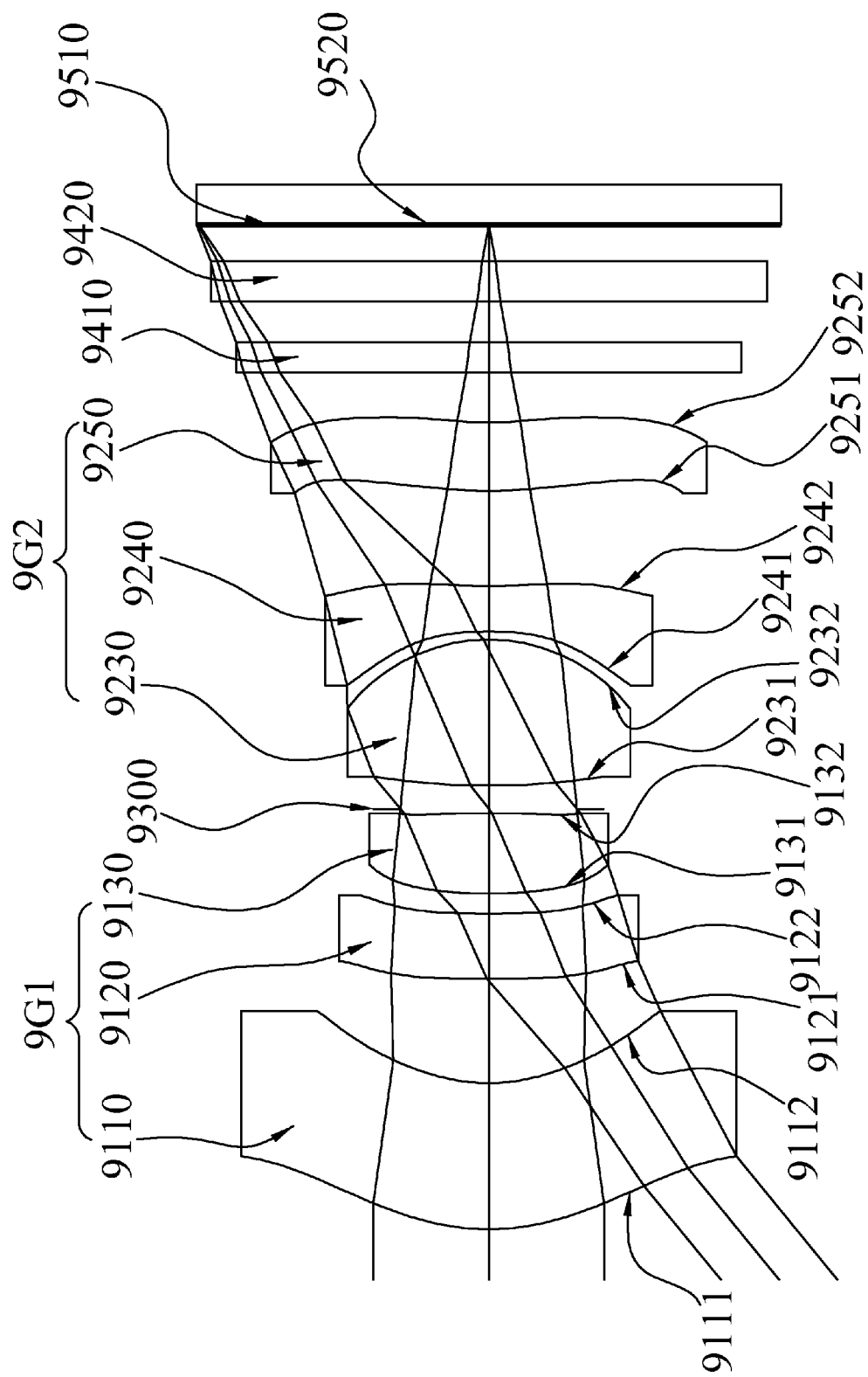
FIG. 9A is a schematic view of an optical system in accordance with the ninth preferred embodiment of the present invention.
Figure 9B:
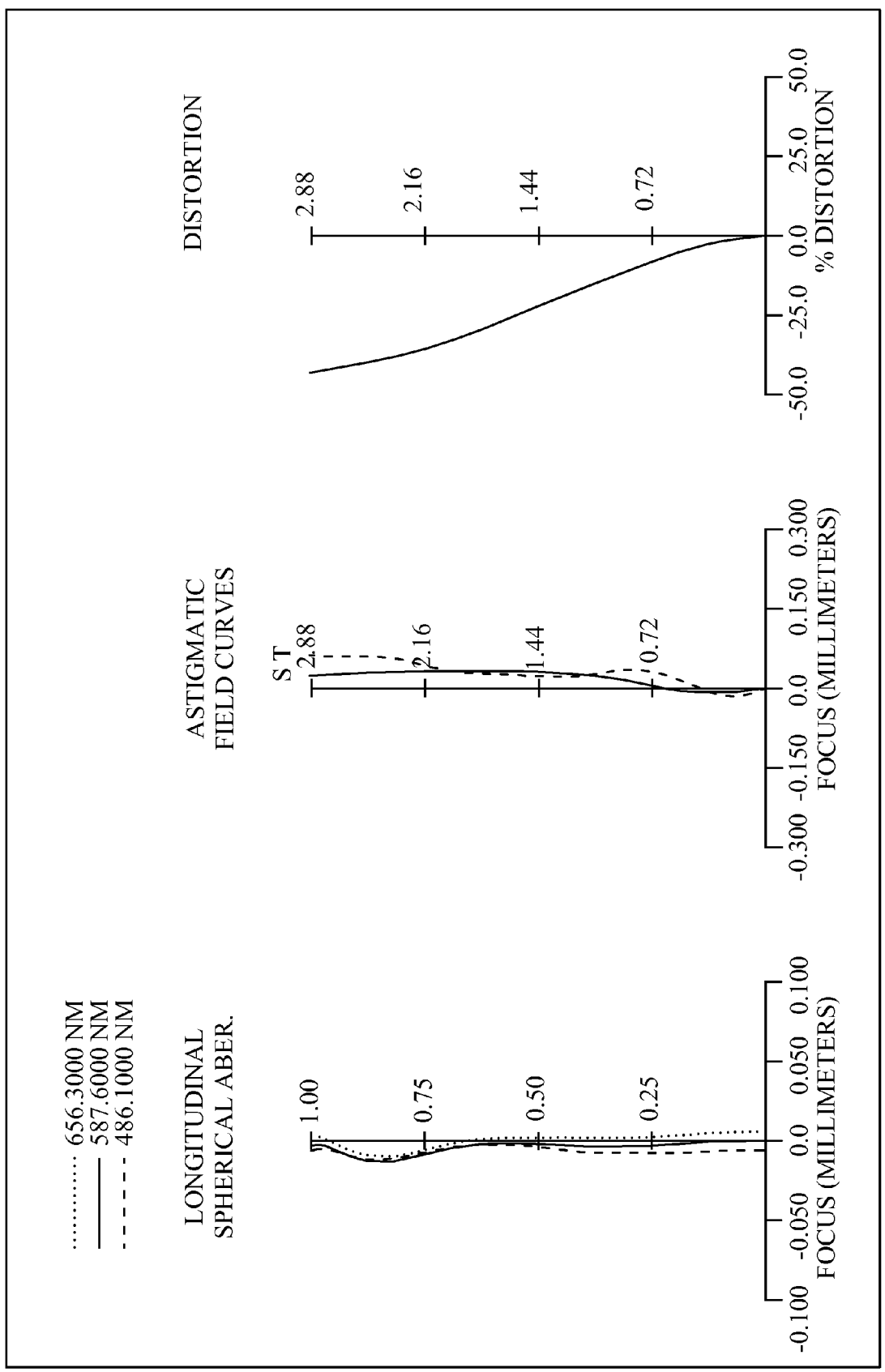
FIG. 9B is a schematic view of a series of aberration curves of the ninth preferred embodiment of the present invention.

With reference to FIGS. 9A and 9B for a schematic view of an optical system and a series of aberration curves in accordance with the ninth preferred embodiment of the present invention respectively and Table 25 for the optical data of this preferred embodiment, the image taking optical system comprises a front lens group (9G1), a aperture stop (9300) and a rear lens group (9G2), and the aperture stop (9300) is arranged between the front lens group (9G1) and the rear lens group (9G2). The front lens group (9G1) comprises a front-group first lens element (9110) (labeled as the first lens element in Table 25), a front-group second lens element (9120) (labeled as the second lens element in Table 25) and a front-group third lens element (9130) (labeled as the third lens element in Table 25). The rear lens group (9G2) comprises three lens elements, being respectively: a rear-group positive lens element (9230) (labeled as the fourth lens element in Table 25), a rear-group negative lens element (9240) (labeled as the fifth lens element in Table 25) and a rear-group rear lens element (9250) (labeled as the sixth lens element in Table 25). The meniscus front-group first lens element (9110) with negative refractive power has a convex object-side surface (9111) and a concave image-side surface (9112). The meniscus front-group second lens element (9120) with negative refractive power has a convex object-side surface (9121) and a concave image-side surface (9122). The front-group third lens element (9130) with positive refractive power has a convex object-side surface (9131) and a convex image-side surface (9132).

The rear lens group (9G2) comprises three lens elements, being respectively: the rear-group positive glass lens element (9230) with positive refractive power being a bi-convex lens element and having both spherical object-side surface (9231) and image-side surface (9232); the bi-concave rear-group negative lens element (9240) with negative refractive power adjacent to the image side of the rear-group positive lens element (9230); the plastic rear-group rear lens element (9250) nearest to the image plane (9510) having a convex object-side surface (9251) and a concave image-side surface (9252), and both object-side surface (9251) and image-side surface (9252) thereof having an inflection point.

The image taking optical system of this preferred embodiment further comprises an IR-filter (9410) and a cover glass (9420); the IR-filter (9410) and the cover glass (9420) are installed sequentially from the object side to the image side and between the rear-group rear lens element (9250) and the image plane (9510), and generally made of plate optical material without affecting the overall focal length of the image taking optical system of the present invention. The image taking optical system of this preferred embodiment further comprises an image sensor (9520) at the image plane (9510) for imaging a photographed object.

TABLE 25

Optical data of this preferred embodiment
f = 6.48 mm, Fno = 2.83, HFOV = 39.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 2.372896 (ASP) | 1.450 | Plastic | 1.530 | 55.8 | −1169.16 |
| 2 | | 1.863485 (ASP) | 1.035 | | | | |
| 3 | Lens 2 | 36.566128 (ASP) | 0.646 | Plastic | 1.614 | 25.6 | −34.32 |
| 4 | | 13.281840 (ASP) | 0.199 | | | | |
| 5 | Lens 3 | 4.949803 (ASP) | 0.797 | Plastic | 1.543 | 56.5 | 6.51 |
| 6 | | −11.680493 (ASP) | 0.040 | | | | |
| 7 | Ape. Stop | Plano | 0.230 | | | | |
| 8 | Lens 4 | 7.419913 | 1.449 | Glass | 1.517 | 64.2 | 2.94 |
| 9 | | −1.780861 | 0.083 | | | | |
| 10 | Lens 5 | −2.946290 (ASP) | 0.450 | Plastic | 1.583 | 30.2 | −3.20 |
| 11 | | 5.369251 (ASP) | 0.943 | | | | |
| 12 | Lens 6 | 3.474534 (ASP) | 0.677 | Plastic | 1.650 | 21.4 | −23.91 |
| 13 | | 2.621480 (ASP) | 0.500 | | | | |
| 14 | IR-filter | Plano | 0.300 | Glass | 1.517 | 64.2 | — |
| 15 | | Plano | 0.400 | | | | |
| 16 | Cover-glass | Plano | 0.400 | Glass | 1.517 | 64.2 | — |
| 17 | | Plano | 0.360 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (9111) of the front-group first lens element (9110), the image-side surface (9112) of the front-group first lens element (9110), the object-side surface (9121) of the front-group second lens element (9120), the image-side surface (9122) of the front-group second lens element (9120), the object-side surface (9131) of the front-group third lens element (9130), the image-side surface (9132) of the front-group third lens element (9130), the object-side surface (9241) of the rear-group negative lens element (9240), the image-side surface (9242) of the rear-group negative lens element (9240), the object-side surface (9251) and the image-side surface (9252) of the rear-group rear lens element (9250) are aspherical surfaces in compliance with the aspherical surface formula as given in Equation (15), and their aspheric coefficients are listed in Table 26 below.

TABLE 26

Aspheric coefficients of this preferred embodiment

| Surface # | 1 | 2 | 3 | 4 | 5 |
|---|---|---|---|---|---|
| k = | −4.16031E+00 | −1.87392E+00 | 7.32838E+01 | 8.99991E+01 | 4.30710E+00 |
| A4 = | 2.04220E−02 | −2.54079E−04 | 4.30155E−02 | 4.46201E−02 | 9.22747E−03 |
| A6 = | −8.10236E−03 | −5.23912E−03 | 3.63783E−03 | 1.09999E−02 | 3.55915E−02 |
| A8 = | 9.73522E−04 | 6.79689E−03 | −1.15248E−03 | 1.37326E−04 | −7.16999E−05 |
| A10 = | −4.40335E−05 | −1.50181E−03 | −1.47700E−03 | −6.55166E−03 | 3.12464E−03 |

| Surface # | 6 | 10 | 11 | 12 | 13 |
|---|---|---|---|---|---|
| k = | 6.41233E+01 | 6.76343E−01 | −7.07575E+01 | −8.87968E+01 | −7.12362E+01 |
| A4 = | 7.14949E−03 | −1.04681E−01 | −6.02578E−02 | −1.86598E−03 | −5.27900E−02 |
| A6 = | 6.68309E−02 | 1.74568E−02 | 8.26398E−03 | 3.99402E−03 | 2.27806E−02 |
| A8 = | −5.42278E−02 | 1.40302E−02 | 4.66460E−04 | −2.11209E−03 | −5.19839E−03 |
| A10 = | 5.22801E−02 | −3.37468E−03 | 8.44401E−05 | 4.14398E−05 | 3.99057E−04 |

With reference to Table 25 and the series of aberration curves as shown in FIG. 9B for the image taking optical system in accordance with this preferred embodiment, the focal length of the image taking optical system is f=6.48 (mm), and the overall aperture stop value (f-number) of the image taking optical system is Fno=2.83. After the optical data of this preferred embodiment are calculated and derived, the image taking optical system satisfies related relations as shown in Table 27 below, and the related symbols have been described above and thus will not be described again.

TABLE 27

Data of related relations of this preferred embodiment

| Relation | Data |
|---|---|
| HFOV | 39.3° |
| $DIST_8$ | −39.78% |
| $\tan(HFOV)/DIST_8$ | −2.06 |
| $(Rg_1 + Rg_2)/(Rg_1 − Rg_2)$ | 0.61 |
| $(Rn_1 + Rn_2)/(Rn_1 − Rn_2)$ | −0.29 |
| $(R_1 − R_2)/(R_1 + R_2)$ | 0.12 |
| $R_L/f$ | 0.40 |
| $f_R/f_F$ | 2.35 |
| $Tgn/f$ | 0.01 |
| $f/f_1$ | −0.01 |
| $\Sigma |P_F|/\Sigma |P_R|$ | 0.26 |
| TTL/ImgH | 3.38 |
| SL/TTL | 0.57 |

Figure 9C:
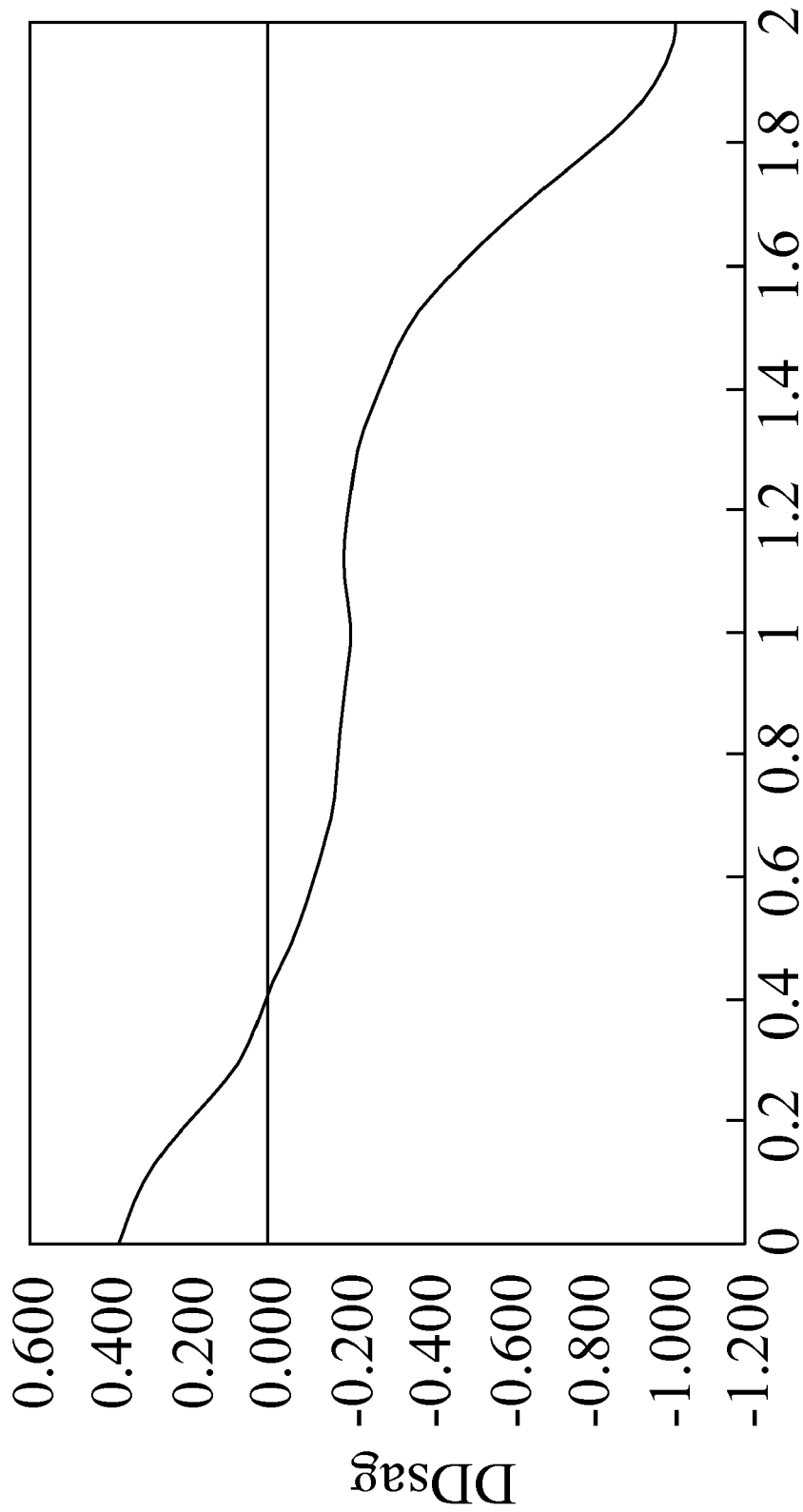
FIG. 9C is a curve showing the second derivatives of SAG values of an image-side surface of a rear-group rear lens element in accordance with the ninth preferred embodiment of the present invention.

With reference to FIG. 9C for a curve showing the second derivatives of SAG values of an image-side surface of a rear-group rear lens element in accordance with the ninth preferred embodiment of the present invention, if the value of second derivative of SAG is equal to 0, an inflection point will be at that point, and the value Y (mm) represents the distance between the point on the aspherical curve and the optical axis. In this preferred embodiment, one second derivative of SAG value of the image-side surface (9252) of the rear-group rear lens element (9250) equal to zero is found, indicating that there is one inflection point between the center and the periphery of the optical surface.

According to the optical data as shown in Table 25 and the series of aberration curves as shown in FIG. 9B, the image taking optical system in accordance with this preferred embodiment of the present invention provides good correction results in aspects of the longitudinal spherical aberration, astigmatic field curving, and distortion.

Tenth Preferred Embodiment

Figure 10A:
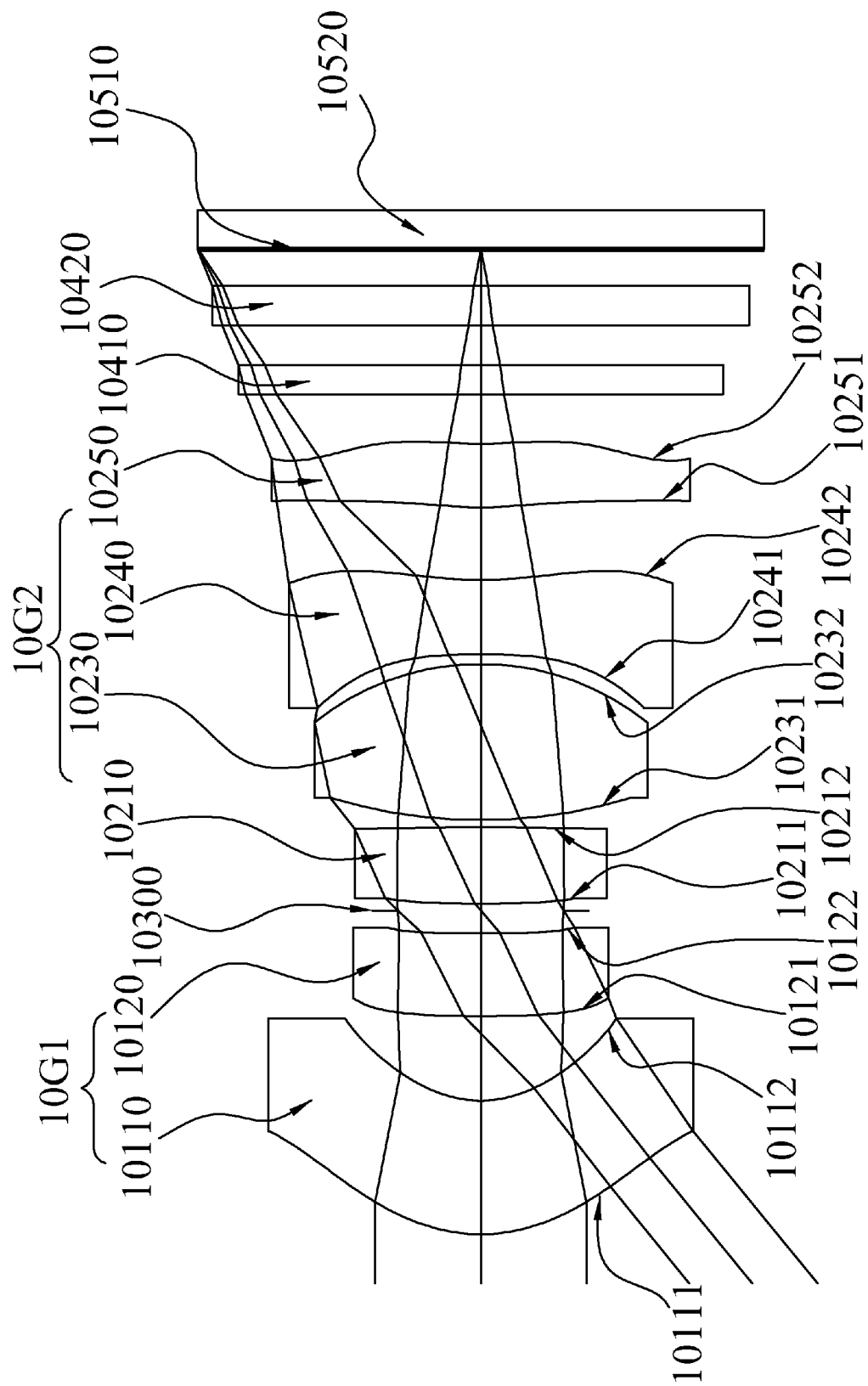
FIG. 10A is a schematic view of an optical system in accordance with the tenth preferred embodiment of the present invention.
Figure 10B:
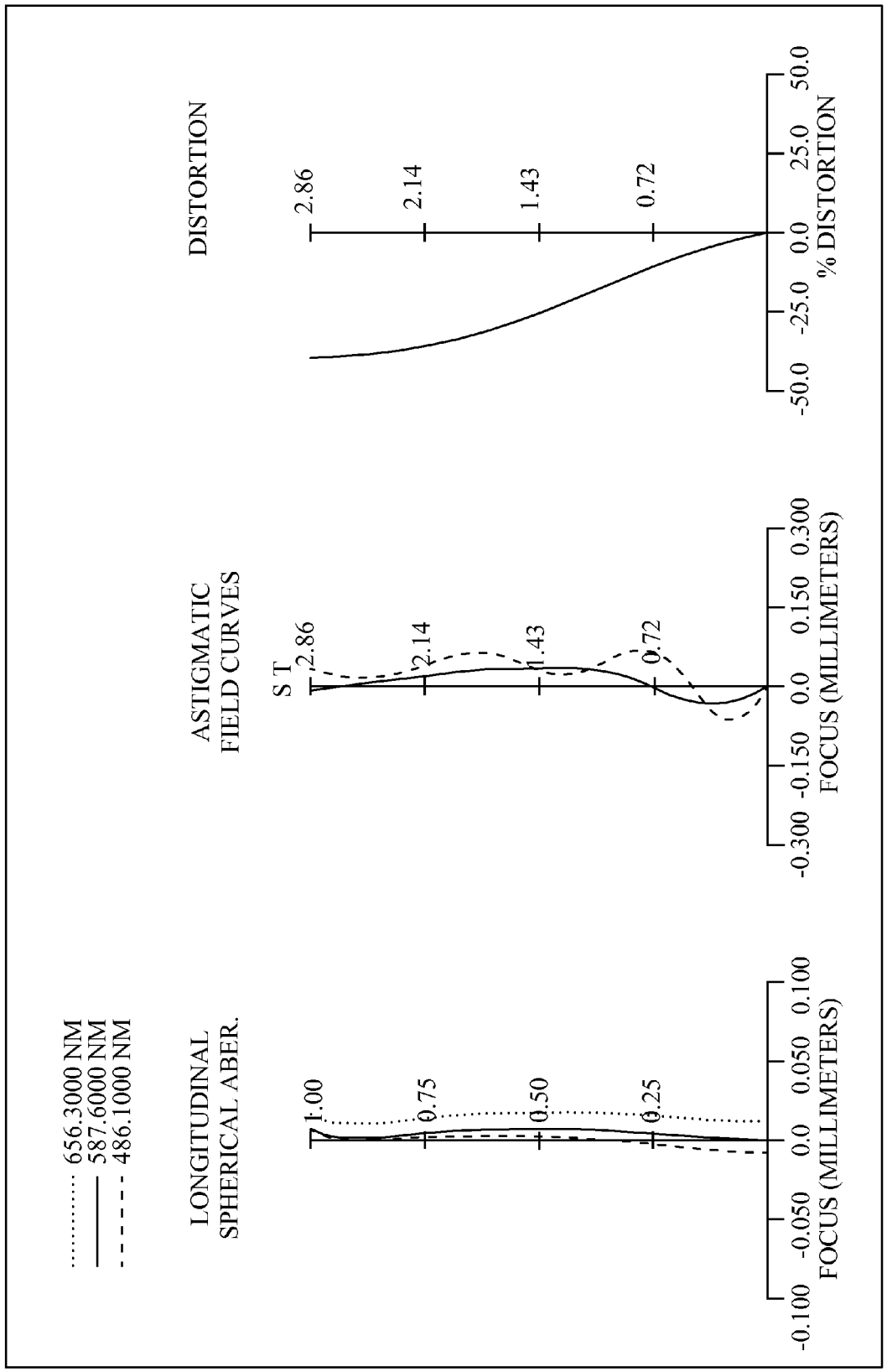
FIG. 10B is a schematic view of a series of aberration curves of the tenth preferred embodiment of the present invention.

With reference to FIGS. 10A and 10B for a schematic view of an optical system and a series of aberration curves in accordance with the tenth preferred embodiment of the present invention respectively and Table 28 for the optical data of this preferred embodiment, the image taking optical system comprises a front lens group (10G1), a aperture stop (10300) and a rear lens group (10G2), and the aperture stop (10300) is arranged between the front lens group (10G1) and the rear lens group (10G2). The front lens group (10G1) comprises a front-group first lens element (10110) (labeled as the first lens element in Table 28), and a front-group second lens element (10120) (labeled as the second lens element in Table 28). The rear lens group (10G2) comprises four lens elements, being respectively: a rear-group first lens element (10210) ((labeled as the third lens element in Table 28), a rear-group positive lens element (10230) (labeled as the fourth lens element in Table 28), a rear-group negative lens element (10240) (labeled as the fifth lens element in Table 28) and a rear-group rear lens element (10250) (labeled as the sixth lens element in Table 28). The meniscus front-group first lens element (10110) with negative refractive power has a convex object-side surface (10111) and a concave image-side surface (10112). The meniscus front-group second lens element (10120) with positive refractive power has a convex object-side surface (10121) and a concave image-side surface (10122).

The rear lens group (10G2) comprises four lens elements, being respectively: the rear-group first lens element (10210) with positive refractive power being a bi-convex lens element; the bi-convex rear-group positive glass lens element (10230) with positive refractive power having both spherical object-side surface (10231) and image-side surface (10232); a bi-concave rear-group negative lens element (10240) with negative refractive power adjacent to the image side of the rear-group positive lens element (10230); the plastic rear-group rear lens element (10250) nearest to the image plane (10510) having a convex object-side surface (10251) and a concave image-side surface (10252), and both object-side surface (10251) and image-side surface (10252) thereof having an inflection point.

The image taking optical system of this preferred embodiment further comprises an IR-filter (10410) and a cover glass (10420); the IR-filter (10410) and the cover glass (10420) are installed sequentially from the object side to the image side and between the rear-group rear lens element (10250) and the image plane (10510), and generally made of plate optical material without affecting the overall focal length of the image taking optical system of the present invention. The image taking optical system of this preferred embodiment further comprises an image sensor (10520) at the image plane (10510) for imaging a photographed object.

TABLE 28

Optical data of this preferred embodiment
f = 5.99 mm, Fno = 2.80, HFOV = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.739133 (ASP) | 1.352 | Plastic | 1.514 | 56.8 | −33.12 |
| 2 | | 1.161539 (ASP) | 0.854 | | | | |
| 3 | Lens 2 | 13.478730 (ASP) | 0.843 | Plastic | 1.535 | 56.3 | 29.96 |
| 4 | | 83.196274 (ASP) | 0.228 | | | | |
| 5 | Ape. Stop | Plano | 0.070 | | | | |
| 6 | Lens 3 | 17.582431 (ASP) | 0.773 | Plastic | 1.514 | 56.8 | 24.44 |
| 7 | | −43.198583 (ASP) | 0.070 | | | | |
| 8 | Lens 4 | 5.219309 | 1.581 | Glass | 1.713 | 53.8 | 2.71 |
| 9 | | −2.684475 | 0.100 | | | | |
| 10 | Lens 5 | −6.820585 (ASP) | 0.752 | Plastic | 1.650 | 21.4 | −3.72 |
| 11 | | 3.906764 (ASP) | 0.734 | | | | |
| 12 | Lens 6 | 3.335418 (ASP) | 0.642 | Plastic | 1.634 | 23.8 | −89.68 |
| 13 | | 2.915303 (ASP) | 0.500 | | | | |
| 14 | IR-filter | Plano | 0.300 | Glass | 1.517 | 64.2 | — |
| 15 | | Plano | 0.400 | | | | |
| 16 | Cover-glass | Plano | 0.400 | Glass | 1.517 | 64.2 | — |
| 17 | | Plano | 0.369 | | | | |
| 18 | Image | Plano | — | | | | |

Note:
Reference wavelength is 587.6 nm. ASP stands for aspherical surfaces.

The optical data of this preferred embodiment are listed in the table above, wherein the object-side surface (10111) of the front-group first lens element (10110), the image-side surface (10112) of the front-group first lens element (10110), the object-side surface (10121) of the front-group second lens element (10120), the image-side surface (10122) of the front-group second lens element (10120), the object-side surface (10211) of the rear-group first lens element (10210), the image-side surface (10212) of the rear-group first lens element (10210), the object-side surface (10241) of the rear-group negative lens element (10240), the image-side surface (10242) of the rear-group negative lens element (10240), the object-side surface (10251) of the rear-group rear lens element (10250) and the image-side surface (10252) of the rear-group rear lens element (10250) are aspherical surfaces in compliance with the aspherical surface formula as given in Equation (15), and their aspheric coefficients are listed in Table 29 below.

TABLE 29

Aspheric coefficients of this preferred embodiment

| Surface # | 1 | 2 | 3 | 4 | 6 |
|---|---|---|---|---|---|
| k = | −3.31178E+00 | −1.65683E+00 | 9.00000E+01 | 9.00000E+01 | 1.35046E+02 |
| A4 = | 5.09197E−02 | 5.64851E−02 | 1.11016E−02 | 3.64673E−02 | 2.45638E−02 |
| A6 = | −1.36667E−02 | −2.24879E−02 | 7.58376E−03 | 3.20214E−02 | −2.40181E−03 |
| A8 = | 1.19585E−03 | −7.53875E−04 | 1.96215E−03 | −1.82600E−02 | 1.02145E−02 |
| A10 = | −4.20931E−05 | 4.71513E−03 | 9.57859E−04 | 1.07541E−02 | −4.76411E−03 |

| Surface # | 7 | 10 | 11 | 12 | 13 |
|---|---|---|---|---|---|
| k = | 2.00000E+02 | 1.01071E+01 | −3.04677E+01 | −7.15274E+01 | −1.46530E+02 |
| A4 = | −4.80576E−03 | −5.15530E−02 | −1.18999E−02 | −4.07365E−02 | −8.28835E−02 |
| A6 = | 2.72471E−03 | 2.14605E−04 | −4.43326E−03 | 1.87153E−02 | 2.15322E−02 |
| A8 = | −5.36217E−04 | 1.85824E−03 | 3.28013E−04 | −3.53806E−03 | −1.43820E−03 |
| A10 = | 8.73360E−04 | −1.06998E−04 | 7.08600E−05 | 2.27652E−04 | 2.23006E−06 |

With reference to Table 28 and the series of aberration curves as shown in FIG. 10B for the image taking optical system in accordance with this preferred embodiment, the focal length of the image taking optical system is f=5.99 (mm), and the overall aperture stop value (f-number) of the image taking optical system is Fno=2.80. After the optical data of this preferred embodiment are calculated and derived, the image taking optical system satisfies related relations as shown in Table 30 below, and the related symbols have been described above and thus will not be described again.

TABLE 30

Data of related relations of this preferred embodiment

| Relation | Data |
|---|---|
| HFOV | 39.2° |
| $DIST_8$ | −38.85% |
| $\tan(HFOV)/DIST_8$ | −2.10 |
| $(Rg_1 + Rg_2)/(Rg_1 − Rg_2)$ | 0.32 |
| $(Rn_1 + Rn_2)/(Rn_1 − Rn_2)$ | 0.27 |
| $(R_1 − R_2)/(R_1 + R_2)$ | 0.20 |
| $R_L/f$ | 0.49 |
| $f_R/f_F$ | −0.02 |
| $Tgn/f$ | 0.02 |
| $f/f_1$ | −0.18 |
| $\Sigma |P_F|/\Sigma |P_R|$ | 0.09 |
| TTL/ImgH | 3.41 |
| SL/TTL | 0.66 |

Figure 10C:
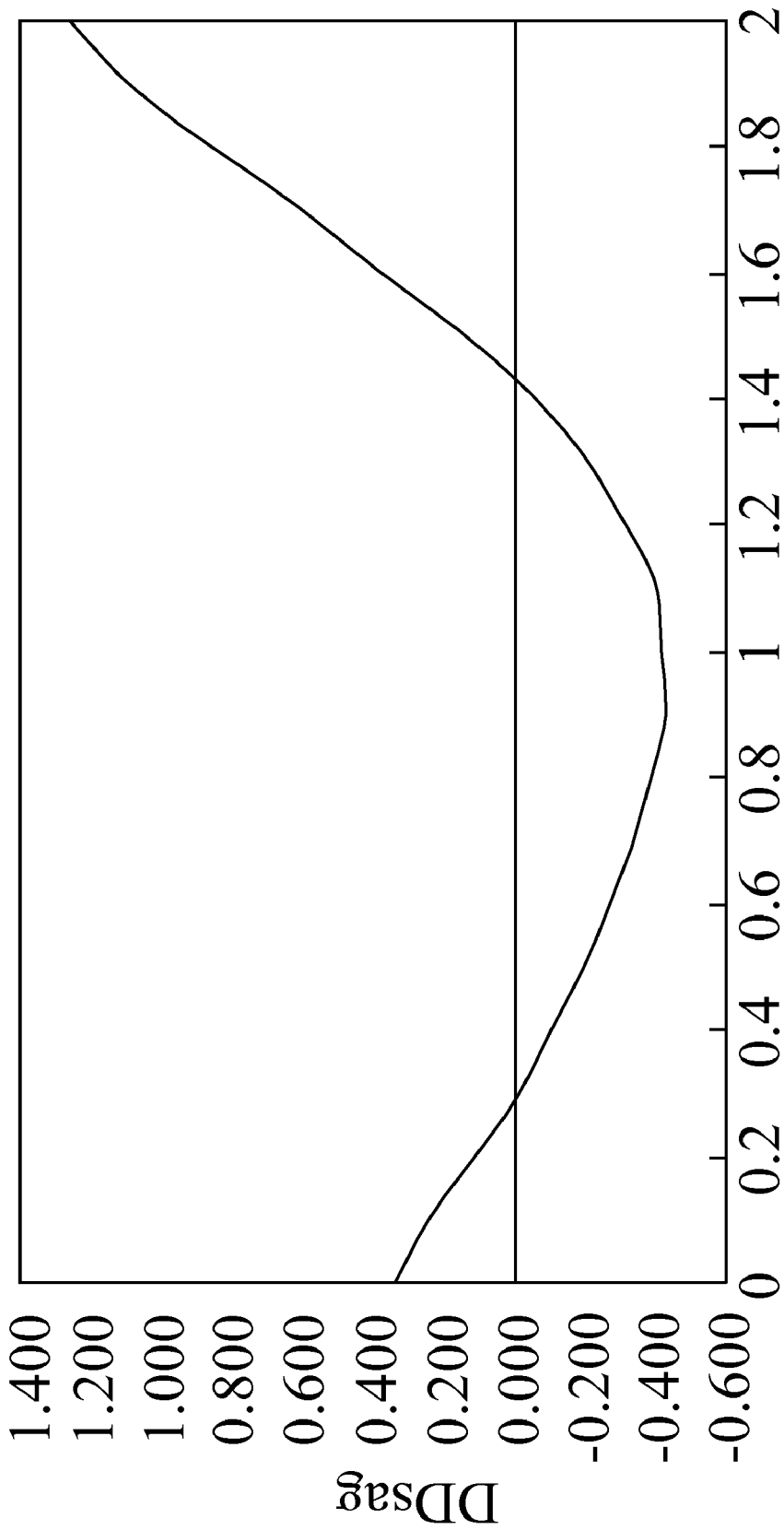
FIG. 10C is a curve showing the second derivatives of SAG values of an image-side surface of a rear-group rear lens element in accordance with the tenth preferred embodiment of the present invention.

With reference to FIG. 10C for a curve showing the second derivatives of SAG values of an image-side surface of a rear-group rear lens element in accordance with the tenth preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (10252) of the rear-group rear lens element (10250) equal to zero are found, indicating that there are two inflection points between the center and the periphery of the optical surface.

According to the optical data as shown in Table 28 and the series of aberration curves as shown in FIG. 10B, the image taking optical system in accordance with this preferred embodiment of the present invention provides good correction results in aspects of the longitudinal spherical aberration, astigmatic field curving, and distortion.

Eleventh Preferred Embodiment

Figure 11A:
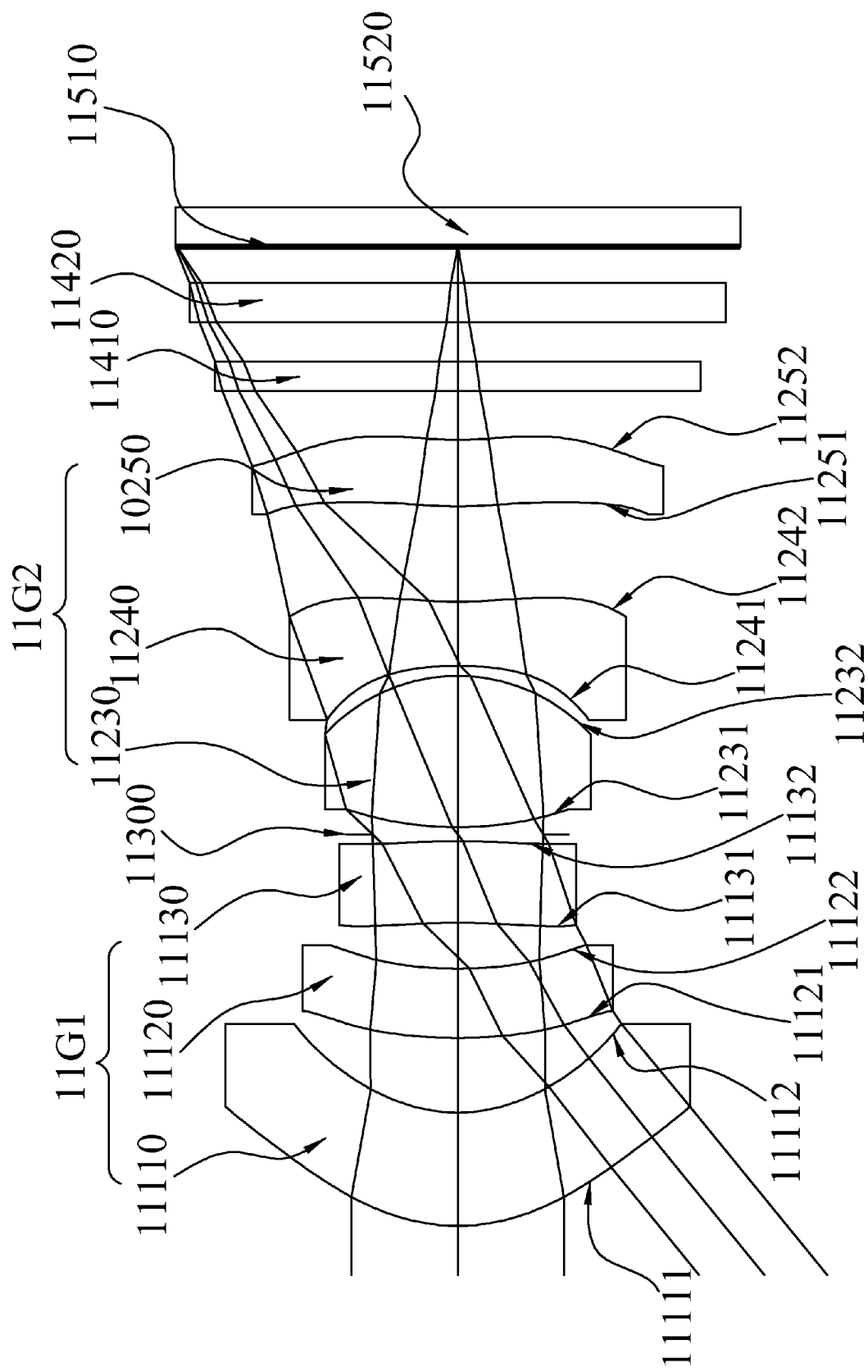
FIG. 11A is a schematic view of an optical system in accordance with the eleventh preferred embodiment of the present invention.
Figure 11B:
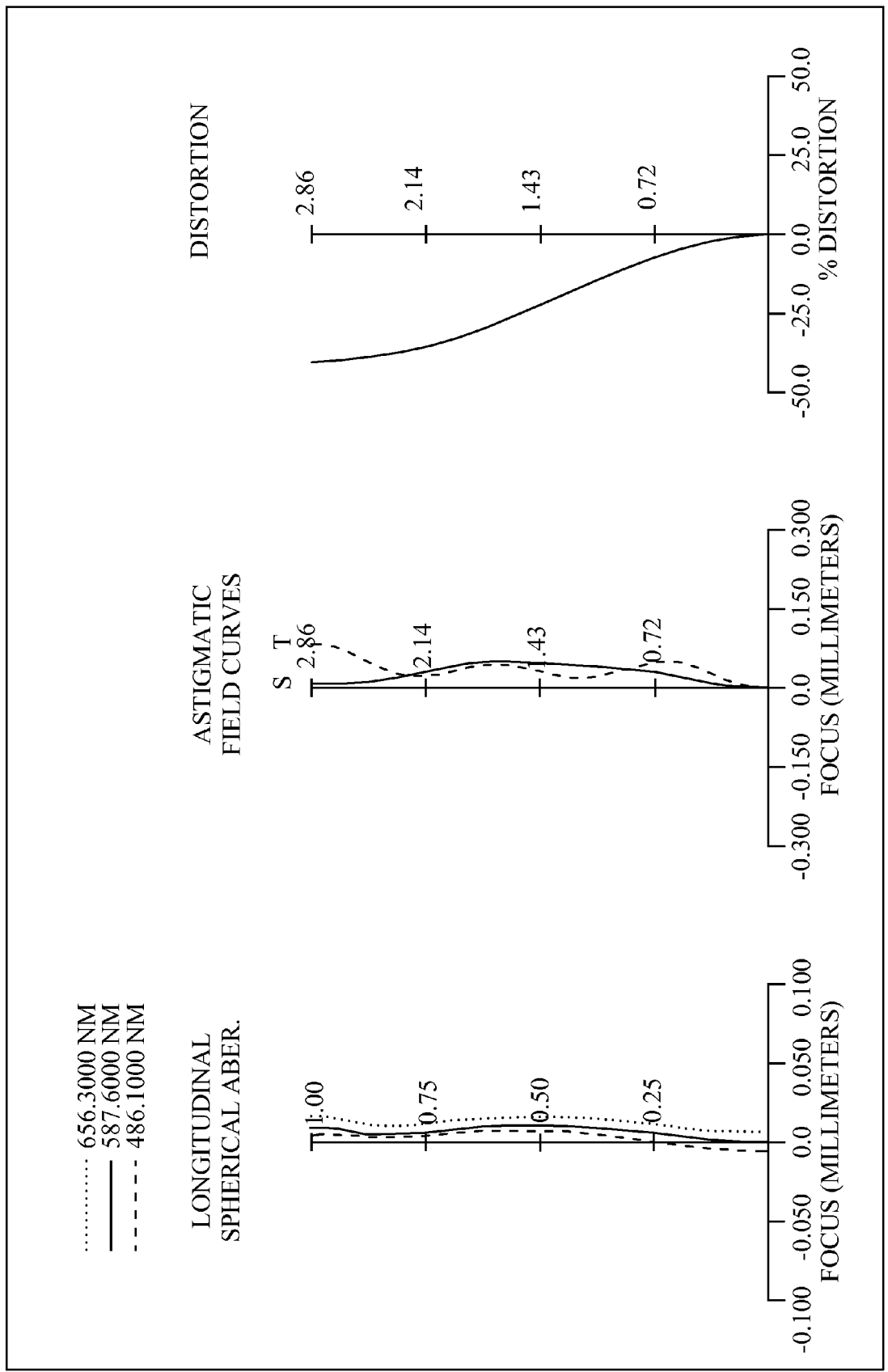
FIG. 11B is a schematic view of a series of aberration curves of the eleventh preferred embodiment of the present invention.

With reference to FIGS. 11A and 11B for a schematic view of an optical system and a series of aberration curves in accordance with the seventh preferred embodiment of the present invention respectively and Table 31 for the optical data of this preferred embodiment, the image taking optical system comprises a front lens group (11G1), a aperture stop (11300) and a rear lens group (11G2), and the aperture stop (11300) is arranged between the front lens group (11G1) and the rear lens group (11G2). The front lens group (11G1) comprises a front-group first lens element (11110) (labeled as the first lens element in Table 31), a front-group second lens element (11120) (labeled as the second lens element in Table 31) and a front-group third lens element (11130) (labeled as the third lens element in Table 31). The rear lens group (11G2) comprises three lens elements, being respectively: a rear-group positive lens element (11230) (as labeled as the fourth lens element in Table 31), a rear-group negative lens element (11240) (as labeled as the fifth lens element in Table 31) and a rear-group rear lens element (11250) (as labeled as the sixth lens element in Table 31). The meniscus front-group first lens element (11110) with positive refractive power has a convex object-side surface (11111) and a concave image-side surface (11112). The meniscus front-group second lens element (11120) with negative refractive power has a convex object-side surface (11121) and a concave image-side surface (11122). The front-group third lens element (11130) with negative refractive power has a concave object-side surface (11131) and a convex image-side surface (11132).

The rear lens group (11G2) comprises three lens elements, the bi-convex rear-group positive glass lens element (11230) with positive refractive power having both spherical object-side surface (11231) and image-side surface (11232); the bi-concave rear-group negative lens element (11240) with negative refractive power adjacent to the image side of the rear-group positive lens element (11230); and the plastic rear-group rear lens element (11250) nearest to the image plane (11510) and having a convex object-side surface (11251) and a concave image-side surface (11252), and both object-side surface (11251) and image-side surface (11252) thereof having an inflection point.

The image taking optical system of this preferred embodiment further comprises an IR-filter (11410) and a cover glass (11420); the IR-filter (11410) and the cover glass (11420) are installed sequentially from the object side to the image side and between the rear-group rear lens element (11250) and the image plane (11510), and generally made of plate optical material without affecting the overall focal length of the image taking optical system of the present invention. The image taking optical system of this preferred embodiment further comprises an image sensor (11520) at the image plane (11510) for imaging a photographed object.

TABLE 31

Optical data of this preferred embodiment
f = 6.07 mm, Fno = 2.81, HFOV = 39.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.970101 (ASP) | 1.154 | Plastic | 1.514 | 56.8 | 87.72 |
| 2 | | 1.650737 (ASP) | 0.762 | | | | |
| 3 | Lens 2 | 5.776628 (ASP) | 0.705 | Plastic | 1.650 | 21.4 | −66.83 |
| 4 | | 4.853227 (ASP) | 0.465 | | | | |
| 5 | Lens 3 | −7.539413 (ASP) | 0.830 | Plastic | 1.633 | 23.4 | −70.37 |
| 6 | | −9.463071 (ASP) | 0.070 | | | | |
| 7 | Ape. Stop | Plano | 0.070 | | | | |
| 8 | Lens 4 | 3.549702 | 1.542 | Glass | 1.589 | 61.3 | 2.30 |
| 9 | | −1.836718 | 0.103 | | | | |
| 10 | Lens 5 | −3.571730 (ASP) | 0.655 | Plastic | 1.583 | 30.2 | −3.42 |
| 11 | | 4.832072 (ASP) | 0.969 | | | | |
| 12 | Lens 6 | 3.819151 (ASP) | 0.676 | Plastic | 1.633 | 23.4 | −24.03 |
| 13 | | 2.843128 (ASP) | 0.500 | | | | |
| 14 | IR-filterer | Plano | 0.300 | Glass | 1.517 | 64.2 | — |
| 15 | | Plano | 0.400 | | | | |
| 16 | Cover-glass | Plano | 0.400 | Glass | 1.517 | 64.2 | — |

TABLE 31-continued

Optical data of this preferred embodiment
f = 6.07 mm, Fno = 2.81, HFOV = 39.2 deg.

| Surface # | | Curvature Radius | Thickness | Material | Index | Abbe # | Focal Length |
|---|---|---|---|---|---|---|---|
| 17 | | Plano | 0.366 | | | | |
| 18 | Image | Plano | — | | | | |

Note:
Reference wavelength is 587.6 nm. ASP stands for aspherical surfaces.

The optical data of this preferred embodiment are listed in the table above, wherein, the object-side surface (11111) of the front-group first lens element (11110), the image-side surface (11112) of the front-group first lens element (11110), the object-side surface (11121) of the front-group second lens element (11120), the image-side surface (11122) of the front-group second lens element (11120), the object-side surface (11131) of the front-group third lens element (11130), the image-side surface (11132) of the front-group third lens element (11130), the object-side surface (11241) of the rear-group negative lens element (11240), the image-side surface (11242) of the rear-group negative lens element (11240), the object-side surface (11251) of the rear-group rear lens element (11250) and the image-side surface (11252) of the rear-group rear lens element (11250) are aspherical surfaces in compliance with the aspherical surface formula as given in Equation (15), and their aspheric coefficients are listed in Table 32 below.

TABLE 32

Aspheric coefficients of this preferred embodiment

| Surface # | 1 | 2 | 3 | 4 | 5 |
|---|---|---|---|---|---|
| k = | −3.85087E+00 | −2.29558E+00 | −2.21336E+01 | −2.44387E+01 | 2.88250E+01 |
| A4 = | 4.43750E−02 | 4.16058E−02 | 3.34100E−02 | 5.97019E−02 | 3.94031E−02 |
| A6 = | −1.19555E−02 | −1.37225E−02 | −2.74508E−04 | −8.02247E−04 | 6.52764E−04 |
| A8 = | 1.38513E−03 | 4.64149E−03 | −7.78169E−04 | −6.25356E−03 | 3.19406E−03 |
| A10 = | −5.63082E−05 | −3.94447E−04 | −6.78565E−04 | −9.86034E−04 | 6.31442E−04 |

| Surface # | 6 | 10 | 11 | 12 | 13 |
|---|---|---|---|---|---|
| k = | −6.84598E+01 | 4.47433E+00 | −6.53050E+01 | −8.92702E+01 | −6.59334E+01 |
| A4 = | 5.10779E−03 | −7.59320E−02 | −2.66544E−02 | −4.04839E−02 | −7.87314E−02 |
| A6 = | 1.68297E−02 | 8.15169E−03 | −4.31410E−03 | 1.56362E−02 | 2.03421E−02 |
| A8 = | −1.32994E−02 | −3.66452E−03 | 3.56665E−04 | −3.10768E−03 | −2.71644E−03 |
| A10 = | 1.38554E−02 | 8.27408E−04 | 2.01183E−05 | 1.50119E−04 | 1.94522E−04 |

With reference to Table 31 and the series of aberration curves as shown in FIG. 11B for the image taking optical system in accordance with this preferred embodiment, the focal length of the image taking optical system is f=6.07 (mm), and the overall aperture stop value (f-number) of the image taking optical system is Fno=2.81. After the optical data of this preferred embodiment are calculated and derived, the image taking optical system satisfies related relations as shown in Table 33 below, and the related symbols have been described above and thus will not be described again.

TABLE 33

Data of related relations of this preferred embodiment

| Relation | Data |
|---|---|
| HFOV | 39.2° |
| $DIST_8$ | −38.88% |

TABLE 33-continued

Data of related relations of this preferred embodiment

| Relation | Data |
|---|---|
| $\tan(HFOV)/DIST_8$ | −2.10 |
| $(Rg_1 + Rg_2)/(Rg_1 - Rg_2)$ | 0.32 |
| $(Rn_1 + Rn_2)/(Rn_1 - Rn_2)$ | −0.15 |
| $(R_1 - R_2)/(R_1 + R_2)$ | 0.09 |
| $R_L/f$ | 0.47 |
| $f_R/f_F$ | −0.05 |
| $T_{gn}/f$ | 0.02 |
| $f/f_1$ | 0.07 |
| $\Sigma |P_F|/\Sigma |P_R|$ | 0.05 |
| TTL/ImgH | 3.41 |
| SL/TTL | 0.59 |

Figure 11C:
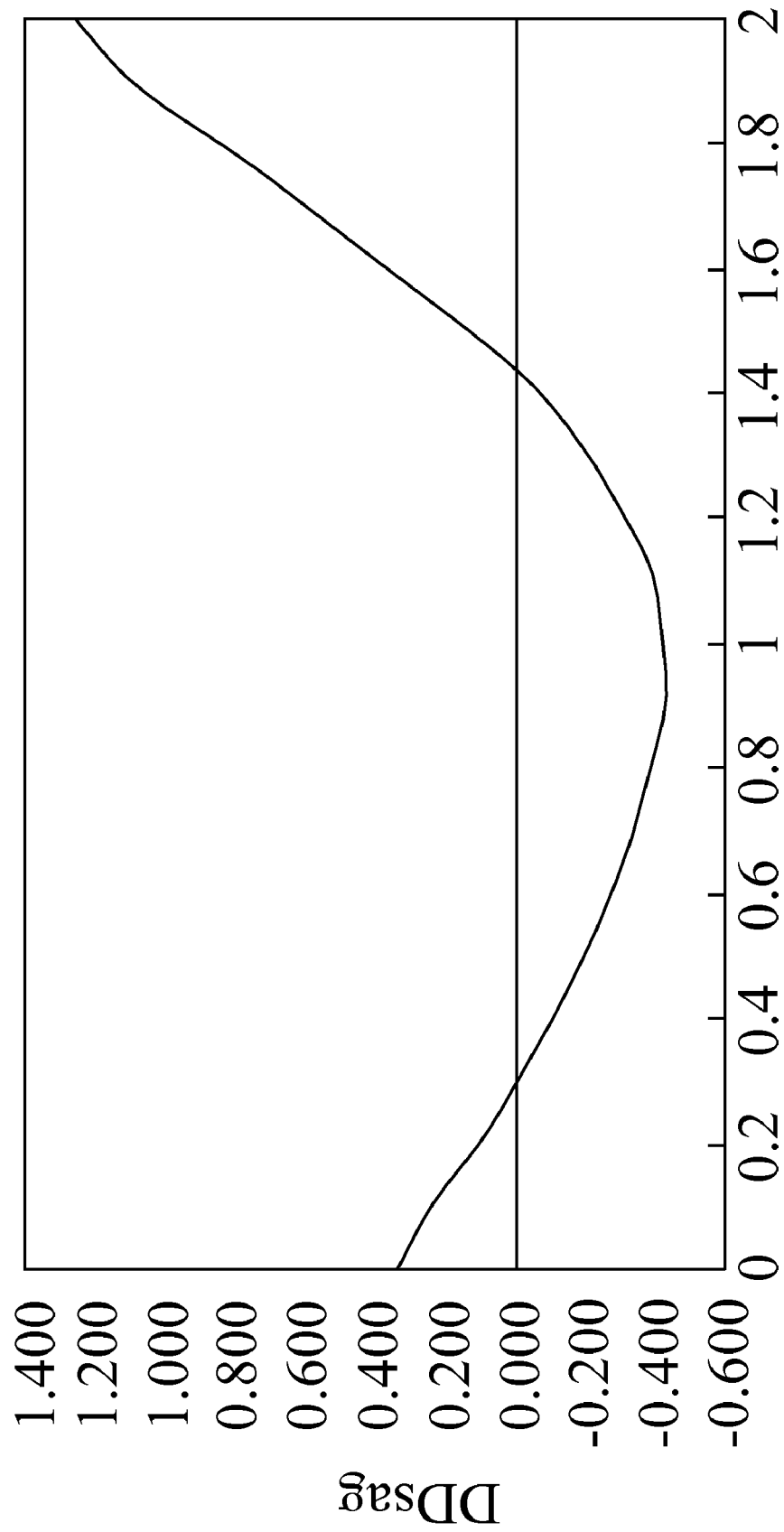
FIG. 11C is a curve showing the second derivatives of SAG values of an image-side surface of a rear-group rear lens element in accordance with the eleventh preferred embodiment of the present invention.

With reference to FIG. 11C for a curve showing the second derivatives of SAG values of an image-side surface of a rear-group rear lens element in accordance with the eleventh preferred embodiment of the present invention, if the value of second derivative of SAG is equal to 0, an inflection point will be at that point, and the value Y (mm) represents the distance between the point on the aspherical curve and the optical axis. In this preferred embodiment, two second derivatives of SAG values of the image-side surface (11252) of the rear-group rear lens element (11250) equal to zero are found, indicating that there are two inflection points between the center and the periphery of the optical surface.

According to the optical data as shown in Table 31 and the series of aberration curves as shown in FIG. 11B, the image taking optical system in accordance with this preferred embodiment of the present invention provides good correction results in aspects of the longitudinal spherical aberration, astigmatic field curving, and distortion.

In the image taking optical system of the present invention, the lens element can be made of glass or plastic. If the lens element is made of glass, the selection of refractive power for the image taking optical system can be more flexible. If the lens element is made of plastic, then the production cost can be reduced effectively. In addition, the optical surface of the lens element is aspheric, and the aspherical surface can be easily manufactured into any shape other than those within the limitation of a spheric surface to have more control factors for eliminating aberrations, so as to reduce the number of lenses used and the total length of the optical lens assembly of the present invention.

In the image taking optical system of the present invention, if the lens element has a convex surface, then the surface of the lens element is convex at a position near the optical axis; and if the lens element has a concave surface, then the surface of the lens element is concave at a position near the optical axis.

In the image taking optical system of the present invention, at least one aperture stop (not as shown in figure) such as a glare stop or a field stop is provided for reducing stray lights to improve the image quality.

Tables 1 to 33 show changes of values of an image taking in accordance with different preferred embodiments of the present invention respectively, and even if different values are used, products of the same structure are intended to be covered by the scope of the present invention. It is noteworthy to point out that the aforementioned description and the illustration of related drawings are provided for the purpose of explaining the technical characteristics of the present invention, but not intended for limiting the scope of the present invention.

What is claimed is:

1. An image taking optical system, sequentially arranged from an object side to an image side comprising: a front lens group, a stop and a rear lens group;
    wherein the front lens group comprises at least one lens element, and the rear lens group comprises at least three lens elements;
    the front lens group comprises a front-group first lens element being a meniscus lens element nearest to the object side and having a convex object-side surface; and
    HFOV is half of the maximum view angle of the image taking optical system (unit in degree), $DIST_8$ is an optical distortion at 80% of the maximum image height (unit in percent), and the following relations are satisfied:

$30°<HFOV<45°$;

$-50\%<DIST_8<-30\%$.

2. The image taking optical system of claim 1, wherein the rear lens group comprises a rear-group rear lens element made of plastic nearest to an image plane, and at least one of the object-side surface and image-side surface of the rear-group rear lens element has at least one inflection point.

3. The image taking optical system of claim 2, wherein the rear lens group at least comprises a rear-group positive glass lens element.

4. The image taking optical system of claim 3, wherein $Rg_1$ is a curvature radius of the object-side surface of the rear-group positive glass lens element, $Rg_2$ is a curvature radius of the image-side surface of the rear-group positive glass lens element, and the following relation is satisfied:

$-0.5<(Rg_1+Rg_2)/(Rg_1-Rg_2)<1.0$.

5. The image taking optical system of claim 4, wherein a rear-group negative lens element is on the image side of the rear-group positive glass lens element; $Rn_1$ is a curvature radius of the object-side surface of the rear-group negative lens element, $Rn_2$ is a curvature radius of the image-side surface of the rear-group negative lens element, and the following relation is satisfied:

$-1.0<(Rn_1+Rn_2)/(Rn_1-Rn_2)<0.5$.

6. The image taking optical system of claim 5, wherein the image-side surface of the rear-group negative lens element has at least one inflection point, Tgn is an axial distance between the image-side surface of the rear-group positive glass lens element and the object-side surface of the rear-group negative lens element, f is a focal length of the image taking optical system, and the following relation is satisfied:

$0<Tgn/f<0.1$.

7. The image taking optical system of claim 4, wherein $R_L$ is a curvature radius of the image-side surface of the rear-group rear lens element, f is a focal length of the image taking optical system, and the following relation is satisfied:

$0.0<R_L/f<0.55$.

8. The image taking optical system of claim 4, wherein $\Sigma|P_F|$ is a summation of absolute values of refractive power of each lens element of the front lens group, $\Sigma|P_R|$ is a summation of absolute values of refractive power of each lens element of the rear lens group, and the following relation is satisfied:

$0.0<\Sigma|P_F|/\Sigma|P_R|<0.18$.

9. The image taking optical system of claim 4, further comprising an image sensor at an image plane, wherein TTL is an axial distance from the object-side surface of the front-group first lens element to the image plane, ImgH is half of the diagonal length of an effective photosensitive area of the image sensor, and the following relation is satisfied:

$TTL/ImgH<3.8$.

10. The image taking optical system of claim 3, wherein the rear-group rear lens element has at least two inflection points between the center and the periphery of the image-side surface thereof.

11. The image taking optical system of claim 1, wherein the rear lens group comprises a rear-group rear lens element nearest to an image plane having a concave image-side surface.

12. The image taking optical system of claim 11, wherein $R_1$ is a curvature radius of the object-side surface of front-group first lens element, $R_2$ is a curvature radius of the image-side surface of the front-group first lens element, and the following relation is satisfied:

$0.0<(R_1-R_2)/(R_1+R_2)<0.5$.

13. The image taking optical system of claim 11, wherein $R_1$ is a curvature radius of the object-side surface of front-group first lens element, $R_2$ is a curvature radius of the image-side surface of the front-group first lens element, and the following relation is satisfied:

$0.0<(R_1-R_2)/(R_1+R_2)<0.3$.

14. The image taking optical system of claim 12, wherein f is a focal length of the image taking optical system, $f_1$ is a focal length of the front-group first lens element, and the following relation is satisfied:

$-0.8<f/f_1<0.3$.

15. The image taking optical system of claim 12, wherein SL is an axial distance from the stop to the image plane, TTL is an axial distance from the object-side surface of the front-group first lens element to the image plane, and the following relation is satisfied:

$0.5 < SL/TTL < 0.9$.

16. The image taking optical system of claim 12, wherein $f_F$ is a focal length of the front lens group, $f_R$ is a focal length of the rear lens group, and the following relation is satisfied:

$-0.3 < f_R/f_F < 0.1$.

17. An image taking optical system, sequentially arranged from an object side to an image side comprising: a front lens group, a stop and a rear lens group;
   wherein, the front lens group comprises at least one lens element, and the rear lens group comprise at least three lens elements;
   the front lens group comprises a front-group first lens element nearest to the object side having a convex object-side surface and a concave image-side surface;
   the rear lens group comprises a rear-group rear lens element nearest to an image plane having a concave image-side surface and at least two inflection points between the center and the periphery of the image-side surface thereof;
   f is a focal length of the image taking optical system, $f_1$ is a focal length of the front-group first lens element, and the following relation is satisfied:

$-0.8 < f/f_1 < 0.3$.

18. The image taking optical system of claim 17, wherein $\Sigma |P_F|$ is a summation of absolute values of the refractive power of each lens element of the front lens group, $\Sigma |P_R|$ is a summation of absolute values of the refractive power of each lens element of the rear lens group, and the following relation is satisfied:

$0.0 < \Sigma|P_F|/\Sigma|P_R| < 0.18$.

19. The image taking optical system of claim 18, wherein $R_L$ is a curvature radius of the image-side surface of the rear-group rear lens element, f is a focal length of the image taking optical system, and the following relation is satisfied:

$0.0 < R_L/f < 0.55$.

20. The image taking optical system of claim 18, wherein SL is an axial distance from the stop to the image plane, TTL is an axial distance from the object-side surface of the front-group first lens element to the image plane, and the following relation is satisfied:

$0.5 < SL/TTL < 0.9$.

21. The image taking optical system of claim 20, further comprising an image sensor at the image plane, wherein TTL is the axial distance from the object-side surface of the front-group first lens element to the image plane, ImgH is half of the diagonal length of an effective photosensitive area of the image sensor, and the following relation is satisfied:

$TTL/ImgH < 3.8$.

22. The image taking optical system of claim 17, wherein HFOV is half of the maximum view angle of the image taking optical system (unit in degree), $DIST_8$ is an optical distortion at 80% of the maximum image height (unit in percent), and the following relation is satisfied:

$-10.0 < \tan(HFOV)/DIST_8 < 0.0$.

23. The image taking optical system of claim 22, wherein the rear lens group comprises a rear-group positive glass lens element, $Rg_1$ is a curvature radius of the object-side surface of the rear-group positive glass lens element, $Rg_2$ is a curvature radius of the image-side surface of the rear-group positive glass lens element; wherein there is a rear-group negative lens element on the image side of the rear-group positive lens element, $Rn_1$ is a curvature radius of the object-side surface of the rear-group negative lens element, $Rn_2$ is a curvature radius of the image-side surface of the rear-group negative lens element, and the following relations are satisfied:

$-0.5 < (Rg_1+Rg_2)/(Rg_1-Rg_2) < 1.0$;

$-1.0 < (Rn_1+Rn_2)/(Rn_1-Rn_2) < 0.5$.

24. The image taking optical system of claim 22, wherein $f_F$ is a focal length of the front lens group, $f_R$ is a focal length of the rear lens group, and the following relation is satisfied:

$-0.3 < f_R/f_F < 0.1$.

* * * * *

UNITED STATES PATENT AND TRADEMARK OFFICE
CERTIFICATE OF CORRECTION

PATENT NO. : 8,335,043 B2
APPLICATION NO. : 13/216630
DATED : December 18, 2012
INVENTOR(S) : Hsin-Hsuan Huang It is certified that error appears in the above-identified patent and that said Letters Patent is hereby corrected as shown below:

In the Specifications:

In column 2, equation 5, replace "$0 < Tgn/f < 0.1$" with "$0 \leq Tgn/f < 0.1$".

In the Claims:

In column 46, line 14, replace "$0 < Tgn/f < 0.1$" with "$0 \leq Tgn/f < 0.1$".

Signed and Sealed this
Sixteenth Day of July, 2013

Teresa Stanek Rea
*Acting Director of the United States Patent and Trademark Office*